United States Patent [19]
Ohtake

[11] Patent Number: 5,748,383
[45] Date of Patent: May 5, 1998

[54] VARIABLE FOCAL LENGTH OPTICAL SYSTEM

[75] Inventor: Motoyuki Ohtake, Kawasaki, Japan

[73] Assignee: Nikon Corporation, Tokyo, Japan

[21] Appl. No.: 721,578

[22] Filed: Sep. 25, 1996

[30] Foreign Application Priority Data

Nov. 14, 1995 [JP] Japan ................................. 7-319485
Feb. 22, 1996 [JP] Japan ................................. 8-059971

[51] Int. Cl.$^6$ .............. G02B 15/14; G02B 3/02; G02B 9/60; G02B 9/34
[52] U.S. Cl. .............. 359/683; 359/684; 359/714; 359/764; 359/773
[58] Field of Search .................. 359/684, 683, 359/714, 764, 773

[56] References Cited

U.S. PATENT DOCUMENTS

| | | | |
|---|---|---|---|
| 5,042,927 | 8/1991 | Ogawa et al. | 359/683 |
| 5,126,883 | 6/1992 | Sato et al. | 359/683 |
| 5,185,678 | 2/1993 | Arimoto | 359/684 |
| 5,241,421 | 8/1993 | Endo et al. | 359/684 |
| 5,440,430 | 8/1995 | Sato | 359/684 |
| 5,606,460 | 2/1997 | Ohtake | 359/683 |

FOREIGN PATENT DOCUMENTS

| | | | |
|---|---|---|---|
| 0562964 A1 | 9/1993 | European Pat. Off. | 359/684 |
| 7-27979 | 1/1995 | Japan . | |

*Primary Examiner*—David C. Nelms
*Assistant Examiner*—Evelyn A. Lester
*Attorney, Agent, or Firm*—Shapiro and Shapiro

[57] ABSTRACT

In a variable focal length optical system which has, in succession from an object side, a first lens unit G1 having a positive refractive power, a second lens unit G2 having a negative refractive power, a third lens unit G3 having a positive refractive power, a fourth lens unit G4 having a positive refractive power, and a fifth lens unit G5 having a negative refractive power, when the focal length is varied from the maximum wide-angle state to the maximum telephoto state, at least the fifth lens unit G5 moves toward the object side, so that a first variable air gap between the first lens unit G1 and the second lens unit G2 increases, a second variable air gap between the second lens unit G2 and the third lens unit G3 decreases, a third variable air gap between the third lens unit G3 and the fourth lens unit G4 increases, and a fourth variable air gap between the fourth lens unit G4 and the fifth lens unit G5 decreases, the second lens unit G2 at least has a negative sub lens unit G21 which is disposed at a position closest to the object side and has a negative refractive power, and a sub lens unit G22 which is disposed in the neighborhood of the image side of the negative sub lens unit G21, and the optical system satisfies the following conditions:

$$0.3 < \beta 2r \cdot \beta 2w < 1.0$$

$$0.08 < D2/fw < 0.16.$$

15 Claims, 47 Drawing Sheets

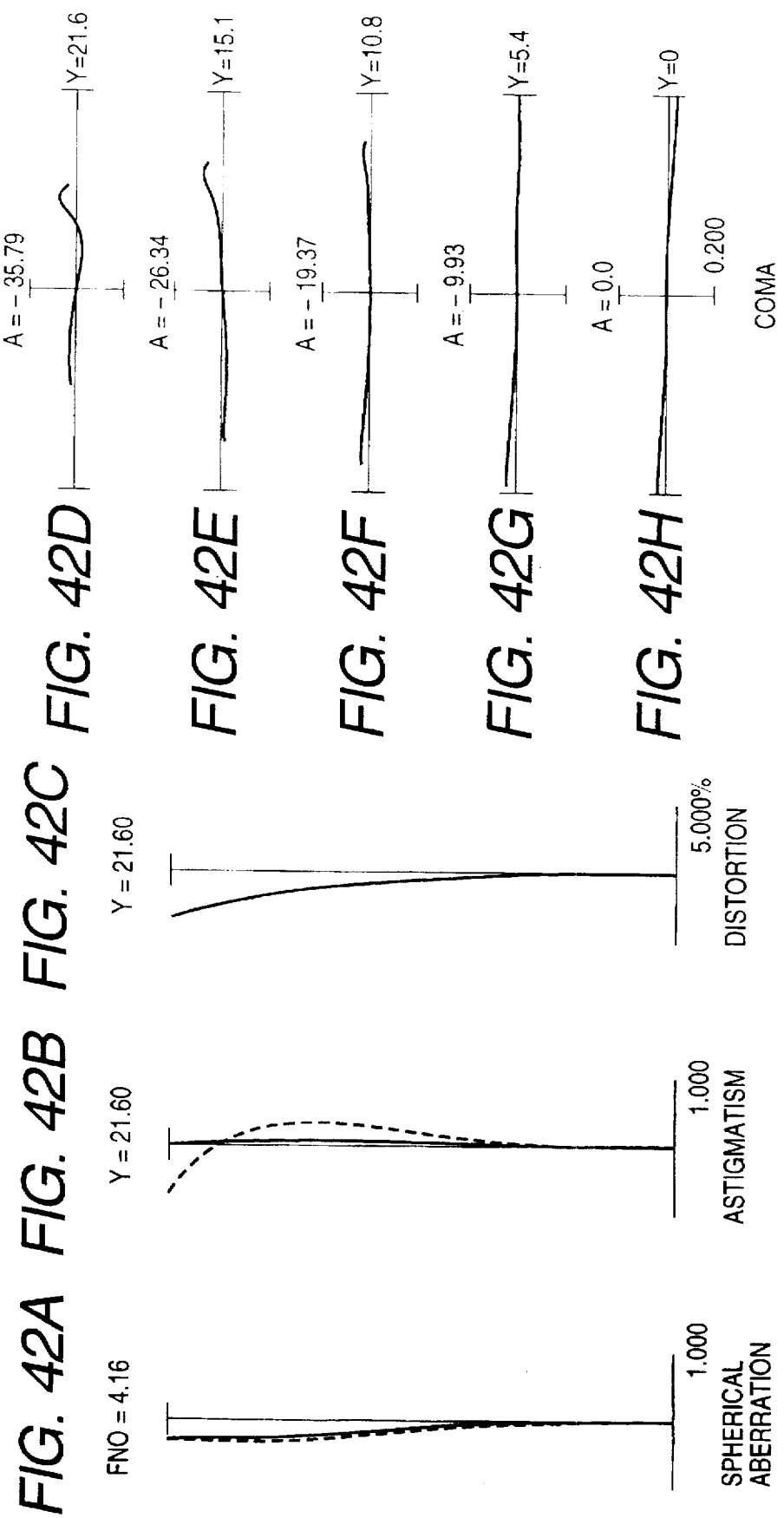

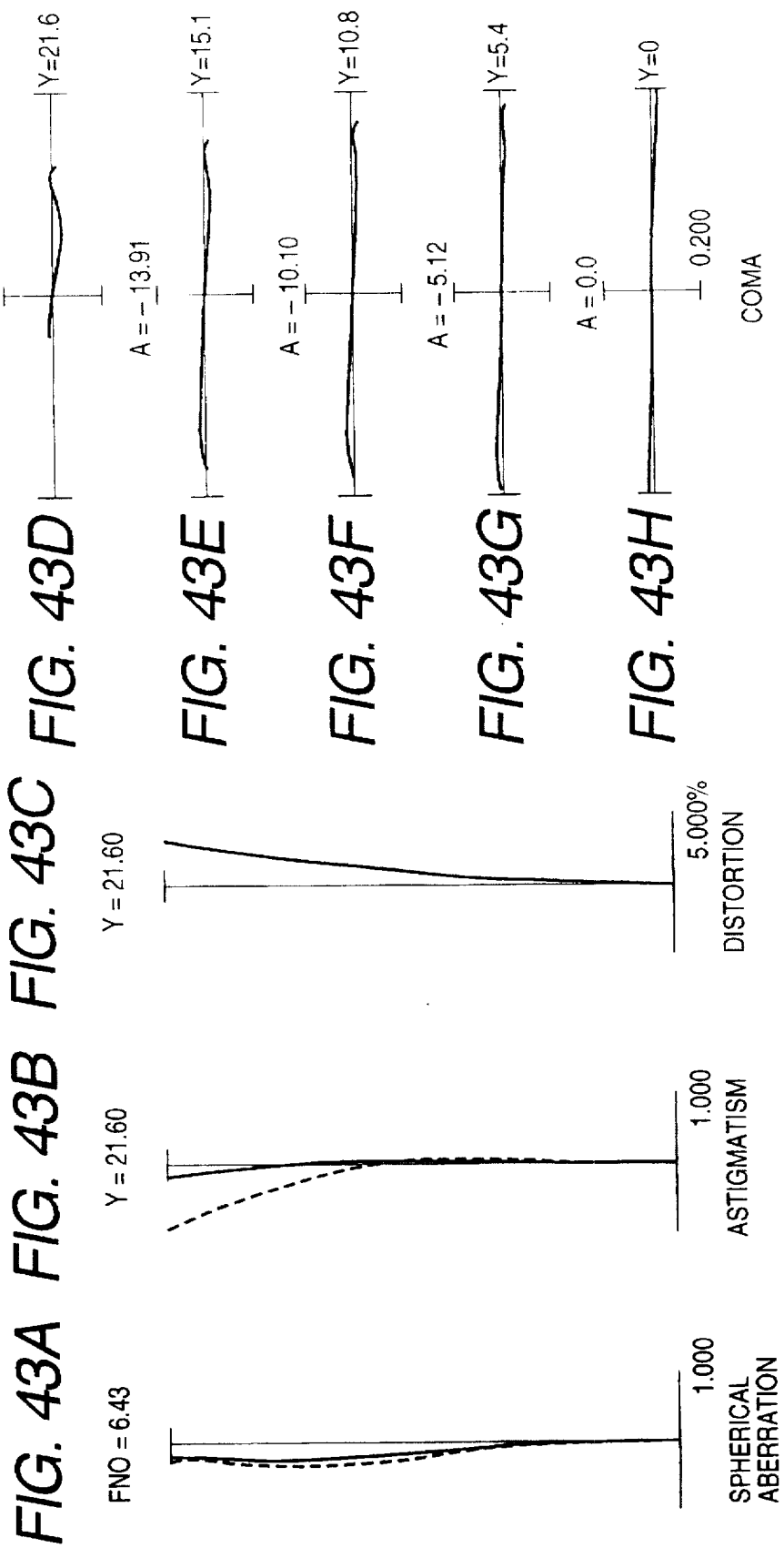

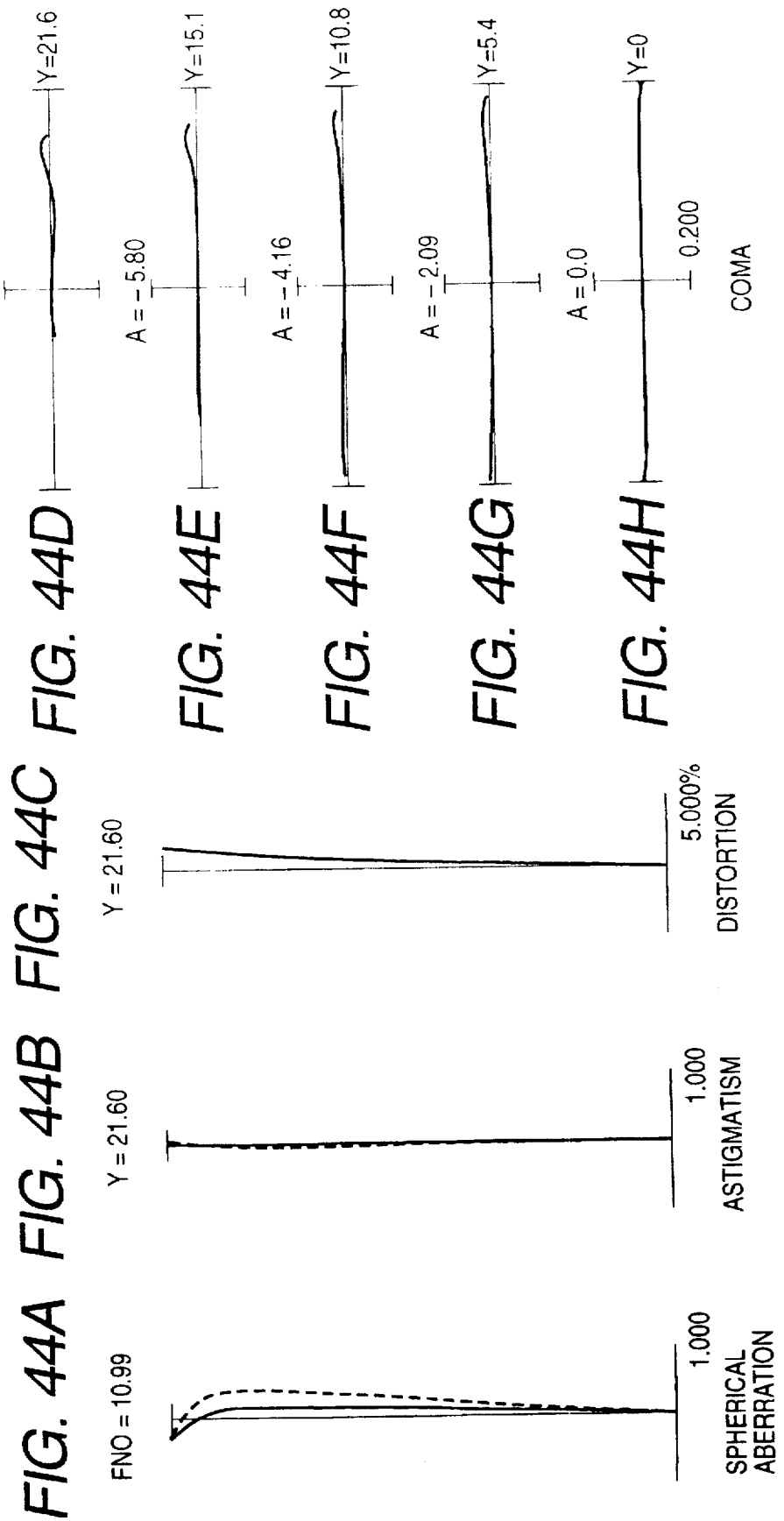

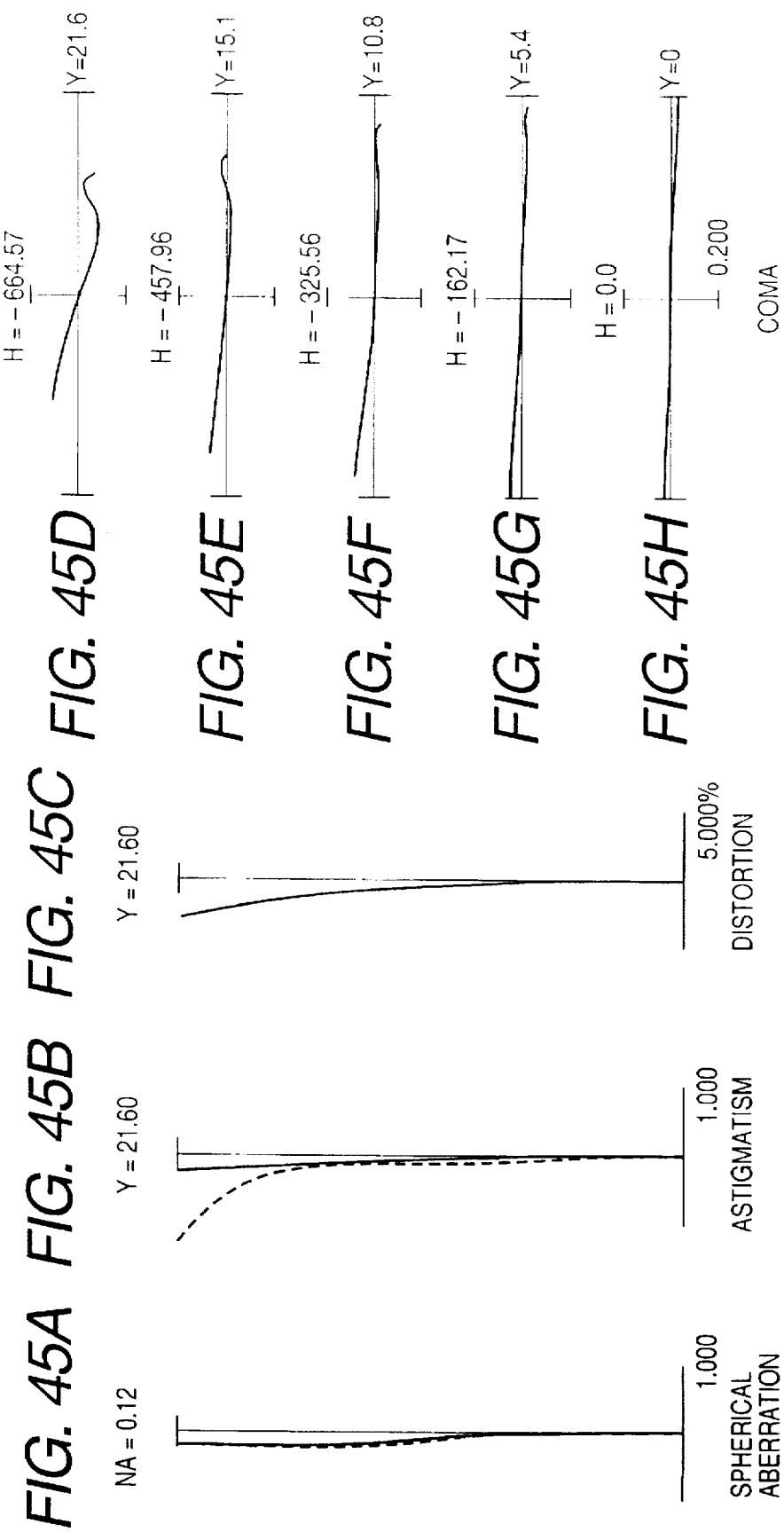

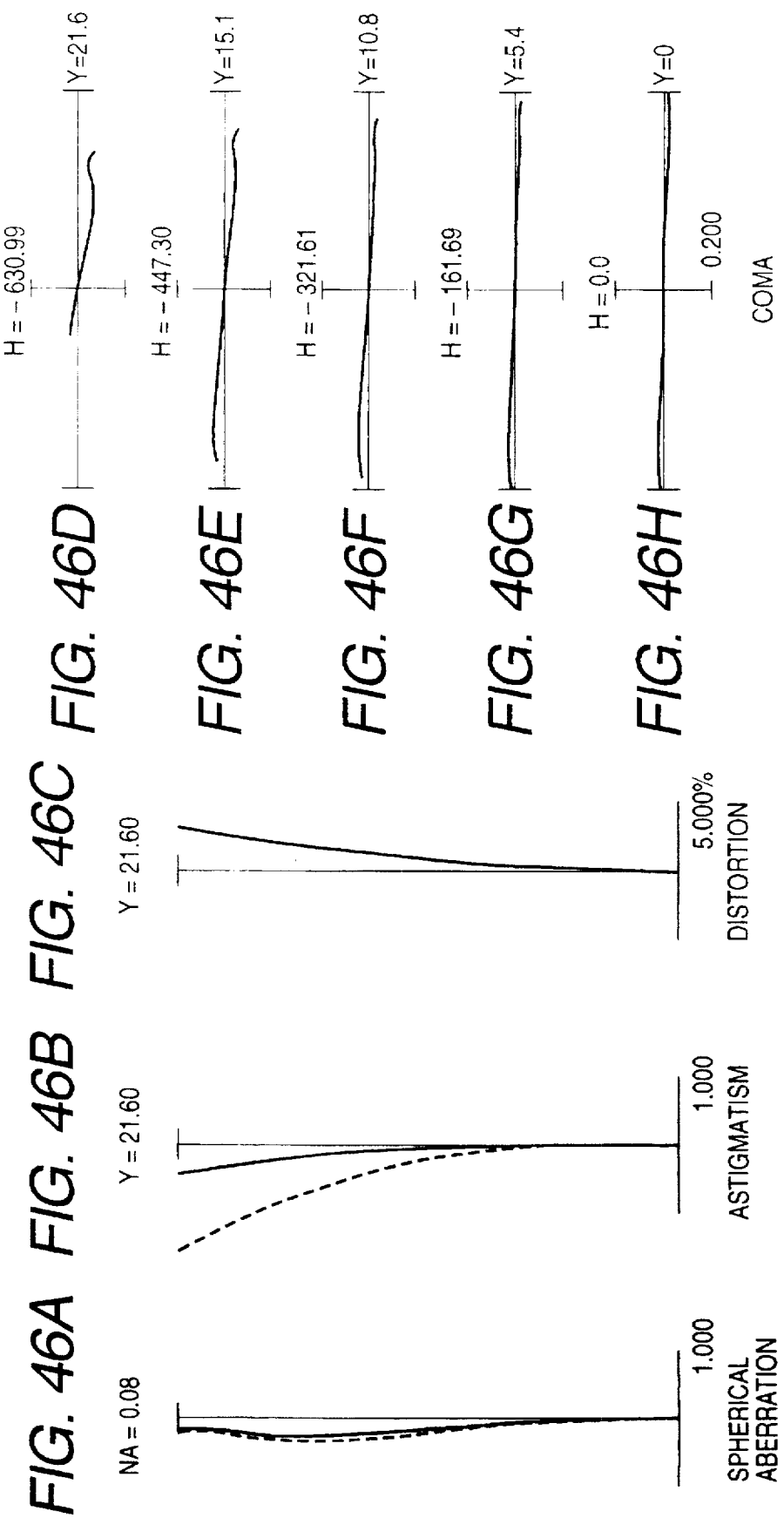

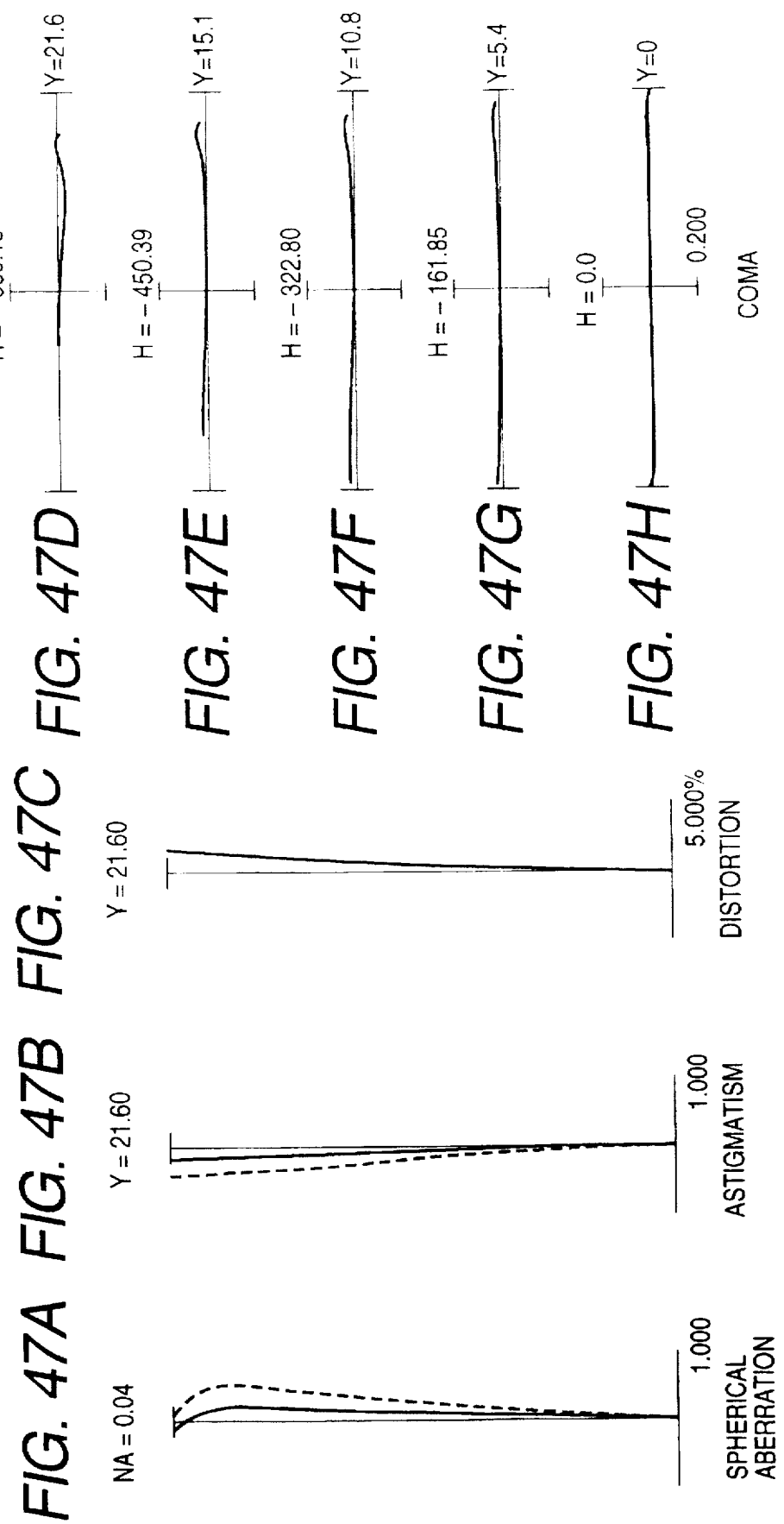

5,748,383

VARIABLE FOCAL LENGTH OPTICAL SYSTEM

BACKGROUND OF THE INVENTION

1. Field of the Invention

The present invention relates to a variable focal length optical system and, more particularly, to a variable focal length optical system that can attain a high zoom ratio and can range a large field angle.

2. Related Background Art

In recent years, a lens-shutter camera normally has a zoom lens. In particular, a camera having a so-called zoom lens with a high zoom ratio of 3× or higher is becoming increasingly popular.

Such zoom lens with a high zoom ratio uses, in many cases, a so-called multi-unit zoom lens having three or more lens units which are movable when the focal length of the lens system is varied. Various proposals have been made concerning zoom lenses which range a field angle around 60° in the maximum wide-angle state.

A lens-shutter camera is required to attain a size reduction, and various proposals associated with zoom lenses suitable for a size reduction have been made.

In a zoom lens, some lens units in the lens system are moved in the optical axis direction to attain a focusing operation with respect to an object at a close distance. A focusing system of this type is classified into (1) a front-focus (FF) system, (2) an inner-focus (IF) system, and (3) a rear-focus (RF) system.

However, in a conventional zoom lens with a high zoom ratio, as the zoom ratio becomes higher, the focal length in the maximum telephoto state increases. As a result, the total lens length increases, and the stop diameter increases, resulting in an increase in size of the camera, and poor portability.

Conversely, when the zoom ratio is to be increased by shortening the focal length in the maximum wide-angle state without increasing the focal length in the maximum telephoto state, the amount of light on the peripheral portion of the frame becomes insufficient due to the cosine-to-the-fourth relationship. Hence, the vignetting must be reduced to avoid the insufficient light amount from standing out. However, since the field angle increases when the focal length in the maximum wide-angle state is shortened, an off-axis light flux that passes through a lens unit separated away from the stop are separated from the optical axis, resulting in a large lens diameter.

In general, as the lens diameter of a focusing lens unit which is driven in a close-distance focusing operation is smaller, the driving mechanism can be made compact more easily. As weight of the focusing lens unit is smaller, the driving force can be smaller, and the driving mechanism can be more simplified. For this reason, it is preferable to constitute the focusing lens unit using a lightweight lens unit with a small lens diameter.

In the multi-unit zoom lens, since the aperture stop is disposed in the vicinity of the center of the lens system, lenses such as a front lens element, a rear lens element, and the like, which are disposed to be separated away from the aperture stop have a large lens diameter. Therefore, when the FF or RF system is used, it is difficult to attain a size reduction of the driving mechanism of the focusing lens unit.

SUMMARY OF THE INVENTION

It is an object of the present invention to provide a variable focal length optical system that can attain a high zoom ratio and can range a large field angle.

It is another object of the present invention to provide a compact variable focal length optical system that can attain a high zoom ratio and can range a large field angle, and suffers less variations in aberration upon focusing on an object at a close distance.

In order to achieve the above objects, according to the first aspect of the present invention, there is provided a variable focal length optical system having, in succession from an object side, a first lens unit G1 having a positive refractive power, a second lens unit G2 having a negative refractive power, a third lens unit G3 having a positive refractive power, a fourth lens unit G4 having a positive refractive power, and a fifth lens unit G5 having a negative refractive power, wherein when a focal length is varied from a maximum wide-angle state to a maximum telephoto state, at least the fifth lens unit G5 moves toward the object side, a first variable air gap between the first lens unit G1 and the second lens unit G2 increases, a second variable air gap between the second lens unit G2 and the third lens unit G3 decreases, a third variable air gap between the third lens unit G3 and the fourth lens unit G4 increases, and a fourth variable air gap between the fourth lens unit G4 and the fifth lens unit G5 decreases, the second lens unit G2 at least has a negative sub lens unit G21 which is disposed at a position closest to the object side and has a negative refractive power, and a sub lens unit G22 which is disposed in the neighborhood of the image side of the negative sub lens unit G21, and the optical system satisfies the following conditions:

$$0.3 < \beta 2t \cdot \beta 2w < 1.0$$

$$0.08 < D2/fw < 0.16$$

where $\beta 2w$ is the lateral magnification of the second lens unit G2 in the maximum wide-angle state, $\beta 2t$ is the lateral magnification of the second lens unit G2 in the maximum telephoto state, D2 is the air gap along the optical axis between the negative sub lens unit G21 and the sub lens unit G22 in the second lens unit G2, and fw is the focal length of the entire optical system in the maximum wide-angle state.

According to a preferred mode of the first aspect of the present invention, the sub lens unit G22 in the second lens unit G2 has a positive refractive power, and the optical system satisfies the following condition:

$$1.5 < (f21 + f22)/f2 < 2.5$$

where f21 is the focal length of the negative sub lens unit G21, f22 is the focal length of the positive sub lens unit G22, and f2 is the focal length of the second lens unit G2.

In order to achieve the above objects, according to the second aspect of the present invention, there is provided a variable focal length optical system having, in succession from an object side, a first lens unit G1 having a positive refractive power, a second lens unit G2 having a negative refractive power, a plurality of lens units, and a final lens unit GR which is disposed at a position closest to the image side and has a negative refractive power, wherein when a focal length is varied from a maximum wide-angle state to a maximum telephoto state, at least the first lens unit G1 and the final lens unit GR move toward the object side, a first variable air gap between the first lens unit G1 and the second lens unit G2 increases, and the plurality of lens units have a positive refractive power as a whole, and a negative lens element with a convex surface facing the object side is arranged at a position closest to the object side in the second lens unit G2.

According to a preferred mode of the second aspect of the present invention, the second lens unit G2 has a negative meniscus lens element with a convex surface facing the object side, a negative lens element with a concave surface facing the object side, and a positive sub lens unit having a positive refractive power.

In order to achieve the above objects, according to the third aspect of the present invention, there is provided a variable focal length optical system which can attain focusing on an object at a close distance, and has, in succession from an object side, a first lens unit G1 having a positive refractive power, a second lens unit G2 having a negative refractive power, a third lens unit G3 having a positive refractive power, a fourth lens unit G4 having a positive refractive power, and a fifth lens unit G5 having a negative refractive power, wherein when a focal length is varied from a maximum wide-angle state to a maximum telephoto state, at least the first lens unit G1 and the fifth lens unit G5 move toward the object side, an air gap between the first lens unit G1 and the second lens unit G2 increases, an air gap between the second lens unit G2 and the third lens unit G3 decreases, and an air gap between the fourth lens unit G4 and the fifth lens unit G5 decreases, and at least the fourth lens unit G4 moves, so that an air gap along an optical axis between the second lens unit G2 and the fourth lens unit G4 decreases, a focusing operation on a close-distance object is performed by moving the fourth lens unit G4 along the optical axis, and the optical system satisfies the following conditions:

$$0.7 < f3/f4 < 1.1$$

$$0.3 < |f2|/(fw \cdot ft)^{1/2} < 0.5$$

where f2 is the focal length of the second lens unit G2, f3 is the focal length of the third lens unit G3, f4 is the focal length of the fourth lens unit G4, fw is the focal length of the entire optical system in the maximum wide-angle state, and ft is the focal length of the entire optical system in the maximum telephoto state.

According to a preferred mode of the third aspect of the present invention, the optical system satisfies the following conditions:

$$0.18 < (\beta 4t/\beta 4w)/Z < 0.38$$

where β4t is the lateral magnification of the fourth lens unit G4 in the maximum telephoto state, β4w is the lateral magnification of the fourth lens unit G4 in the maximum wide-angle state, and Z is the zoom ratio.

Also, at least one of a plurality of lens surfaces that constitute the fourth lens unit G4 is preferably formed to have an aspherical surface shape.

The above and other objects, features and advantages of the present invention will be explained hereinafter and may be better understood by reference to the drawings and the descriptive matter which follows.

BRIEF DESCRIPTION OF THE DRAWINGS

FIGS. 42A to 42H are graphs showing various aberrations in the maximum wide-angle state in the infinity focusing state in the sixth embodiment;

FIGS. 43A to 43H are graphs showing various aberrations in the middle focal length state in the infinity focusing state in the sixth embodiment;

FIGS. 44A to 44H are graphs showing various aberrations in the maximum telephoto state in the infinity focusing state in the sixth embodiment;

FIGS. 45A to 45H are graphs showing various aberrations in the maximum wide-angle state when the phototaking magnification=−1/30× in the sixth embodiment;

FIGS. 46A to 46H are graphs showing various aberrations in the middle focal length state when the phototaking magnification=−1/30× in the sixth embodiment; and FIGS. 47A to 47H are graphs showing various aberrations in the maximum telephoto state when the phototaking magnification=−1/30× in the sixth embodiment.

DETAILED DESCRIPTION OF THE PREFERRED EMBODIMENTS

Figure 1:
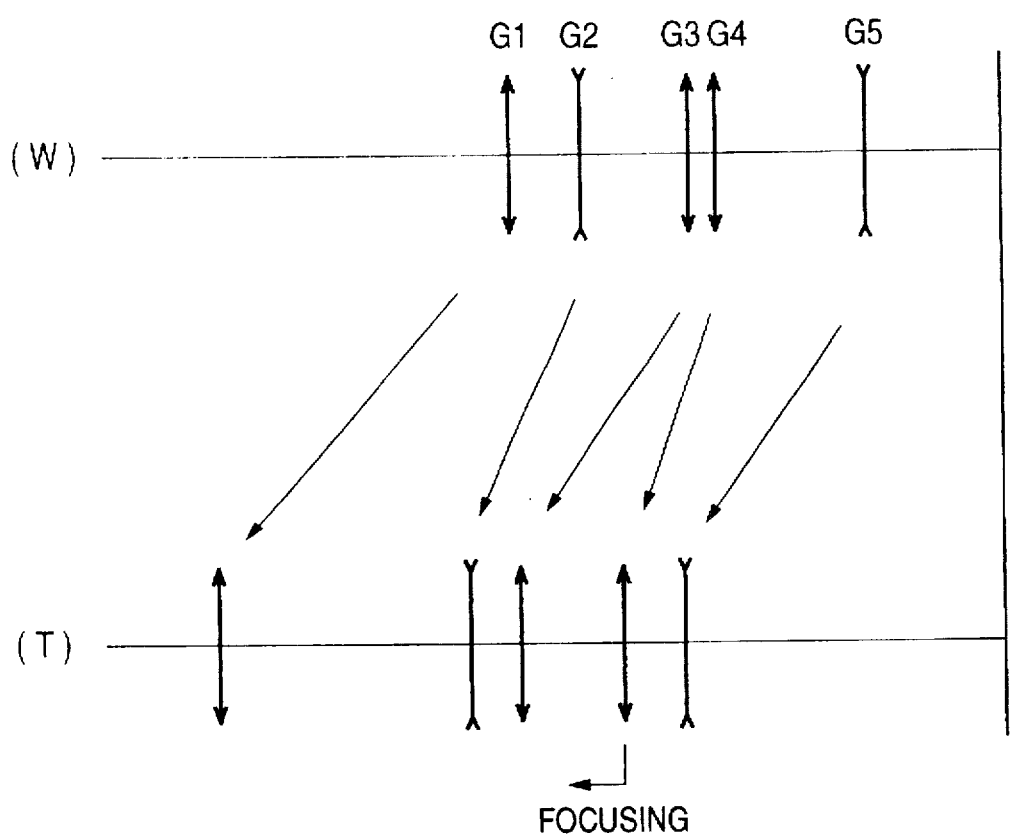
FIG. 1 is a view showing the refractive power arrangement of a variable focal length optical system according to the respective embodiments of the present invention, and the moving states of the respective lens units when the focal length is varied from the maximum wide-angle state (W) to the maximum telephoto state (T)

A general consideration associated with a zoom lens which is suitable for a compact structure and can attain a high zoom ratio will be given below.

In a zoom lens used in a lens-shutter camera or a telephoto zoom lens for a single-lens reflex camera, a compact lens system with a high zoom ratio is required. As a zoom lens that can meet such requirement, a multi-unit zoom lens having three or more movable lens units such as a positive, positive, negative type zoom lens, a positive, negative, positive, negative type zoom lens, or the like is popularly used.

In order to attain a short total lens length, it is preferable to adopt a telephoto type arrangement in which a positive lens unit is disposed at a position closest to the object side in the lens system to obtain a strong convergence effect, and a negative lens unit is disposed at a position closest to the image side to obtain a strong divergence effect.

In particular, a lens-shutter camera has no limitation on the back focus of the photographing lens system unlike in a single-lens reflex camera. Therefore, in many lens systems, in order to attain a small lens diameter and a short total lens length, a negative lens unit is disposed at a position closest to the image side in the photographing lens system. In the maximum wide-angle state, the back focus is shortened so that an off-axis light flux that passes through the negative lens unit separate from the optical axis as the field angle changes, thereby independently correcting on-axis aberration and off-axis aberration. When the focal length is varied from the maximum wide-angle state to the maximum telephoto state, the back focus is increased to change the height of an off-axis light flux that passes through the negative lens unit in correspondence with changes in focal length, thereby suppressing variations in off-axis aberration due to the changes in focal length and obtaining good imaging performance.

In many lens systems, in order to attain a small lens diameter and a short total lens length, a positive lens unit is disposed at a position closest to the object side in the photographing lens system. In the maximum wide-angle state, the interval between the positive lens unit and a lens unit disposed adjacent to the positive lens unit on the image side is shortened, and the total lens length is shortened, so that the height of an off-axis light flux that passes through the positive lens unit becomes close to the optical axis, thereby attaining a small lens diameter. On the other hand, in the maximum telephoto state, the interval between the positive lens unit and the lens unit disposed adjacent to the positive lens unit on the image side is widened, and the positive lens unit is moved toward the object side, so as to realize a telephoto type refractive power arrangement, thereby attaining a short total lens length. Also, the stop is disposed in the vicinity of the center of the lens system between the positive and negative lens units.

In order to shorten the total lens length in the maximum telephoto state, the refractive power of a first lens unit is preferably set to become positive and large, so as to obtain a large convergence effect. However, since the refractive power of the first lens unit is positive and strong, an off-axis light flux that passes through the first lens unit separate from the optical axis. As a result, the lens diameter undesirably increases to obtain a predetermined marginal light amount.

Therefore, in a conventional positive, positive, negative type zoom lens, or a positive, negative, positive, negative type zoom lens, a negative lens unit is disposed at a position closest to the object side to attain a small lens diameter. However, this arrangement results in an increase in total lens length in the maximum telephoto state. Consequently, the field angle in the maximum wide-angle state can only be increased up to about 60°.

In a positive, negative, positive, positive, negative type zoom lens disclosed in Japanese Patent Application Laid-Open No. 7-27979 filed by the present applicant, a lens chamber that holds a second lens unit, and a lens chamber that holds a fourth lens unit are integrated, and the second and fourth lens units are driven integrally when the focal length is varied. A third lens unit is used as a focusing lens unit, and is driven by a single driving system in the optical axis direction relative to the second lens unit either when the focal length is varied or when the focusing operation is performed. With a zoom lens of this arrangement, the second lens unit is attached on the object side of a unit including the driving system for driving the third lens unit in the optical axis direction, and the fourth lens unit is attached on the image side of the unit, thus realizing a lens barrel structure that can move the third lens unit relative to the unit. In this manner, this zoom lens can attain a high zoom ratio and high performance although it has the same lens barrel structure as that of a 3-unit type zoom lens such as a positive, positive, negative type zoom lens. However, since the degree of freedom of choice of the zoom locus is decreased, the refractive powers of the respective lens units strengthen to attain a higher zoom ratio, and deterioration of performance due to decentering of the respective lens units with respect to each other tends to become considerable.

Therefore, in the present invention, a second lens unit G2 and a fourth lens unit G4 are independently driven when the focal length is varied, thereby weakening the refractive powers of the respective lens units.

In general, a focusing lens unit is driven by a focusing driving system independently of other lens units. When the focal length is varied, since the lens position precision, in the optical axis direction, of the focusing driving system does not change although the focal length of the entire optical system changes, the field depth in the maximum telephoto state becomes smaller than that in the maximum wide-angle state.

Therefore, in the case of the FF system in which the lens driving amount becomes constant in both the maximum wide-angle state and the maximum telephoto state, when a high zoom ratio is to be attained, the maximum wide-angle state requires only very low lens position precision, but the maximum telephoto state requires very high lens position precision, resulting in inefficient control of the focusing lens unit.

On the other hand, in the IF or RF system, the lateral magnification of the focusing lens unit changes in correspondence with changes in focal length. Therefore, when changes in lateral magnification of the focusing lens unit when the focal length is varied from the maximum wide-angle state to the maximum telephoto state are set to have an appropriate magnitude (range), the required position precision of the focusing lens unit can be set to roughly equal each other over the entire variable focal length range.

When the RF system is used, the lateral magnification of a fifth lens unit, which is disposed at a position closest to the image side in the lens system, is always larger than unity while the focal length is being varied, and this lens unit is used for magnifying an image. Hence, the focusing moving amount in the maximum telephoto state becomes extremely smaller than that in the maximum wide-angle state, resulting in difficult control of the focusing lens unit.

For these reasons, the present invention adopts the IF system which can attain a size reduction of the driving mechanism of the focusing lens unit. In this manner, even when the variable focal length optical system according to the present invention is built in a camera main body, a size reduction of the camera main body can be realized. When the changes in lateral magnification of the focusing lens unit upon varying the focal length are set to fall within an appropriate range, a change in required lens position precision of the focusing lens unit upon varying the focal length can be reduced, thus allowing efficient control of the focusing lens unit.

In the present invention, it is preferable that the lateral magnification, β, of the focusing lens unit do not include any lens position state that yields |β|=1, and do not have any extreme value with respect to the focal length from the maximum wide-angle state to the maximum telephoto state.

In general, the moving amount, Δ, of the focusing lens unit is given by the following formula (a):

$$\Delta = \{\beta^2/(\beta^2-1)\} \cdot \delta \qquad (a)$$

where δ is the moving amount of an object image by a lens unit disposed on the object side of the focusing lens unit, and β is the lateral magnification of the focusing lens unit.

If $k=\beta^2/(\beta^2-1)$ in formula (a), the value of k satisfies formulas (b) and (c) below depending on the value of $\beta^2$:

$$1 \leq k \quad (\beta^2 > 1) \qquad (b)$$

$$0 > k \quad (\beta^2 < 1) \qquad (c)$$

Therefore, in order to reduce the focusing moving amount Δ, 1/β must be made close to 0 when |β|>1. On the other hand, when |β|<1, β must be made close to 0.

When 1/|β| becomes extremely large (|β|>1) or |β| becomes extremely small (|β|<1) upon varying the focal length from the maximum wide-angle state to the maximum telephoto state, the focusing moving amount required for setting a focus state with respect to an identical object becomes extremely small in the maximum telephoto state as compared to that in the maximum wide-angle state. When 1/|β| becomes extremely small (|β|>1) or |β| becomes extremely large (|β|<1), the moving amount required for setting a focus state with respect to an identical object becomes extremely large in the maximum telephoto state as compared to that in the maximum wide-angle state. In either case, since the required position precision of the focusing lens unit required in terms of the lens position control considerably differs between the maximum wide-angle state and the maximum telephoto state, the position control of the focusing lens unit cannot be efficiently performed.

The functions of the respective lens units that constitute the variable focal length optical system according to the present invention will be explained below.

As in a conventional multi-unit zoom lens, in a variable focal length optical system of the present invention as well, a negative lens unit is disposed at a position closest to the image side in the optical system. In the shortest focal length state (maximum wide-angle state), since the back focus is shortened, the height of an off-axis light flux that passes through the negative lens unit is changed depending on the field angle, and on-axis aberration and off-axis aberration are independently corrected. In this case, if the back focus is extremely shortened, an off-axis light flux that passes through the negative lens unit separates too much from the optical axis, and the lens diameter cannot be reduced. Dust becomes easily attached to the lens surface closest to the image side. In this case, if the back focus is too short, dust attached to the lens surface is also printed in a picture. Therefore, it is important to set an appropriate back focus in the maximum wide-angle state.

Conversely, in the longest focal length state (maximum telephoto state), the back focus is increased. More specifically, when the focal length of the optical system changes from the shortest focal length state to the longest focal length state, the negative lens unit is moved toward the object side, so that the height of an off-axis light flux that passes through the negative lens unit in the longest focal length state is made closer to the optical axis than in the shortest focal length state, thereby minimizing variations in off-axis aberration generated upon changing the focal length of the optical system.

In the first and second aspects of the present invention, in order to simultaneously range a large field angle and attain a short total lens length in the maximum telephoto state, a variable focal length optical system comprises, in succession from an object side, a first lens unit having a positive refractive power, a second lens unit having a negative refractive power, a positive sub system which is constituted by a plurality of lens units, and in which air gaps between adjacent lens units change upon changing the focal length of the lens system, and a negative lens unit disposed at a position closest to the image side in the lens system. These lens units serve to satisfy the following five conditions (I) to (V).

(I) The second lens unit is constituted by a negative sub lens unit disposed at the object side and a positive sub lens unit disposed on the image side of the negative sub lens unit, and the two sub lens units are disposed to be separated by an appropriate air gap.

(II) An aperture stop is disposed near the positive sub system, and the gap between the second lens unit and the aperture stop is decreased when the focal length is varied from the maximum wide-angle state to the maximum telephoto state.

(III) The negative lens unit is disposed at the position closest to the image side, and is moved toward the object side, so that the lateral magnification of the negative lens unit becomes positive and large, upon varying the focal length of the lens system from the maximum wide-angle state to the maximum telephoto state.

(IV) The synthetic refractive power of the positive sub system is designed to become positive and weak when the focal length of the lens system changes from the maximum wide-angle state to the maximum telephoto state.

(V) At least the first lens unit is moved toward the object side to increase the air gap between the first and second lens units, when the focal length of the lens system changes from the maximum wide-angle state to the maximum telephoto state.

In the first and second aspects of the present invention, the negative sub lens unit disposed at the object side and the positive sub lens unit disposed at the image side constitute the second lens unit, and the aperture stop is disposed at the image side of the second lens unit. Especially, in the maximum wide-angle state, by decreasing the air gap between the first and second lens units, an off-axis light flux that passes through the first lens unit are made close to the optical axis. Since the second lens unit has a negative-positive refractive power arrangement, an off-axis light flux that passes through the first lens unit are made closer to the optical axis, thus attaining a small lens diameter.

Since the negative sub lens unit disposed at the object side and the positive sub lens unit disposed at the image side constitute the second lens unit, the principal point position of the second lens unit can be set at a lens position near the object. As a result, positive distortion can be corrected, and an appropriate back focus can be obtained.

Furthermore, since the gap between the first and second lens units is increased upon changing the focal length from the maximum wide-angle state to the maximum telephoto state, the refractive power arrangement of the entire lens system can be shifted to the telephoto type, thereby shortening the total lens length.

In the maximum telephoto state, since the lens system has a telephoto type refractive power arrangement, an off-axis light flux that passes through the first lens unit are separated away from the optical axis. For this reason, since the stop is made close to the second lens unit that diverges an off-axis light flux, the off-axis light flux that passes through the first lens unit can be made close to the optical axis, thereby attaining a small lens diameter.

In addition, a decrease in air gap along the optical axis between the negative and positive sub lens units is advantageous for shortening the total lens length but considerably deteriorates performance due to decentering among the lens units, as described above. In view of this problem, in the present invention, the air gap along the optical axis between the negative and positive sub lens units is increased, and the focal length of the second lens unit is appropriately set.

For these reasons, conditions (I) and (II) are required.

Conventionally, in a lens system such as a lens shutter system which has no limitation on the back focus, when the focal length changes from the maximum wide-angle state to the maximum telephoto state, a negative lens unit disposed at a position closest to the image side is moved toward the object side to decrease the gap between the negative lens unit and the principal point position of all lens units disposed on the object side of the negative lens unit. In this manner, the negative lens unit is used for magnifying an image not only to satisfactorily suppress variations in off-axis aberration upon varying the focal length but also to effectively perform a variable focal length effect. Therefore, in the present invention as well, the negative lens unit is disposed at the position closest to the image side, and condition (III) is necessary.

As an index for shortening of the total lens length, the telephoto ratio is known. The telephoto ratio is a value obtained by dividing the total lens length by the focal length of the entire lens system. In order to decrease the telephoto ratio, it is important to appropriately set the refractive power of a positive lens unit disposed at the object side, the refractive power of a negative lens unit disposed at the image side, and the principal point interval between these two lens units.

In the present invention, the convergence effect, i.e., the synthetic refractive power, in the maximum telephoto state, of the positive sub system disposed on the image side of the second lens unit and including a plurality of positive lens units is set to be weaker than that in the maximum wide-angle state. In addition, since lens units from the second lens unit to the negative lens unit disposed at the position closest to the image side have a negative synthetic refractive power, a telephoto type refractive power arrangement is realized, and the telephoto ratio is set to be 1 or less.

In the maximum wide-angle state, the refractive power arrangement is constituted by a negative sub system including the first and second lens units, the positive sub system including a plurality of positive lens units, and the negative lens unit disposed at the position closest to the image side. As a result, in the maximum wide-angle state, a predetermined focal length cannot be obtained unless the positive sub system has a strong positive refractive power. Therefore, the present invention adopts an arrangement in which the refractive power of the positive sub system in the maximum wide-angle state is set to be positive and stronger than in the maximum telephoto state.

For these reasons, condition (IV) is important.

In the present invention, a negative, positive, negative (symmetric type) refractive power arrangement is realized in the maximum wide-angle state, and a positive, negative (telephoto type) refractive power arrangement is realized in the maximum telephoto state. In the maximum wide-angle state, since the total lens length is shortened, an off-axis light flux that passes through the first lens unit are made close to the optical axis, thereby reducing the lens diameter. In the maximum telephoto state, in order to effectively utilize the convergence effect of the first lens unit to shorten the total lens length, the gap between the first and second lens units preferably increases upon varying the focal length from the maximum wide-angle state to the maximum telephoto state, and the first lens unit is preferably moved toward the object side. Therefore, in the present invention, condition (V) is necessary.

In the third aspect of the present invention, in order to achieve a variable focal length optical system which has a compact structure and high zoom ratio, and suffers less variations in aberrations in a close-distance focusing operation, the optical system has, in succession from an object side, a first lens unit G1 having a positive refractive power, a second lens unit G2 having a negative refractive power, a third lens unit G3 having a positive refractive power, a fourth lens unit G4 having a positive refractive power, and a fifth lens unit G5 having a negative refractive power, and these lens units serve to satisfy the following five conditions (VI) to (X).

(VI) The lateral magnification of the fourth lens unit G4 serving as a focusing lens unit is set to be an appropriate value over the variable focal length range from the maximum wide-angle state to the maximum telephoto state.

(VII) The aperture stop is disposed in the vicinity of the fourth lens unit G4.

(VIII) A negative lens unit (fifth lens unit G5) is disposed at a position closest to the image side, and is moved toward the object side, so that the lateral magnification of the negative lens unit becomes positive and large, when the focal length of the optical system changes from the maximum wide-angle state to the maximum telephoto state.

(IX) The synthetic refractive power of the third lens unit G3 and the fourth lens unit G4 is set to be positive and weak when the focal length of the optical system changes from the maximum wide-angle state to the maximum telephoto state.

(X) At least the first lens unit G1 is moved toward the object side to increase the air gap between the first lens unit G1 and the second lens unit G2, when the focal length of the optical system changes from the maximum wide-angle state to the maximum telephoto state.

As described above, in order to attain efficient lens position control of the focusing lens unit, it is important to appropriately set the lateral magnification of the fourth lens unit G4 as the focusing lens unit over the entire variable focal length range, and condition (VI) is necessary.

If the aperture stop is disposed at a position separated from the fourth lens unit G4, the height of an off-axis light flux that passes through the fourth lens unit G4 changes largely in correspondence with variations in object position, and hence, variations in off-axis aberrations become large. Therefore, when the aperture stop is disposed in the vicinity of the fourth lens unit G4 in accordance with condition (VII), variations in aberration in a close-distance focusing operation can be suppressed.

Conditions (VIII) to (X) essentially correspond to conditions (III) to (V) described above. Therefore, a detailed description thereof will be omitted.

Conditional formulas of the present invention will be explained below.

In the first aspect of the present invention, the optical system satisfies the following conditional formulas (1) and (2):

$$0.3 < \beta_{2t} \cdot \beta_{2w} < 1.0 \qquad (1)$$

$$0.08 < D2/fw < 0.16 \qquad (2)$$

where $\beta_{2w}$: the lateral magnification of the second lens unit G2 in the maximum wide-angle state $\beta_{2t}$: the lateral magnification of the second lens unit G2 in the maximum telephoto state D2: the air gap along the optical axis between a negative sub lens unit G21 and a sub lens unit G22 in the second lens unit G2 fw: the focal length of the entire optical system in the maximum wide-angle state Conditional formula (1) defines the lateral magnification of the second lens unit G2 over the entire variable focal length range from the maximum wide-angle state to the maximum telephoto state.

When $\beta_{2t} \cdot \beta_{2w}$ exceeds the upper limit value of conditional formula (1), the synthetic refractive power of the first lens unit G1 and the second lens unit G2 becomes negative and weak in the maximum wide-angle state, and a sufficient back focus cannot be obtained.

On the contrary, when $\beta_{2t} \cdot \beta_{2w}$ is smaller than the lower limit value of conditional formula (1), the synthetic refractive power of the first lens unit G1 and the second lens unit G2 becomes negative and strong in the maximum telephoto state, and the total lens length cannot be shortened.

Conditional formula (2) defines the air gap along the optical axis between the negative sub lens unit G21 disposed at a position closest to the object side in the second lens unit, and the sub lens unit G22 disposed on the image side of the lens unit G21.

When D2/fw exceeds the upper limit value of conditional formula (2), the total lens length in the maximum telephoto state becomes too large.

On the other hand, when D2/fw is smaller than the lower limit value of conditional formula (2), an off-axis light flux that passes through the first lens unit G1 separate from the optical axis in the maximum wide-angle state, resulting in an increase in lens diameter. Furthermore, since large off-axis aberration is generated in the first lens unit G1, a larger number of lenses are required to obtain required optical performance.

In general, since a lens system including a wide-angle range ranges large field angle, high optical performance cannot be obtained unless both the optical performance at the central portion of the frame and the optical performance at the peripheral portion of the frame are sufficiently high. In particular, in order to obtain high optical performance over the entire frame, variations in coma depending on the field angle must be suppressed.

In the first aspect of the present invention, in order to suppress variations in coma depending on the field angle in the maximum wide-angle state and to reduce a lens diameter, the sub lens unit G22 in the second lens unit G2 preferably has a positive refractive power, and preferably satisfies the following conditional formula (3):

$$1.5 < (|f21|+f22)/|f2| < 2.5 \quad (3)$$

where f21: the focal length of the negative sub lens unit G21 f22: the focal length of the positive sub lens unit G22 f2: the focal length of the second lens unit G2

Conditional formula (3) defines the sum of the focal lengths of the negative sub lens unit G21 and the positive sub lens unit G22 which constitute the second lens unit G2.

The second lens unit G2 is one of the lens units, the lateral magnifications of which change largely when the focal length is varied from the maximum wide-angle state to the maximum telephoto state, and has a relatively strong refractive power to obtain a sufficiently large back focus in the maximum wide-angle state.

In the first aspect of the present invention, the refractive power of the sub lens unit G21, which is disposed at a position closest to the object side in the second lens unit G2, is set to be negative and stronger than that of the second lens unit G2, and the sub lens unit G22 disposed on the image side of the sub lens unit G21 has a positive refractive power. With this arrangement, not only on-axis aberrations are satisfactorily corrected, but also the principal point position of the second lens unit G2 is located on the object side of the lens system to obtain a sufficiently large back focus in the maximum wide-angle state. In addition, nearly a symmetric type refractive power arrangement is realized to suppress positive distortion.

When (|f21|+f22)/|f2| exceeds the upper limit value of conditional formula (3), since an off-axis light flux that passes through the second lens unit G2 separate from the optical axis in the maximum wide-angle state, the lens diameter must be increased to assure a predetermined marginal light amount.

On the contrary, when (|f21|+f22)/|f2| is smaller than the lower limit value of conditional formula (3), since an off-axis light flux that passes through the second lens unit G2 approach the optical axis in the maximum wide-angle state, the lens diameter can be reduced. However, the difference between the heights of the off- and on-axis light fluxes that pass through the second lens unit G2 becomes small, and variations in coma depending on the field angle cannot be suppressed.

In the first aspect of the present invention, in order to obtain a back focus large enough to reduce the lens diameter in the maximum wide-angle state and to shorten the total lens length in the maximum telephoto state, the optical system preferably satisfies the following conditional formula (4):

$$1 < |f12|/fw < 2 \quad (4)$$

where f12: the synthetic focal length of the first lens unit G1 and the second lens unit G2 in the maximum wide-angle state Conditional formula (4) defines the synthetic refractive power of the first lens unit G1 and the second lens unit G2 in the maximum wide-angle state.

When |f12|/fw exceeds the upper limit value of conditional formula (4), a sufficient back focus cannot be obtained in the maximum wide-angle state, and an off-axis light flux that passes through the fifth lens unit G2 separate from the optical axis, resulting in a large lens diameter. Also, an optical image of dust on a photosensitive member is reflected by the lens surface at a position closest to the image surface, and is printed on the photosensitive member.

On the contrary, when |f12|/fw is smaller than the lower limit value of conditional formula (4), the total lens length in the maximum telephoto state becomes large.

According to the second aspect of the present invention, a plurality of lens units are disposed between the second lens unit G2 and the final lens unit GR disposed at a position closest to the image side. The synthetic focal length of these lens units is kept positive while the focal length is being varied, and increases when the focal length of the entire lens system changes from the shortest focal length state (maximum wide-angle state) to the longest focal length state (maximum telephoto state). A lens element with a convex surface facing the object side is disposed at a position closest to the object side in the second lens unit G2.

In the arrangement of the second aspect, in order to range a large field angle and attain a high zoom ratio, the optical system preferably satisfies the following conditional formula (5):

$$0.5 < |f2|/fw < 0.9 \quad (5)$$

The first lens unit G1 has a positive refractive power. Therefore, in the maximum wide-angle state in which the incident angle of an off-axis light flux is large, the off-axis light flux exits the first lens unit G1 at a larger angle, and enter the second lens unit G2. For this reason, since the lens element disposed at the position closest to the object side in the second lens unit G2 has a convex surface facing the object side, a large field angle can be ranged while suppressing generation of off-axis aberration.

Conditional formula (5) defines the focal length of the second lens unit G2.

When |f2|/fw exceeds the upper limit value of conditional formula (5), the divergence effect of the second lens unit G2 becomes weak, and a sufficient back focus cannot be obtained in the maximum wide-angle state, resulting in a large lens diameter of the fifth lens unit G5.

On the contrary, when |f2|/fw is smaller than the lower limit value of conditional formula (5), an off-axis light flux that passes through the second lens unit G2 approach the optical axis in the maximum wide-angle state. As a result, the difference between the heights of the off- and on-axis light fluxes that pass through the second lens unit G2 becomes excessively small, and on- and off-axis aberrations cannot be independently corrected, resulting in insufficient optical performance.

Note that the lower limit value of conditional formula (5) is preferably set to be 0.58 to obtain higher performance.

The second lens unit G2 preferably has, in succession from an object side, a negative meniscus lens with a convex surface facing the object side, a negative lens with a concave surface facing the object side, and a positive sub lens unit having a positive refractive power.

As described above, the lens element disposed at the position closest to the object side in the second lens unit G2 has a convex surface facing the object side, and its refractive power is too low to obtain a sufficient back focus in the maximum wide-angle state. For this reason, the negative lens with a concave surface facing the object side is disposed on the image side of this lens element, so as to obtain a sufficient back focus. Furthermore, in order to satisfactorily correct on-axis aberration generated by only the second lens unit G2, the positive sub lens unit having a positive refractive power is disposed on the image side of the two negative lenses.

Note that the two negative lenses disposed in the second lens unit G2 may be replaced by a larger number of lenses to attain higher performance, needless to say.

In the third aspect of the present invention, the optical system satisfies the following conditional formulas (6) and (7):

$$0.7 < f3/f4 < 1.1 \quad (6)$$

$$0.3 < |f2|/(fw \cdot ft)^{1/2} < 0.5 \quad (7)$$

where f2: the focal length of the second lens unit G2
f3: the focal length of the third lens unit G3
f4: the focal length of the fourth lens unit G4
fw: the focal length of the entire optical system in the maximum wide-angle state
ft: the focal length of the entire optical system in the maximum telephoto state Conditional formula (6) defines an appropriate range of the ratio between the focal lengths of the third lens unit G3 and the fourth lens unit G4.

When the ratio exceeds the upper limit value of conditional formula (6), the convergence effect of the third lens unit G3 becomes weak, and the total lens length in the maximum telephoto state becomes large.

On the contrary, when the ratio is smaller than the lower limit value of conditional formula (6), the convergence effect of the third lens unit G3 becomes strong, and the lateral magnification of the fourth lens unit G4 becomes close to unity. As a result, the focusing moving amount of the fourth lens unit G4 becomes large.

Conditional formula (7) defines an appropriate range of the focal length of the second lens unit G2.

When $|f2|/(fw \cdot ft)^{1/2}$ exceeds the upper limit value of conditional formula (7), since the divergence effect of the second lens unit G2 becomes weak, a sufficient back focus cannot be obtained in the maximum wide-angle state, and the lens diameter of the fifth lens unit G5 becomes large.

On the other hand, when $|f2|/(fw \cdot ft)^{1/2}$ is smaller than the lower limit value of conditional formula (7), the divergence effect of the second lens unit G2 becomes strong, and an off-axis light flux that passes through the second lens unit G2 approach the optical axis. As a result, it becomes difficult to independently correct on- and off-axis aberrations.

In the third aspect of the present invention, in order to realize efficient position control of the focusing lens unit, the optical system preferably satisfies the following conditional formula (8):

$$0.18 < (\beta 4t/\beta 4w)/Z < 0.38 \quad (8)$$

where

β4t: the lateral magnification of the fourth lens unit G4 in the maximum telephoto state
β4w: the lateral magnification of the fourth lens unit G4 in the maximum wide-angle state
Z: the zoom ratio Conditional formula (8) defines the change amount of the lateral magnification of the G4 when the focal length is varied.

When $(\beta 4t/\beta 4w)/Z$ exceeds the upper limit value of conditional formula (8), the focusing moving amount in the maximum telephoto state becomes extremely larger than that in the maximum wide-angle state. On the contrary, when $(\beta 4t/\beta 4w)/Z$ is smaller than the lower limit value of conditional formula (8), the focusing moving amount in the maximum wide-angle state becomes extremely large. As a result, in either case, the lens position control of the focusing lens unit cannot be efficiently performed.

In order to perform the lens position control of the focusing lens unit more efficiently, the upper limit value of conditional formula (8) is preferably set to be 0.3.

Furthermore, in the third aspect of the present invention, in order to satisfactorily correct variations in various aberrations generated in a close-distance focusing state, at least one lens surface of the fourth lens unit G4 as the focusing lens unit is preferably formed to be an aspherical shape.

The second lens unit G2 preferably has a negative sub unit and a positive sub unit disposed on the image side of the negative sub unit. With this arrangement, since the image-side principal point position of the second lens unit can be moved toward the object side, a sufficiently large back focus can be assured in the maximum wide-angle state.

At this time, since the positive sub unit is preferably constituted by at least one positive lens and at least one negative lens. Note that in the respective states from the maximum wide-angle state to the maximum telephoto state, an off-axis light flux that passes through the second lens unit G2 undergo a large change in incident angle to the second lens unit G2 but do not undergo a large change in incident height (from the optical axis). Therefore, it is preferable to satisfactorily correct aberrations generated in only the second lens unit G2. In the arrangement of the present invention, since an off-axis light flux that passes through the second lens unit G2 pass a position at a height level close to the optical axis, the positive sub unit is preferably constituted by at least one positive lens and at least one negative lens so as to correct positive spherical aberration generated by the second lens unit G2 alone. Note that the second lens unit G2 may be constituted by a larger number of lenses to attain higher performance, needless to say.

In the present invention, as described above, the lateral magnification of the fifth lens unit G5 (or the final lens unit GR) changes more largely than those of other lens units when the focal length is varied. Therefore, in order to attain high performance, the fifth lens unit G5 must solely perform aberration correction more satisfactorily. In order to suppress generation of spherical aberration, the fifth lens unit G5 is preferably constituted by at least one positive lens and at least one negative lens. In order to reduce the diameter of a lens element at a position closest to the image side in the optical system, it is preferable that the positive lens be disposed at a position closest to the object side in the fifth lens unit G5, and the negative lens be disposed at a position closet to the image surface in the fifth lens unit G5. Also, higher performance can be attained when an aspherical surface is used in the fifth lens unit G5. Furthermore, when the positive lens in the fifth lens unit G5 comprises an aspherical surface lens using a plastic material, not only high performance, but also weight and cost reductions can be simultaneously attained.

From another viewpoint, in the present invention, a vibration detection system that detects vibrations of the optical system and its driving system can be combined with the lens system, so as to prevent photographing errors caused by image vibrations due to, e.g., camera shake which readily occurs in a zoom lens with a high zoom ratio. An image is shifted by decentering all or some lens elements of one of lens units that constitute the optical system to serve as a shift lens unit, so as to correct image vibrations (variations in image position) caused by vibrations of the optical system detected by the vibration detection system. In this manner, the variable focal length optical system of the present invention can serve as a so-called anti-vibration optical system.

Furthermore, in the present invention, some lens units that constitute the lens system can attain focusing. In particular, it is preferable to attain focusing using lens units, which are disposed on the object side of the shift lens unit and on the image side of the first lens unit.

The variable focal length optical system according to the present invention can be applied not only to a zoom lens but also to a variable focal zoom lens in which the focal length state is not continuous, needless to say.

The embodiments of the present invention will be described below with reference to the accompanying drawings.

FIG. 1 shows the refractive power arrangement of the variable focal length optical system according to the respective embodiments of the present invention, and the moving states of the respective lens units when the focal length is varied from the maximum wide-angle state (W) to the maximum telephoto state (T).

As shown in FIG. 1, in each embodiment, the variable focal length optical system of the present invention comprises, in succession from an object side, a first lens unit G1 having a positive refractive power, a second lens unit G2 having a negative refractive power, a third lens unit G3 having a positive refractive power, a fourth lens unit G4 having a positive refractive power, and a fifth lens unit G5 having a negative refractive power. Upon varying the focal length from the maximum wide-angle state to the maximum telephoto state, the respective lens units move toward the object side, so that the air gap between the first lens unit G1 and the second lens unit G2 increases, the air gap between the second lens unit G2 and third lens unit G3 decreases, the air gap between the third lens unit G3 and the fourth lens unit G4 increases, and the air gap between the fourth lens unit G4 and the fifth lens unit G5 decreases. Note that the air gap along the optical axis between the second lens unit G2 and the fourth lens unit G4 decreases upon varying the focal length from the maximum wide-angle state to the maximum telephoto state. On the other hand, the fourth lens unit G4 is moved along the optical axis to attain focusing on an object at a close distance.

In each embodiment, an aspherical surface is expressed by the following formula (d):

$$S(y) = (y^2/R)/\{1 + (1 - \kappa \cdot y^2/R^2)^{1/2}\} + C_4 \cdot y^4 + C_6 \cdot y^6 + C_8 \cdot y^8 + C_{10} \cdot y^{10} + \ldots \quad (d)$$

where y is the height in a direction perpendicular to the optical axis, S(y) is the displacement (sag) in the optical axis direction at the height y, R is the reference radius of curvature (radius of curvature at the apex), $\kappa$ is a coefficient of cone, and Cn is an n-th order aspherical surface coefficient.

Each embodiment, the aspherical surface is indicated by a mark * appended on the right side of its surface number.

[First Embodiment]

Figure 2:
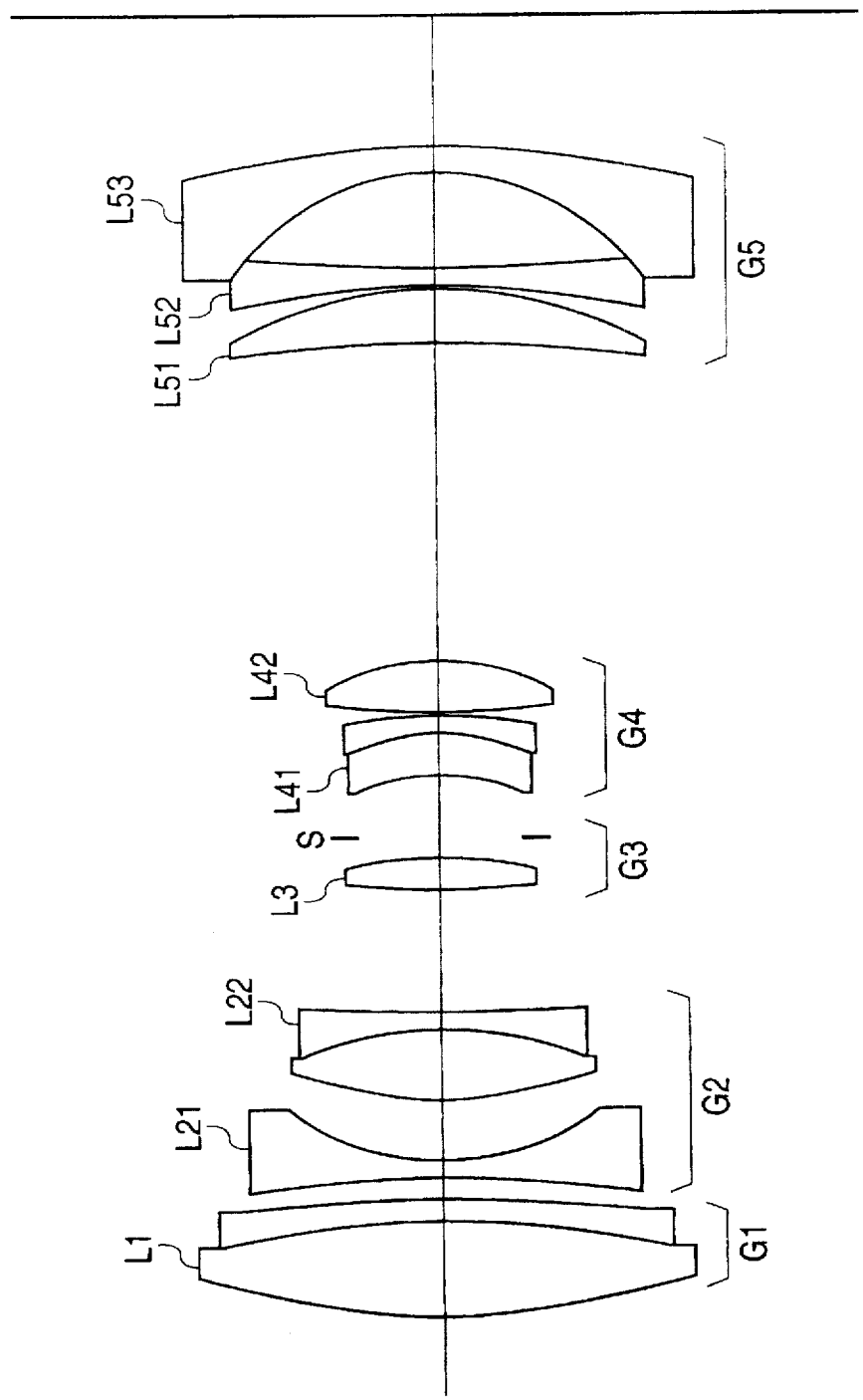
FIG. 2 is a schematic view showing the arrangement of a variable focal length optical system according to the first embodiment of the present invention.
Figure 3:
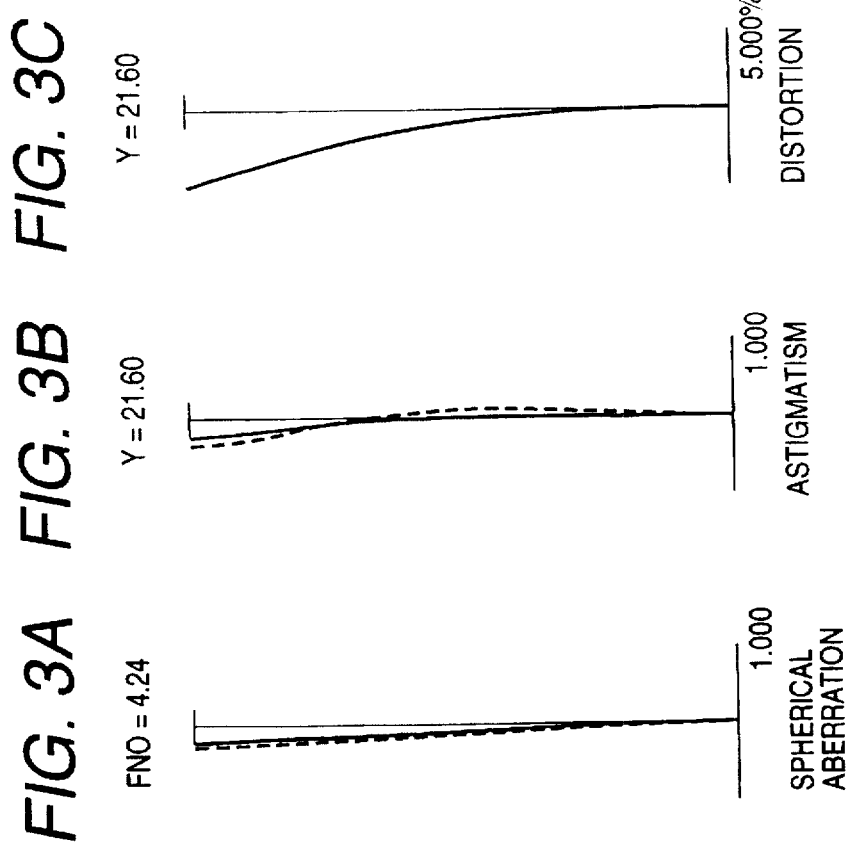
FIGS. 3A to 3H are graphs showing various aberrations in the maximum wide-angle state upon focusing on an object at infinity distance in the first embodiment.
Figure 4:
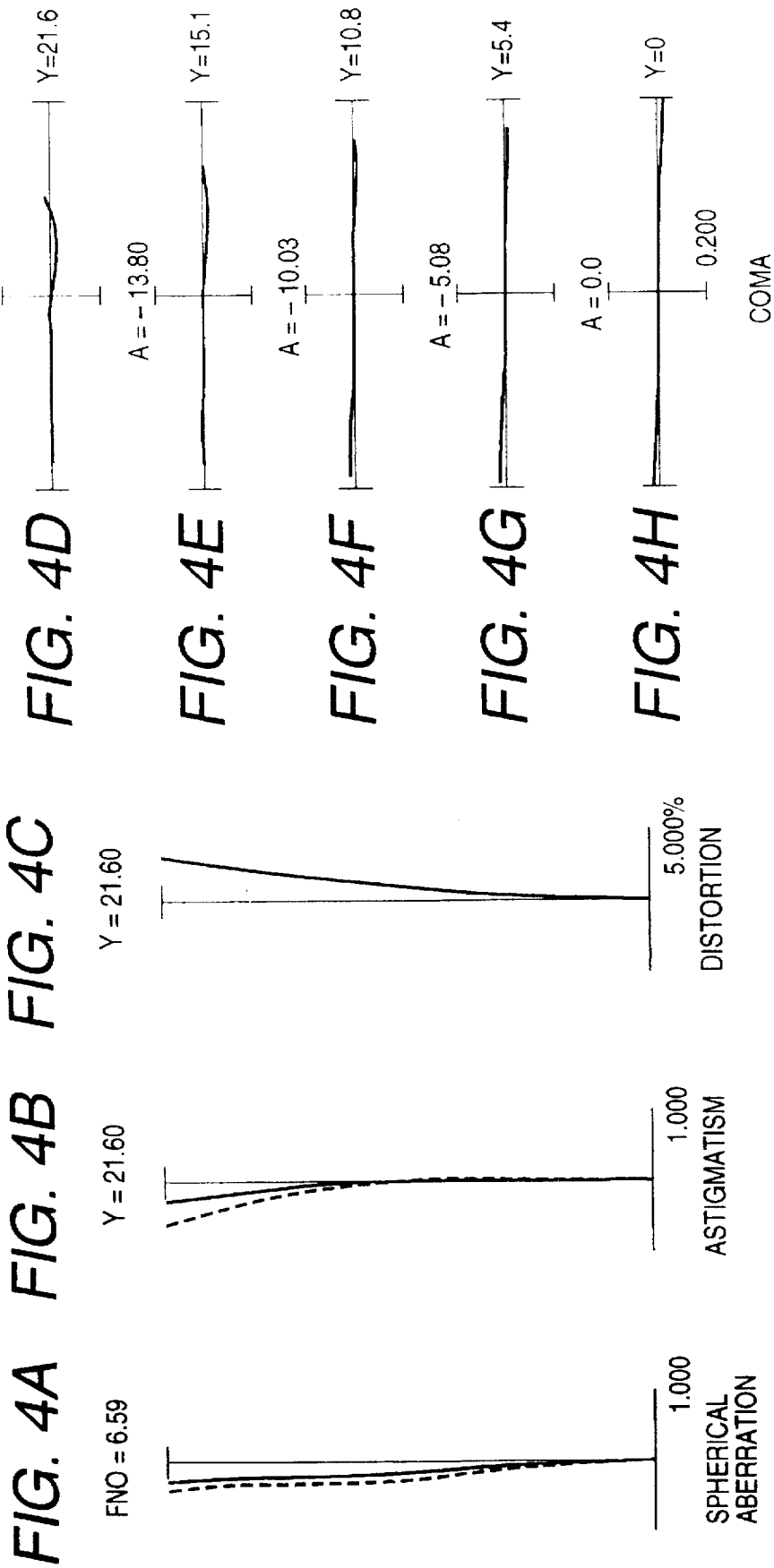
FIGS. 4A to 4H are graphs showing various aberrations in the first middle focal length state in the infinity focusing state in the first embodiment.
Figure 5:
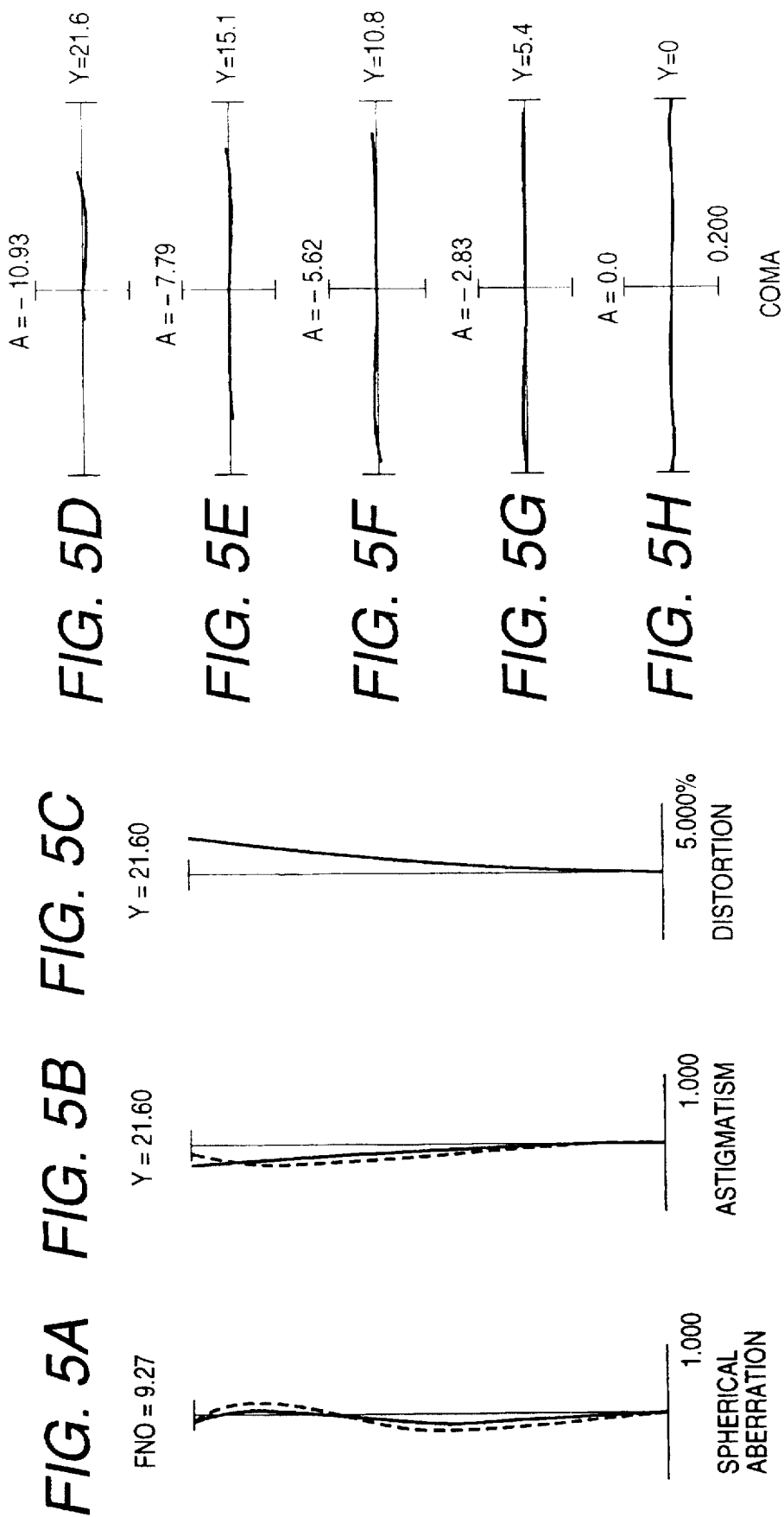
FIGS. 5A to 5H are graphs showing various aberrations in the second middle focal length state in the infinity focusing state in the first embodiment.
Figure 6:
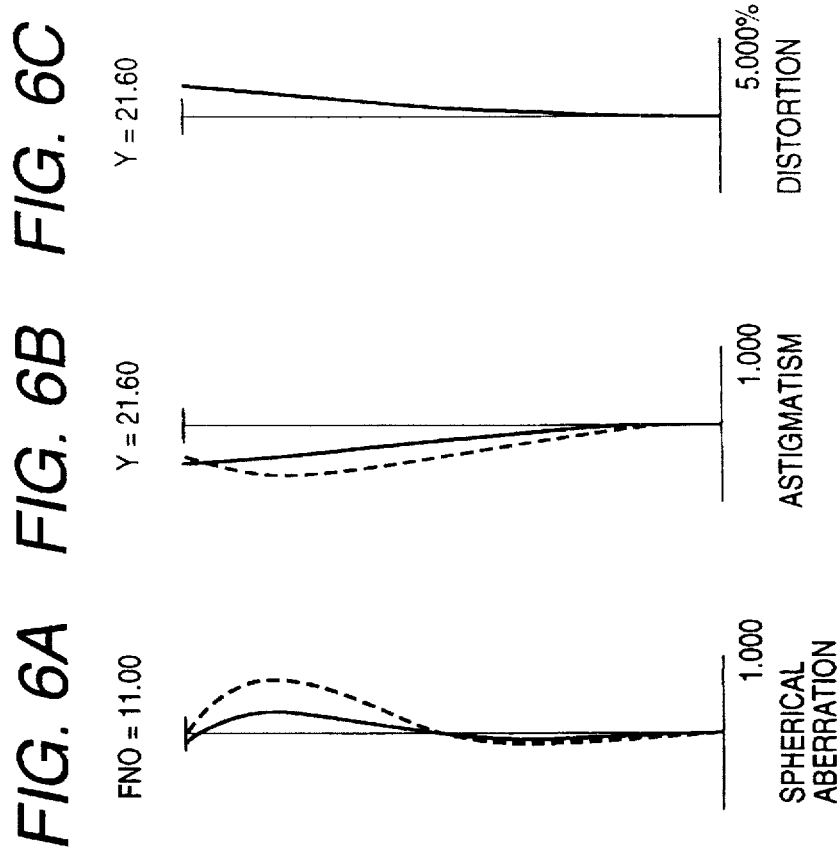
FIGS. 6A to 6H are graphs showing various aberrations in the maximum telephoto state in the infinity focusing state in the first embodiment.
Figure 7:
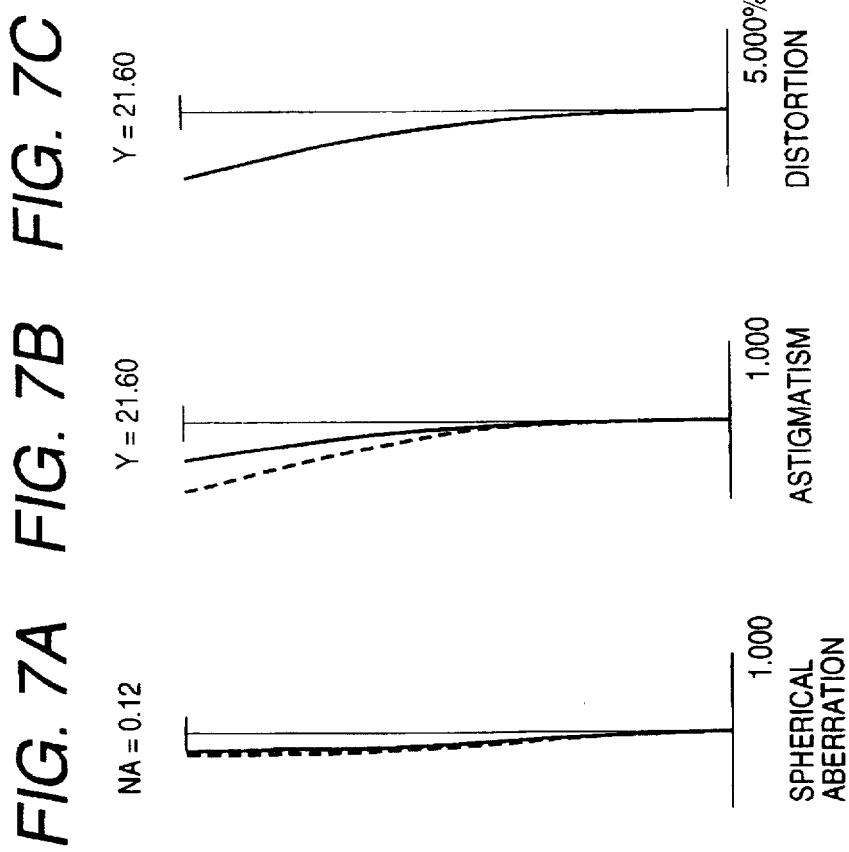
FIGS. 7A to 7H are graphs showing various aberrations in the maximum wide-angle state when the phototaking magnification=−1/30× in the first embodiment.
Figure 8:
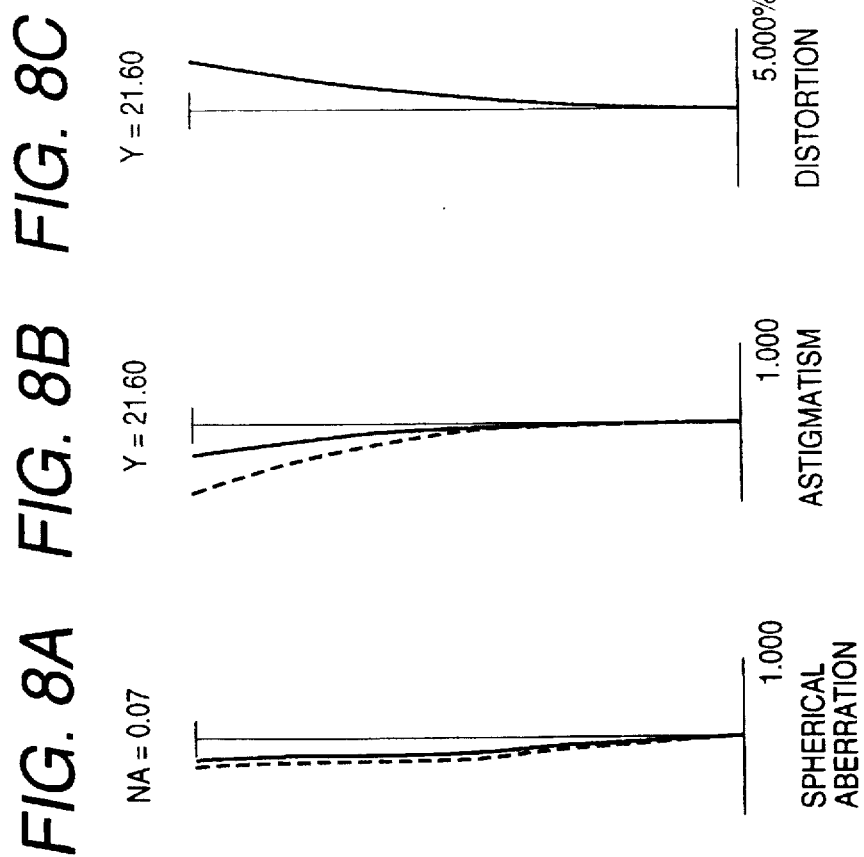
FIGS. 8A to 8H are graphs showing various aberrations in the first middle focal length state when the phototaking magnification=−1/30× in the first embodiment.
Figure 9:
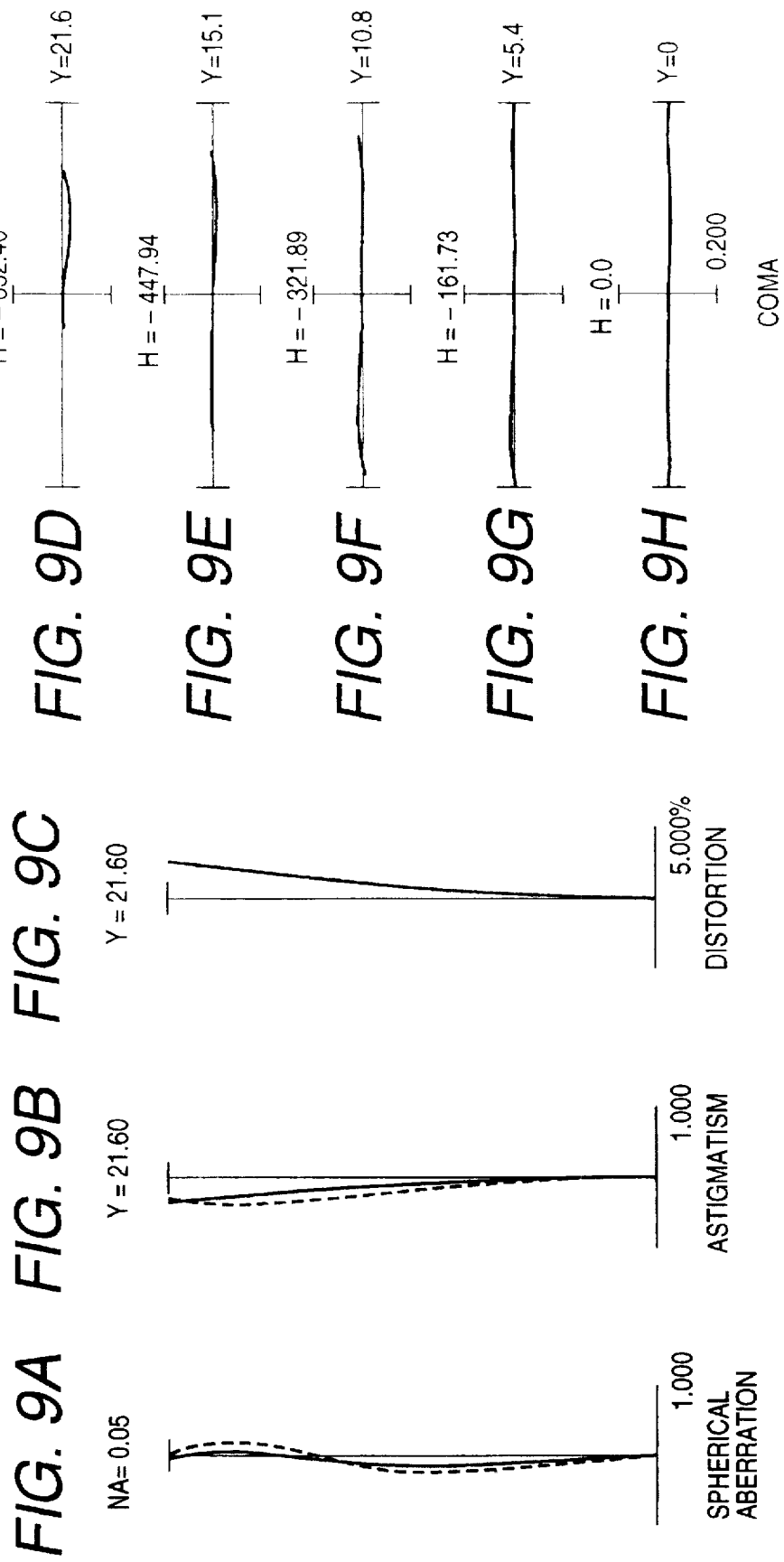
FIGS. 9A to 9H are graphs showing various aberrations in the second middle focal length state when the phototaking magnification=−1/30× in the first embodiment.
Figure 10:
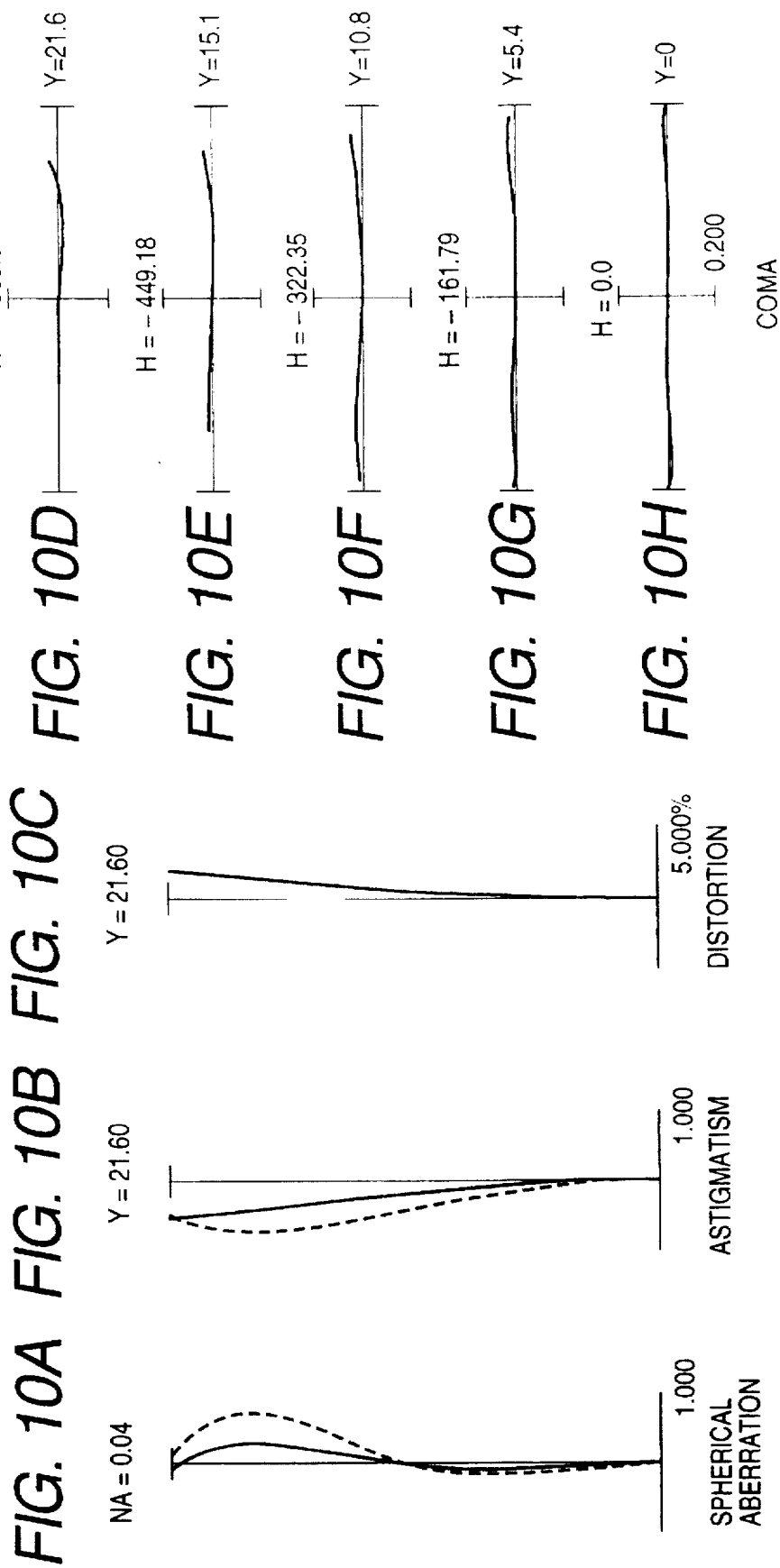
FIGS. 10A to 10H are graphs showing various aberrations in the maximum telephoto state when the phototaking magnification=−1/30× in the first embodiment.

FIG. 2 shows the arrangement of a variable focal length optical system according to the first embodiment of the present invention.

The variable focal length optical system shown in FIG. 2 comprises, in succession from an object side, a first lens unit G1 consisting of a cemented positive lens L1 of a biconvex lens and a negative meniscus lens with a concave surface facing the object side, a second lens unit G2 consisting of a biconcave lens L21 and a cemented positive lens L22 of a biconvex lens and a biconcave lens, a third lens unit G3 consisting of a biconvex lens L3, a fourth lens unit G4 consisting of a cemented negative lens L41 of a positive meniscus lens with a concave surface facing the object side and a negative meniscus lens with a concave surface facing the object side, and a biconvex lens L42, and a fifth lens unit G5 consisting of a positive meniscus lens L51 with a concave surface facing the object side, a biconcave lens L52, and a negative meniscus lens L53 with a concave surface facing the object side.

As described above, the second lens unit G2 has the biconcave lens L21 serving as a negative sub lens unit G21 having a negative refractive power, and the cemented positive lens L22 serving as a positive sub lens unit G22 having a positive refractive power.

An aperture stop S is inserted between the third lens unit G3 and the fourth lens unit G4, and moves together with the third lens unit G3 upon varying the focal length from the maximum wide-angle state to the maximum telephoto state.

FIG. 2 shows the positional relationship among the respective lens units in the maximum wide-angle state, and these lens units move on the optical axis along the zoom trajectories indicated by arrows in FIG. 1 when the focal length is varied to the maximum telephoto state.

Furthermore, by moving the fourth lens unit G4 as a focusing lens unit along the optical axis toward the object side, focusing from an infinity object to a close-distance object is attained.

Table 1 below summarizes the data values of the first embodiment of the present invention. In Table 1, f is the focal length, FNO is the F-number, $\omega$ is the half field angle, Bf is the back focus, and DO is the object point distance (the distance along the optical axis between the object and the lens surface at a position closest to the object side). Furthermore, the surface numbers indicate the order of lens surfaces from the object side along the traveling direction of light rays, and the refractive index and Abbe's number correspond to values for the d-line ($\lambda=587.6$ nm).

TABLE 1 f = 30.90–60.59–109.06–147.83
FNO = 4.28–6.63–9.27–11.00
$\omega$ = 36.25–19.09–10.93–8.15°

| Surface Number | Radius of Curvature | Surface Interval | Refractive Index | Abbe's Number |
|---|---|---|---|---|
| 1 | 41.5078 | 5.4529 | 1.48749 | 70.45 |
| 2 | −55.2266 | 1.3329 | 1.84666 | 23.83 |
| 3 | −113.7644 | (d3 = variable) | | |
| 4 | −74.5157 | 0.9694 | 1.80420 | 46.51 |
| 5 | 14.7591 | 3.4674 | | |
| 6 | 19.1638 | 4.2412 | 1.71736 | 29.50 |
| 7 | −21.9421 | 0.9694 | 1.83500 | 42.97 |
| 8 | 96.1461 | (d8 = variable) | | |
| 9 | 139.1311 | 1.8176 | 1.62280 | 56.93 |
| 10 | −25.7861 | 1.2118 | | |
| 11 | ∞ | (d11 = variable) | (aperture stop S) | |
| 12 | −13.4641 | 2.4235 | 1.48749 | 70.45 |
| 13 | −11.1444 | 0.9694 | 1.84666 | 23.83 |
| 14 | −25.4463 | 0.1212 | | |
| 15* | 50.7008 | 3.0294 | 1.51680 | 64.20 |
| 16* | −12.5596 | (d16 = variable) | | |
| 17 | −79.9123 | 3.1162 | 1.80518 | 25.46 |
| 18 | −23.2642 | 0.1212 | | |
| 19 | −53.8623 | 1.2118 | 1.77250 | 49.61 |

TABLE 1-continued f = 30.90–60.59–109.06–147.83
FNO = 4.28–6.63–9.27–11.00
ω = 36.25–19.09–10.93–8.15°

| Surface Number | Radius of Curvature | Surface Interval | Refractive Index | Abbe's Number |
|---|---|---|---|---|
| 20 | 186.7832 | 5.2044 | | |
| 21 | −14.3495 | 1.4541 | 1.83500 | 42.97 |
| 22 | −63.8978 | (Bf) | | |

(Aspherical Surface Data)
(15th Surface)
κ=0.3958
$C_4=+4.73140\times10^{-6}$
$C_6=-3.61077\times10^{-7}$
$C_8=-5.45939\times10^{-9}$
$C_{10}=+2.94834\times10^{-10}$
(16th Surface)
κ=0.7183
$C_4=+5.14723\times10^{-5}$
$C_6=+1.96845\times10^{-7}$
$C_8=-1.73463\times10^{-8}$
$C_{10}=+3.96586\times10^{-10}$
(Variable Intervals Upon Varying Focal Length)

| f | 30.8998 | 60.5880 | 109.0585 | 147.8331 |
|---|---|---|---|---|
| d3 | 1.3329 | 11.7434 | 22.1481 | 27.2882 |
| d8 | 7.2489 | 3.9698 | 2.0599 | 1.8177 |
| d11 | 3.4992 | 4.1256 | 4.9212 | 5.2106 |
| d16 | 18.1965 | 10.4219 | 4.7835 | 1.8177 |
| Bf | 7.5734 | 27.0734 | 51.7002 | 69.7402 |

(Focusing Moving Amount Δ of Fourth Lens Unit G4 When Phototaking Magnification=−1/30×)

| Focal Length f | 30.8998 | 60.5880 | 109.0585 | 147.8331 |
|---|---|---|---|---|
| Object Point Distance D0 | 915.7731 | 1794.0639 | 3228.4984 | 4376.5357 |
| Moving Amount Δ | 0.6959 | 0.5663 | 0.4987 | 0.4617 |

(Note that the positive sign of the focusing moving amount Δ indicates movement from the image side to the object side)
(Condition Corresponding Values)
$\beta2t=-1.1841$
$\beta2w=-0.5497$
$f21=-15.2446$
$f22=+40.2661$
$f12=-43.5818$
$f2=-26.6313$
$f3=35.0437$
$f4=40.8743$
$fw=30.8998$
$ft=147.8331$
$\beta4w=0.34853$
$\beta4t=0.39146$
$Z=4.7843$
(1) $\beta2t\cdot\beta2w=0.651$
(2) $D2/fw=0.112$
(3) $(|f21|+f22)/|f2|=2.084$
(4) $|f12|/fw=1.410$
(5) $|f2|/fw=0.862$
(6) $f3/f4=0.857$
(7) $|f2|/(fw\cdot ft)^{1/2}=0.394$
(8) $(\beta4t/\beta4w)/Z=0.235$ FIGS. 3A to 10H are graphs showing various aberrations for the d-line (λ=587.6 nm) in the first embodiment. FIGS. 3A to 3H are graphs showing various aberrations in the maximum wide-angle state (shortest focal length state) in an infinity focusing state. FIGS. 4A to 4H are graphs showing various aberrations in the first middle focal length state in an infinity focusing state. FIGS. 5A to 5H are graphs showing various aberrations in the second middle focal length state in an infinity focusing state, and FIGS. 6A to 6H are graphs showing various aberrations in the maximum telephoto state (longest focal length state) in an infinity focusing state.

FIGS. 7A to 7H are graphs showing various aberrations in the maximum wide-angle state when the phototaking magnification=−1/30×. FIGS. 8A to 8H are graphs showing various aberrations in the first middle focal length state when the phototaking magnification=−1/30×. FIGS. 9A to 9H are graphs showing various aberrations in the second middle focal length state when the phototaking magnification=−1/30×, and FIGS. 10A to 10H are graphs showing various aberrations in the maximum telephoto state when the phototaking magnification=−1/30×.

In these graphs, FNO is the F-number, NA is the numerical aperture, Y is the image height, A is the half field angle with respect to each image height, and H is the object height with respect to each image height.

In each graph showing astigmatism, the solid curve represents the sagittal image plane, and the broken curve represents the meridional image plane. Furthermore, in each graph showing spherical aberration, the broken curve represents the sine condition.

As can be seen from these graphs, in this embodiment, various aberrations are satisfactorily corrected in the respective photographing distance states and the respective focal length states.

[Second Embodiment]

Figure 11:
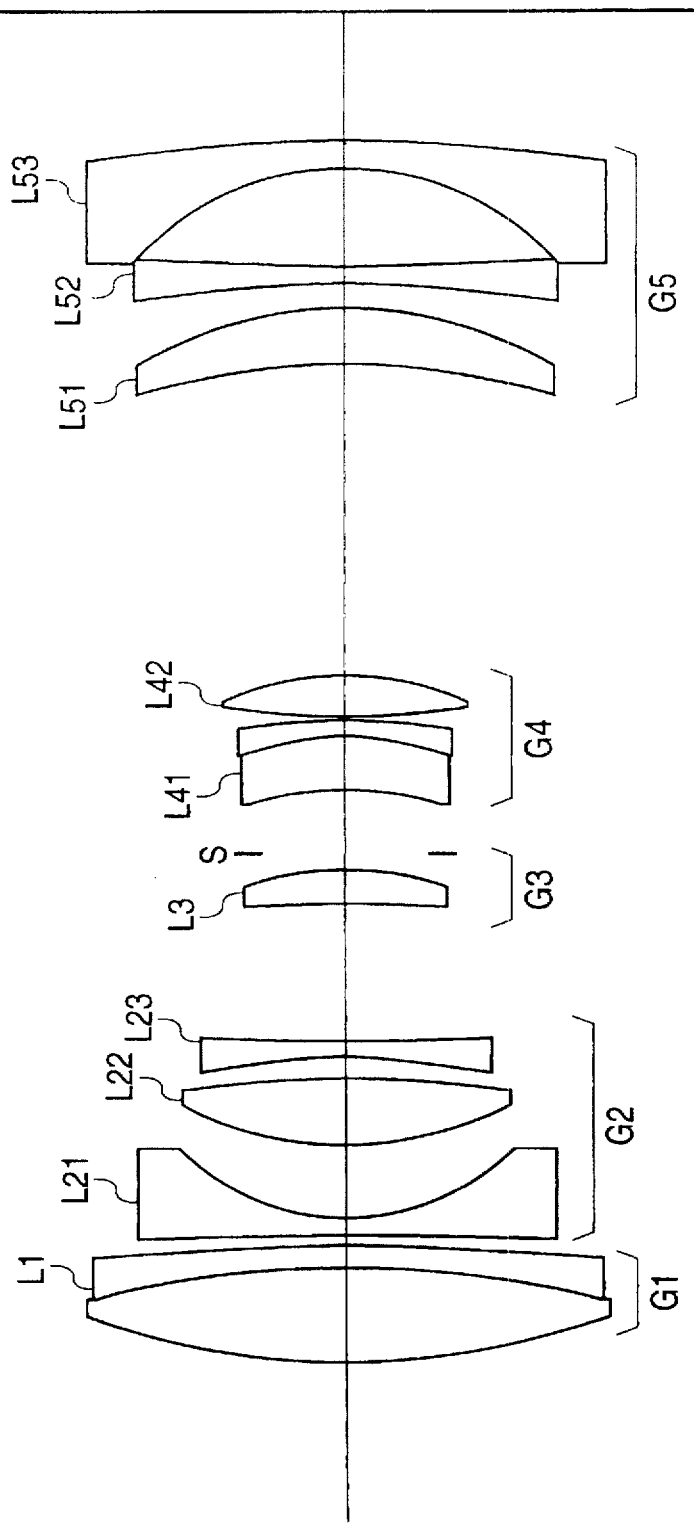
FIG. 11 is a schematic view showing the arrangement of a variable focal length optical system according to the second embodiment of the present invention.
Figure 12:
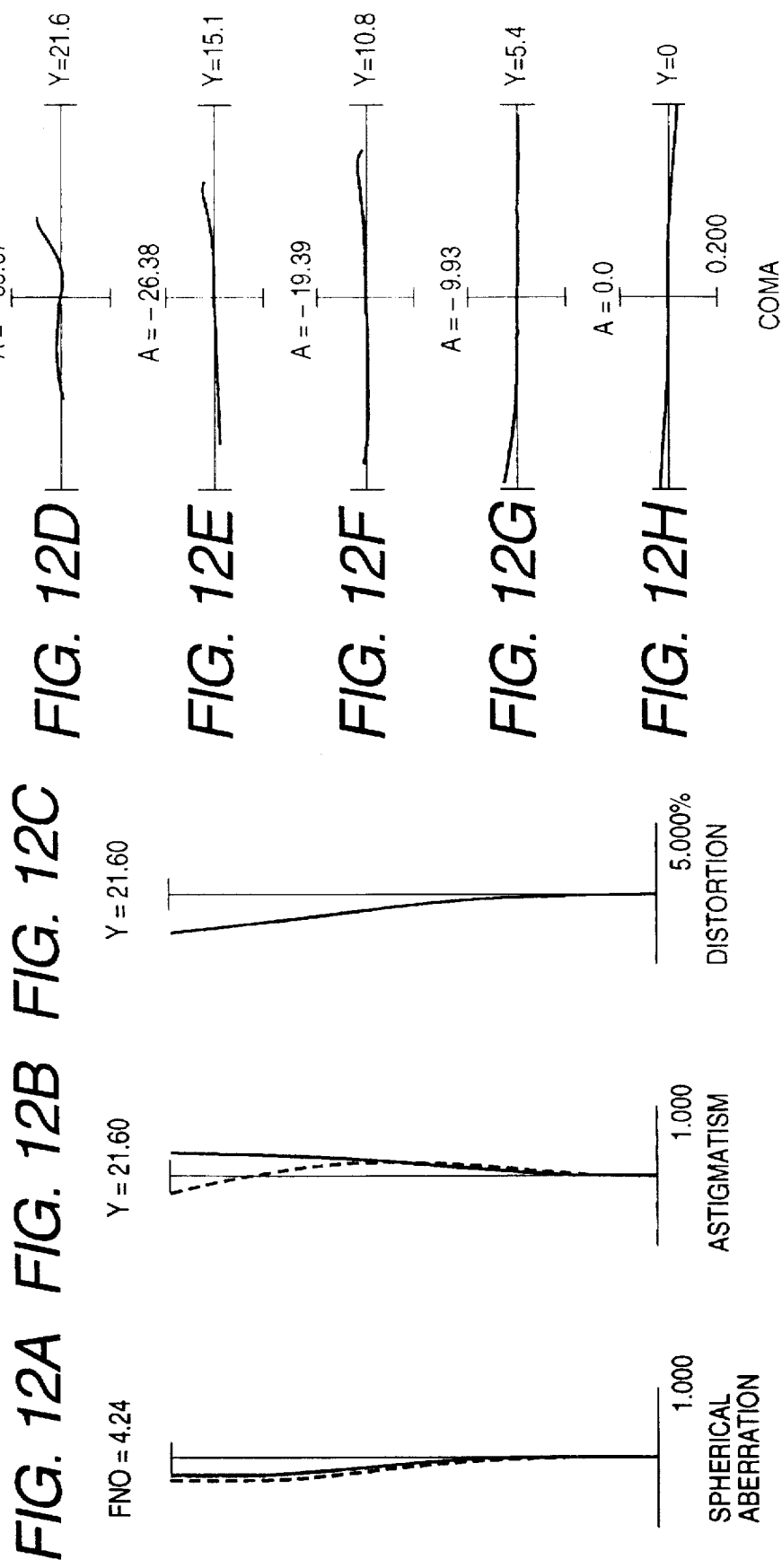
FIGS. 12A to 12H are graphs showing various aberrations in the maximum wide-angle state in the infinity focusing state in the second embodiment.
Figure 13:
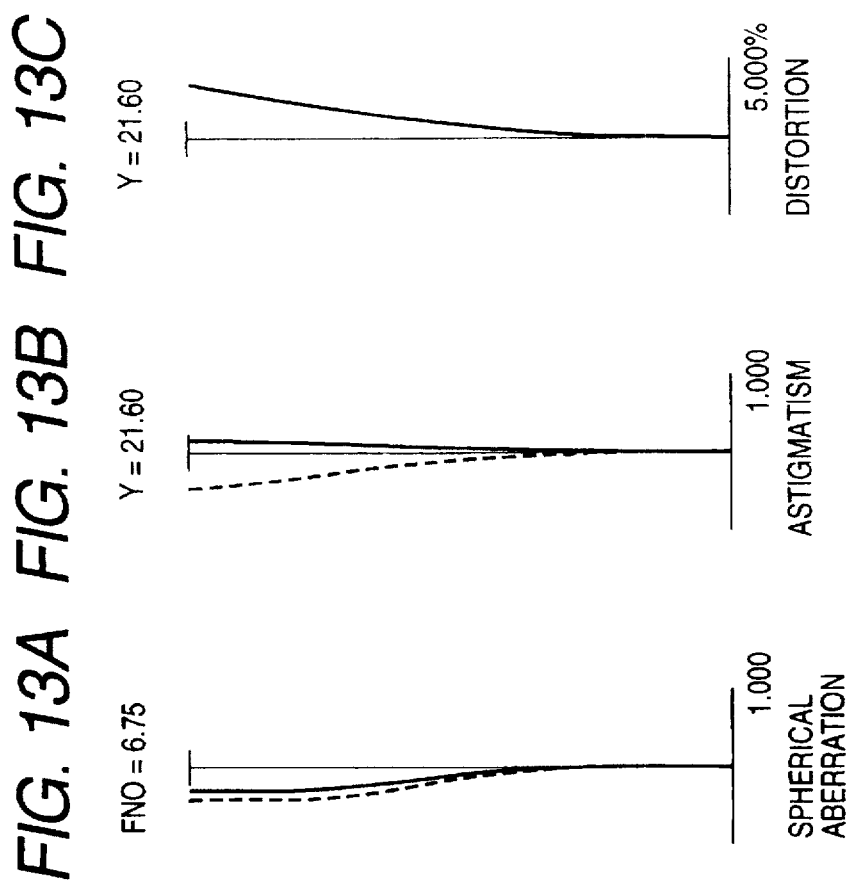
FIGS. 13A to 13H are graphs showing various aberrations in the first middle focal length state in the infinity focusing state in the second embodiment.
Figure 14:
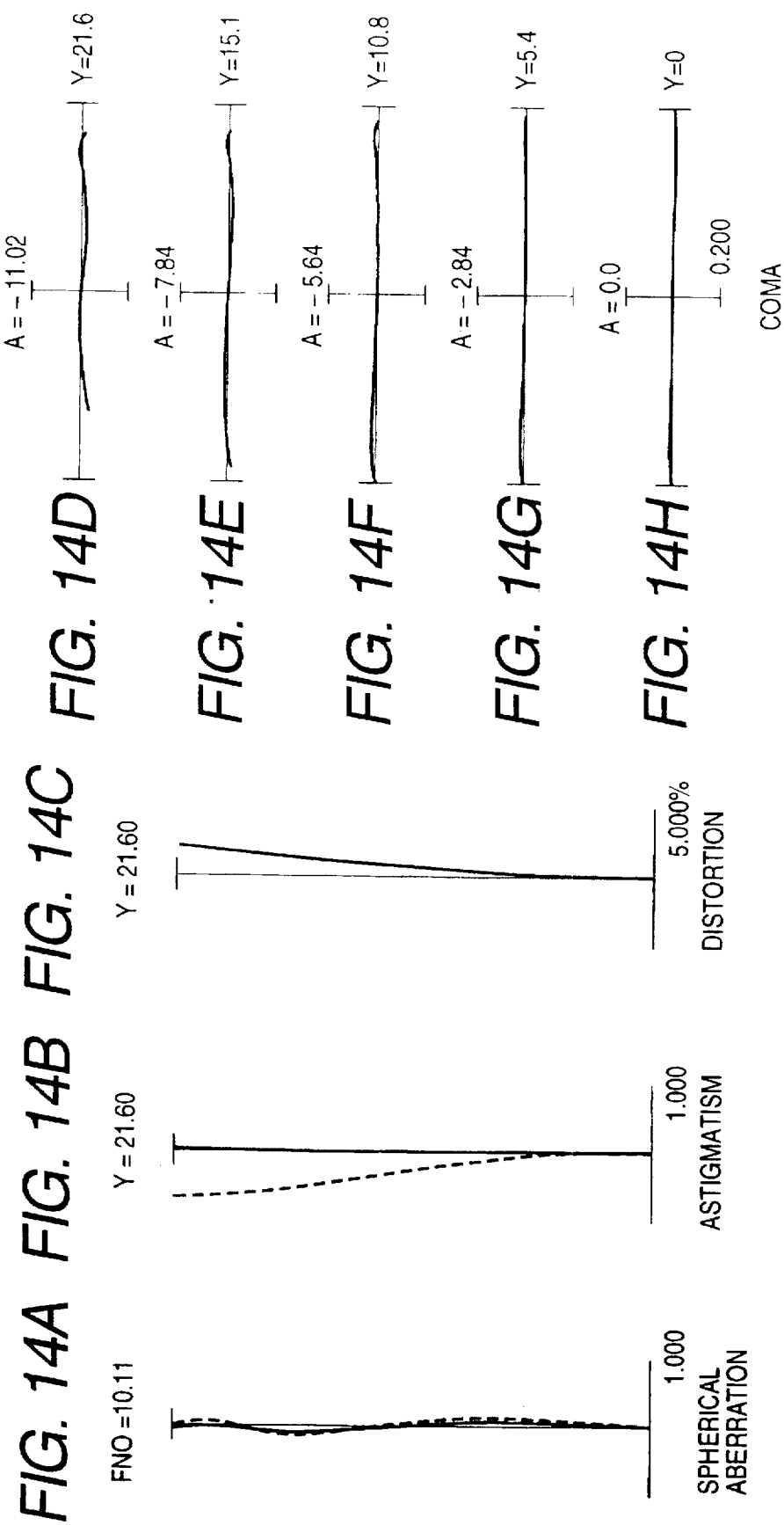
FIGS. 14A to 14H are graphs showing various aberrations in the second middle focal length state in the infinity focusing state in the second embodiment.
Figure 15:
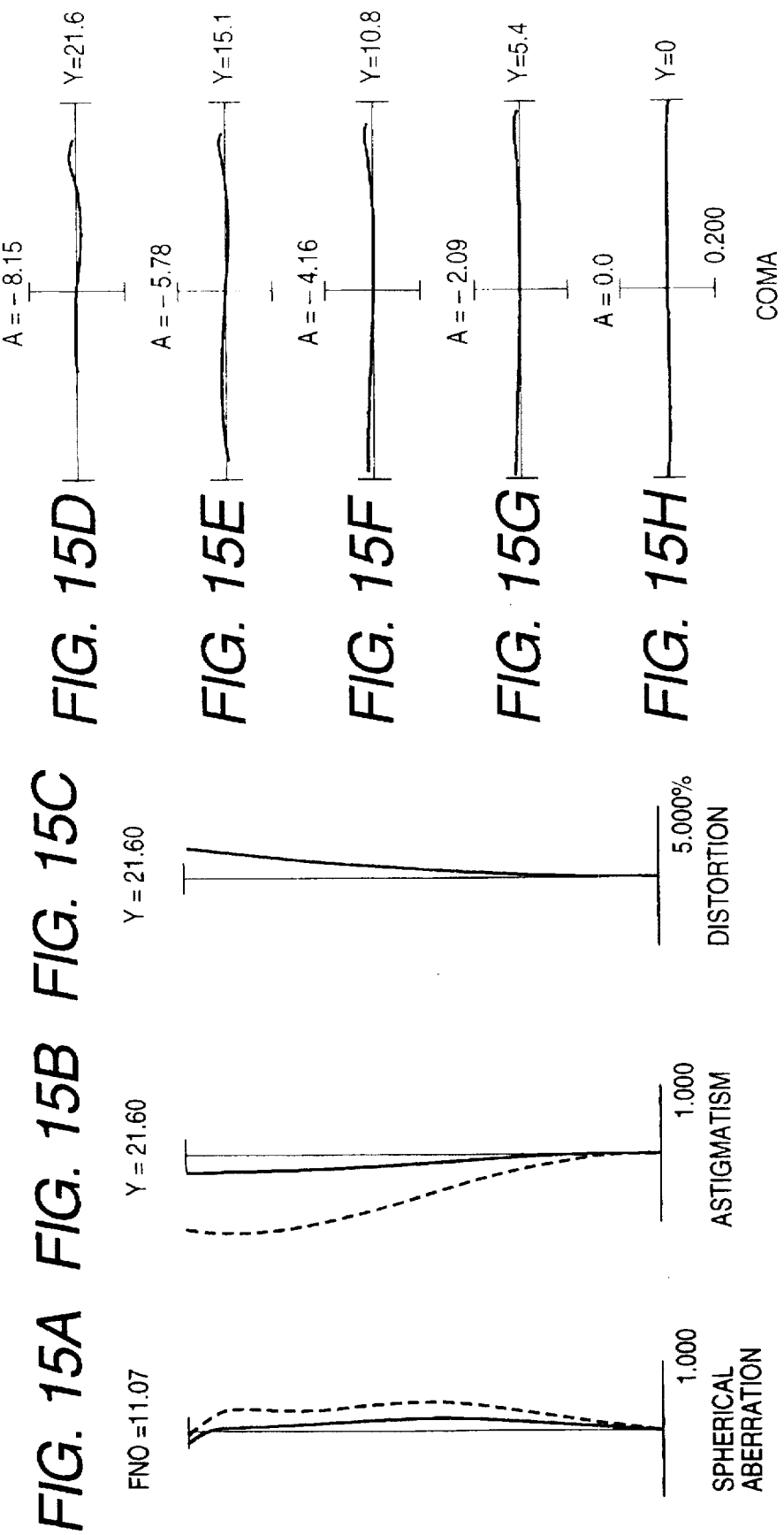
FIGS. 15A to 15H are graphs showing various aberrations in the maximum telephoto state in the infinity focusing state in the second embodiment.
Figure 16:
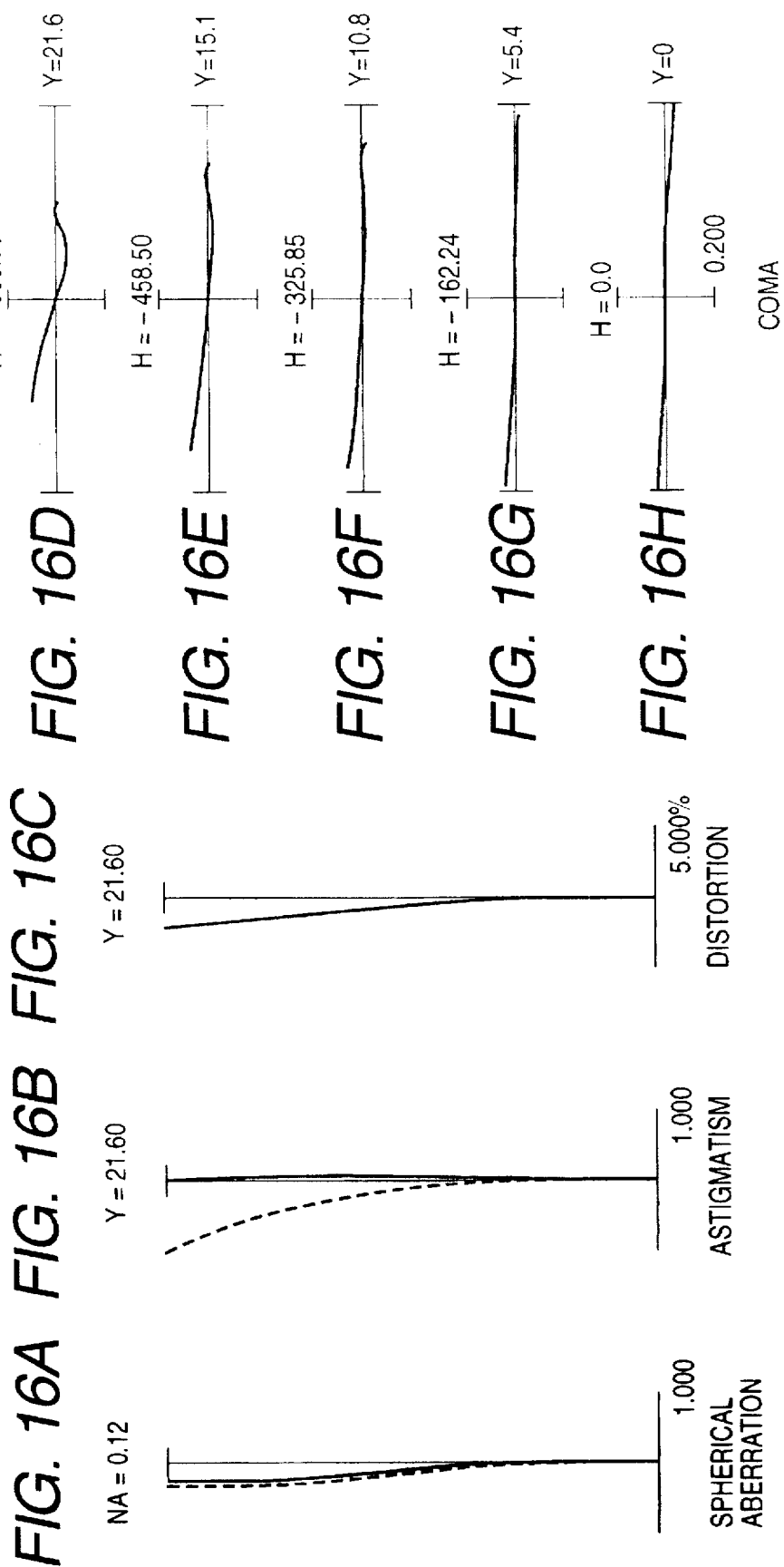
FIGS. 16A to 16H are graphs showing various aberrations in the maximum wide-angle state when the phototaking magnification=−1/30× in the second embodiment.
Figure 17:
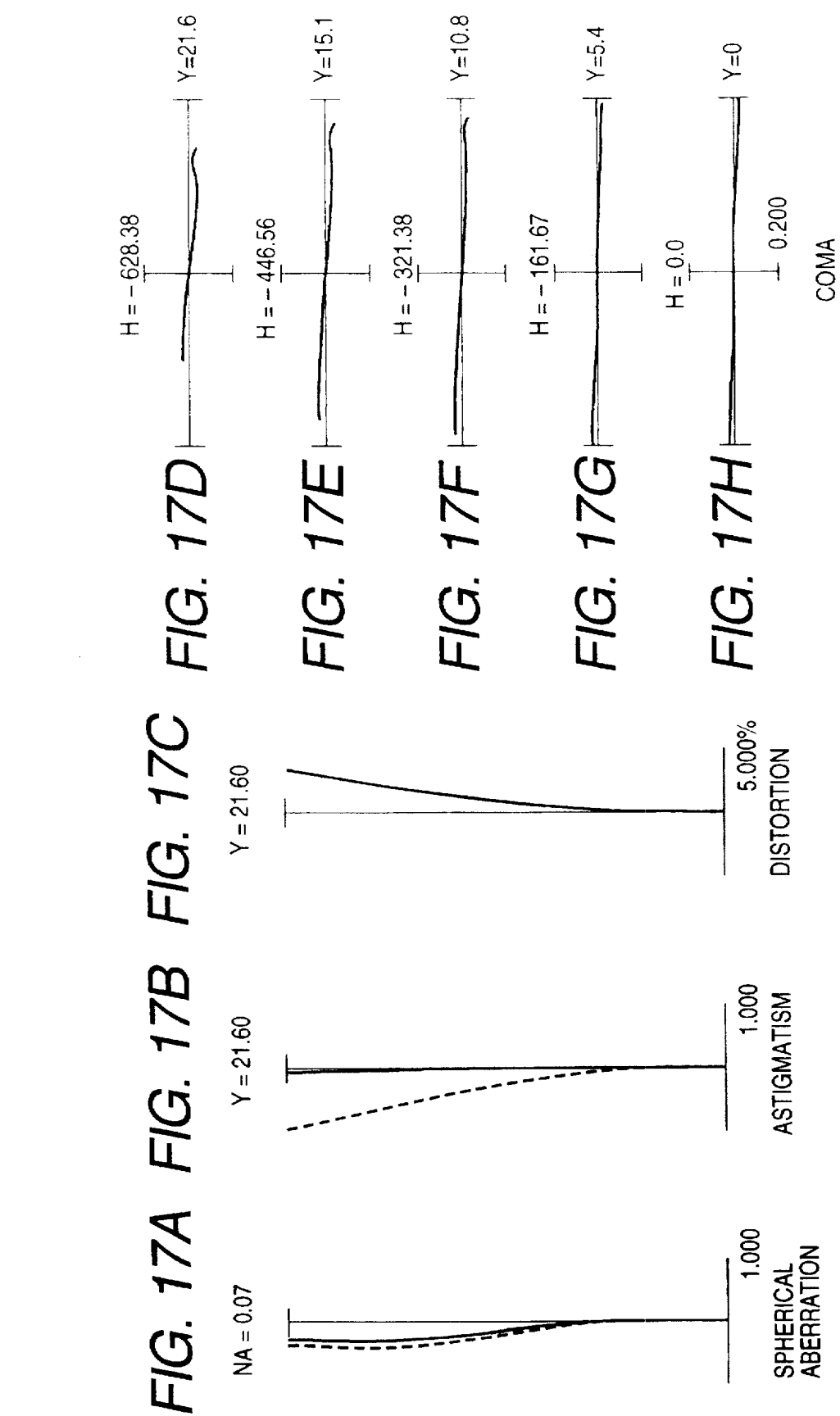
FIGS. 17A to 17H are graphs showing various aberrations in the first middle focal length state when the phototaking magnification=−1/30× in the second embodiment.
Figure 18:
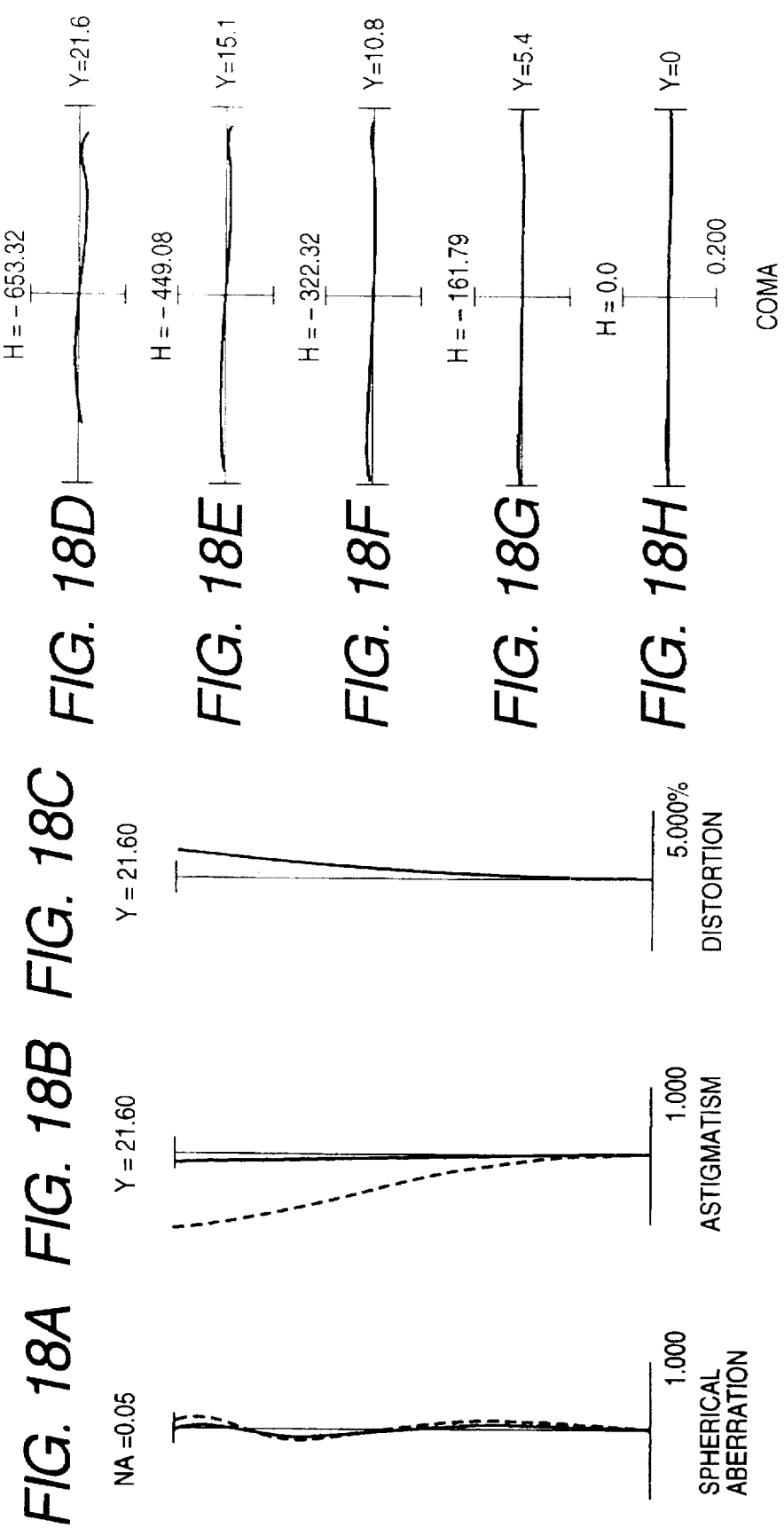
FIGS. 18A to 18H are graphs showing various aberrations in the second middle focal length state when the phototaking magnification=−1/30× in the second embodiment.
Figure 19:
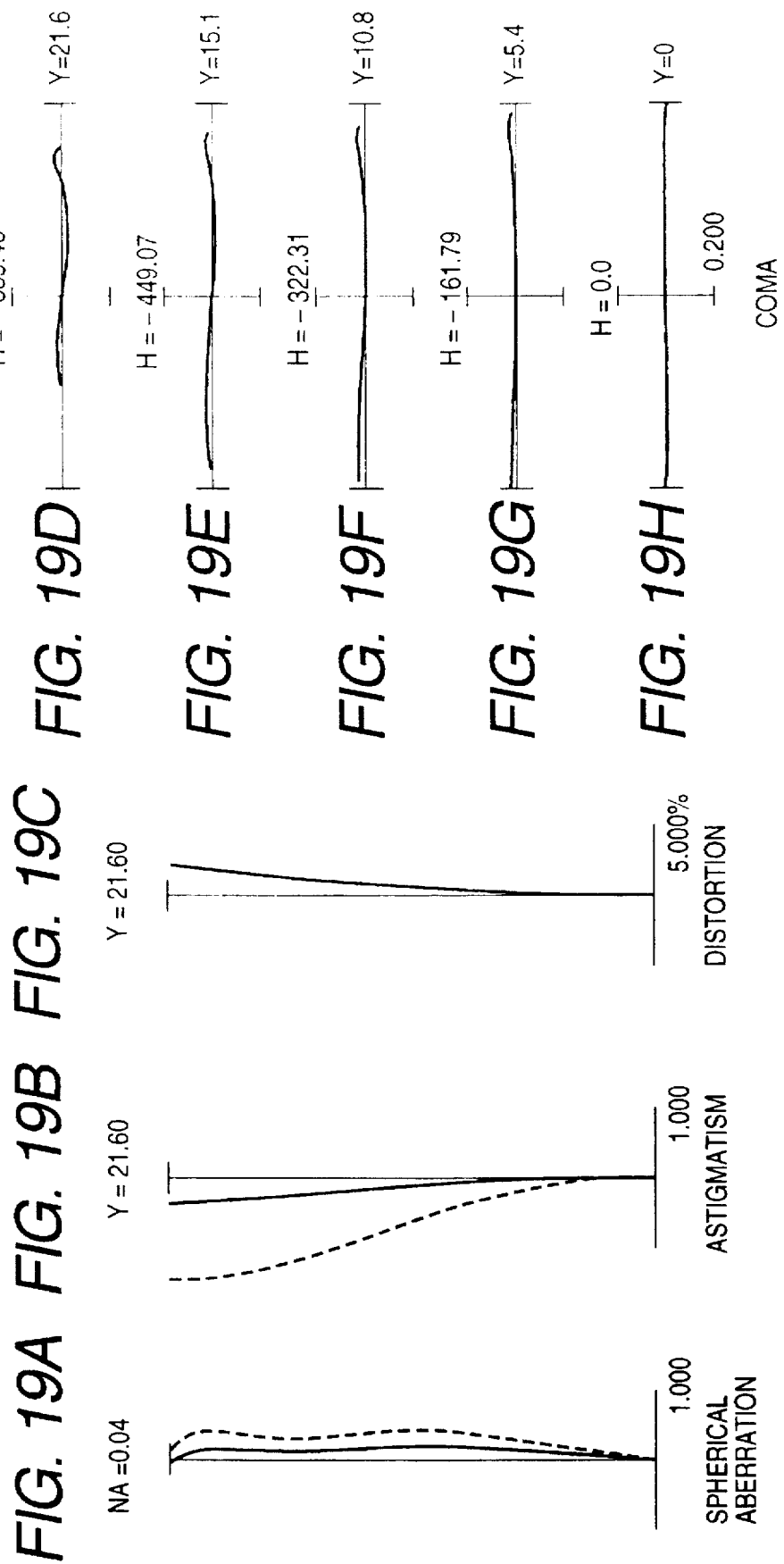
FIGS. 19A to 19H are graphs showing various aberrations in the maximum telephoto state when the phototaking magnification=−1/30× in the second embodiment.

FIG. 11 shows the lens arrangement of a variable focal length optical system according to the second embodiment of the present invention.

The variable focal length optical system shown in FIG. 11 comprises, in succession from an object side, a first lens unit G1 consisting of a cemented positive lens L1 of a biconvex lens and a negative meniscus lens with a concave surface facing the object side, a second lens unit G2 consisting of a biconcave lens L21, a biconvex lens L22, and a biconcave lens L23, a third lens unit G3 consisting of a biconvex lens L3, a fourth lens unit G4 consisting of a cemented negative lens L41 of a positive meniscus lens with a concave surface facing the object side and a negative meniscus lens with a concave surface facing the object side, and a biconvex lens L42, and a fifth lens unit G5 consisting of a positive meniscus lens L51 with a concave surface facing the object side, a biconcave lens L52, and a negative meniscus lens L53 with a concave surface facing the object side.

As described above, the second lens unit G2 has the biconcave lens L21 serving as a negative sub lens unit G21 having a negative refractive power, and the biconvex lens L22 and the biconcave lens L23 serving as a positive sub lens unit G22 having a positive refractive power.

An aperture stop S is inserted between the third lens unit G3 and the fourth lens unit G4, and moves together with the third lens unit G3 upon varying the focal length from the maximum wide-angle state to the maximum telephoto state.

FIG. 11 shows the positional relationship among the respective lens units in the maximum wide-angle state, and these lens units move on the optical axis along the zoom trajectories indicated by arrows in FIG. 1 when the focal length is varied to the maximum telephoto state.

Furthermore, by moving the fourth lens unit G4 as a focusing lens unit along the optical axis toward the object side, focusing from an infinity object to a close-distance object is attained.

Table 2 below summarizes the data values of the second embodiment of the present invention. In Table 2, f is the focal length, FNO is the F-number, ω is the half field angle, Bf is the back focus, and DO is the object point distance (the distance along the optical axis between the object and the lens surface at a position closest to the object side). Furthermore, the surface numbers indicate the order of lens surfaces from the object side along the traveling direction of light rays, and the refractive index and Abbe's number correspond to values for the d-line (λ=587.6 nm).

TABLE 2 f = 30.91–60.56–108.75–147.79
FNO = 4.29–6.80–10.11–11.08
ω = 35.47–19.08–11.02–8.15°

| Surface Number | Radius of Curvature | Surface Interval | Refractive Index | Abbe's Number |
|---|---|---|---|---|
| 1 | 39.7793 | 5.4529 | 1.48749 | 70.45 |
| 2 | −57.2345 | 1.3329 | 1.84666 | 23.83 |
| 3 | −125.1163 | (d3 = variable) | | |
| 4 | −195.9410 | 0.9694 | 1.80420 | 46.51 |
| 5 | 13.2476 | 4.2412 | | |
| 6 | 18.8668 | 3.8776 | 1.71736 | 29.50 |
| 7 | −49.1158 | 1.2118 | | |
| 8 | −37.2068 | 0.9694 | 1.83500 | 42.97 |
| 9 | 88.7773 | (d9 = variable) | | |
| 10 | 329.7999 | 1.8176 | 1.62041 | 60.35 |
| 11 | −23.9894 | 1.2118 | | |
| 12 | ∞ | (d12 = variable) | (aperture stop S) | |
| 13 | −16.4460 | 3.0294 | 1.48749 | 70.45 |
| 14 | −16.2558 | 0.9694 | 1.84666 | 23.83 |
| 15 | −36.9396 | 0.1212 | | |
| 16* | 41.2706 | 2.4235 | 1.51680 | 64.20 |
| 17* | −15.1786 | (d17 = variable) | | |
| 18 | −41.3062 | 3.0221 | 1.80518 | 25.46 |
| 19 | −23.3882 | 1.2214 | | |
| 20 | −101.1149 | 1.2118 | 1.80420 | 46.51 |
| 21 | 717.9226 | 5.4529 | | |
| 22 | −15.5913 | 1.4541 | 1.83500 | 42.97 |
| 23 | −100.8166 | (Bf) | | |

(Aspherical Surface Data)

(16th Surface)

$\kappa = 1.0000$
$C_4 = -1.41981 \times 10^{-5}$
$C_6 = +3.35268 \times 10^{-7}$
$C_8 = -1.70549 \times 10^{-8}$
$C_{10} = +1.57922 \times 10^{-10}$ (17th Surface)

$\kappa = 1.0000$
$C_4 = +4.25633 \times 10^{-5}$
$C_6 = +1.41730 \times 10^{-7}$
$C_8 = -2.16560 \times 10^{-9}$
$C_{10} = -5.10870 \times 10^{-11}$ (Variable Intervals Upon Varying Focal Length)

| f | 30.9085 | 60.5596 | 108.7492 | 147.7930 |
|---|---|---|---|---|
| d3 | 0.6059 | 10.3280 | 18.3581 | 25.6688 |
| d9 | 7.9183 | 4.9246 | 3.0855 | 1.8177 |
| d12 | 3.5538 | 3.3180 | 3.2536 | 5.2106 |
| d17 | 17.9040 | 9.9580 | 4.6131 | 1.8177 |
| Bf | 7.4454 | 27.8259 | 56.2960 | 68.4730 |

(Focusing Moving Amount Δ of Fourth Lens Unit G4 When Phototaking Magnification=−1/30×)

| Focal Length f | 30.9085 | 60.5596 | 108.7492 | 147.7930 |
|---|---|---|---|---|
| Object Point Distance DO | 916.1613 | 1794.7822 | 3228.0551 | 4380.6388 |
| Moving Amount Δ | 0.7004 | 0.5475 | 0.4343 | 0.4646 |

(Note that the positive sign of the focusing moving amount Δ indicates movement from the image side to the object side)

(Condition Corresponding Values)

$\beta2t = -1.0807$
$\beta2w = -0.5252$
$f21 = -15.3980$
$f22 = +40.9782$
$f12 = -41.3730$
$f2 = -25.6056$
$f3 = 36.1161$
$f4 = 42.5607$
$fw = 30.9085$
$ft = 147.7929$
$\beta4w = 0.32704$
$\beta4t = 0.34761$
$z = 4.7816$ (1) $\beta2t \cdot \beta2w = 0.568$
(2) $D2/fw = 0.137$
(3) $(|f21| + f22)/|f2| = 2.197$
(4) $|f12|/fw = 1.358$
(6) $f3/f4 = 0.849$
(7) $|f2|/(fw \cdot ft)^{1/2} = 0.379$
(8) $(\beta4t/\beta4w)/Z = 0.222$ FIGS. 12A to 19H are graphs showing various aberrations for the d-line (λ=587.6 nm) in the second embodiment. FIGS. 12A to 12H are graphs showing various aberrations in the maximum wide-angle state in an infinity focusing state, FIGS. 13A to 13H are graphs showing various aberrations in the first middle focal length state in an infinity focusing state, FIGS. 14A to 14H are graphs showing various aberrations in the second middle focal length state in an infinity focusing state, and FIGS. 15A to 15H are graphs showing various aberrations in the maximum telephoto state in an infinity focusing state.

FIGS. 16A to 16H are graphs showing various aberrations in the maximum wide-angle state when the phototaking magnification=−1/30×, FIGS. 17A to 17H are graphs showing various aberrations in the first middle focal length state when the phototaking magnification=−1/30×, FIGS. 18A to 18H are graphs showing various aberrations in the second middle focal length state when the phototaking magnification=−1/30×, and FIGS. 19A to 19H are graphs showing various aberrations in the maximum telephoto state when the phototaking magnification=−1/30×.

In these graphs, FNO is the F-number, NA is the numerical aperture, Y is the image height, A is the half field angle with respect to each image height, and H is the object height with respect to each image height.

In each graph showing astigmatism, the solid curve represents the sagittal image plane, and the broken curve represents the meridional image plane. Furthermore, in each graph showing spherical aberration, the broken curve represents the sine condition.

As can be seen from these graphs, in this embodiment, various aberrations are satisfactorily corrected in the respective photographing distance states and the respective focal length states.

[Third Embodiment]

Figure 20:
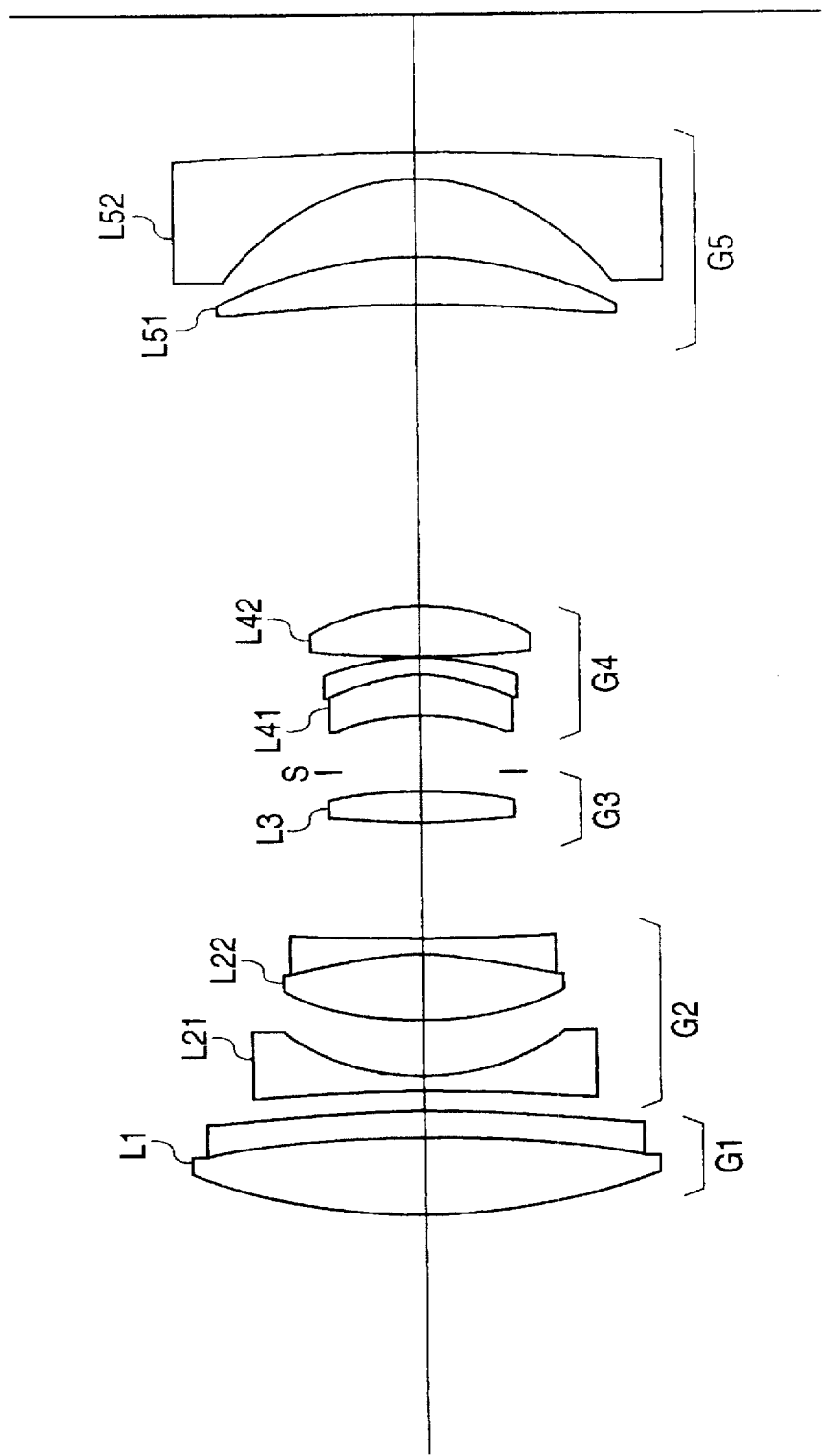
FIG. 20 is a schematic view showing the arrangement of a variable focal length optical system according to the third embodiment of the present invention.
Figure 21:
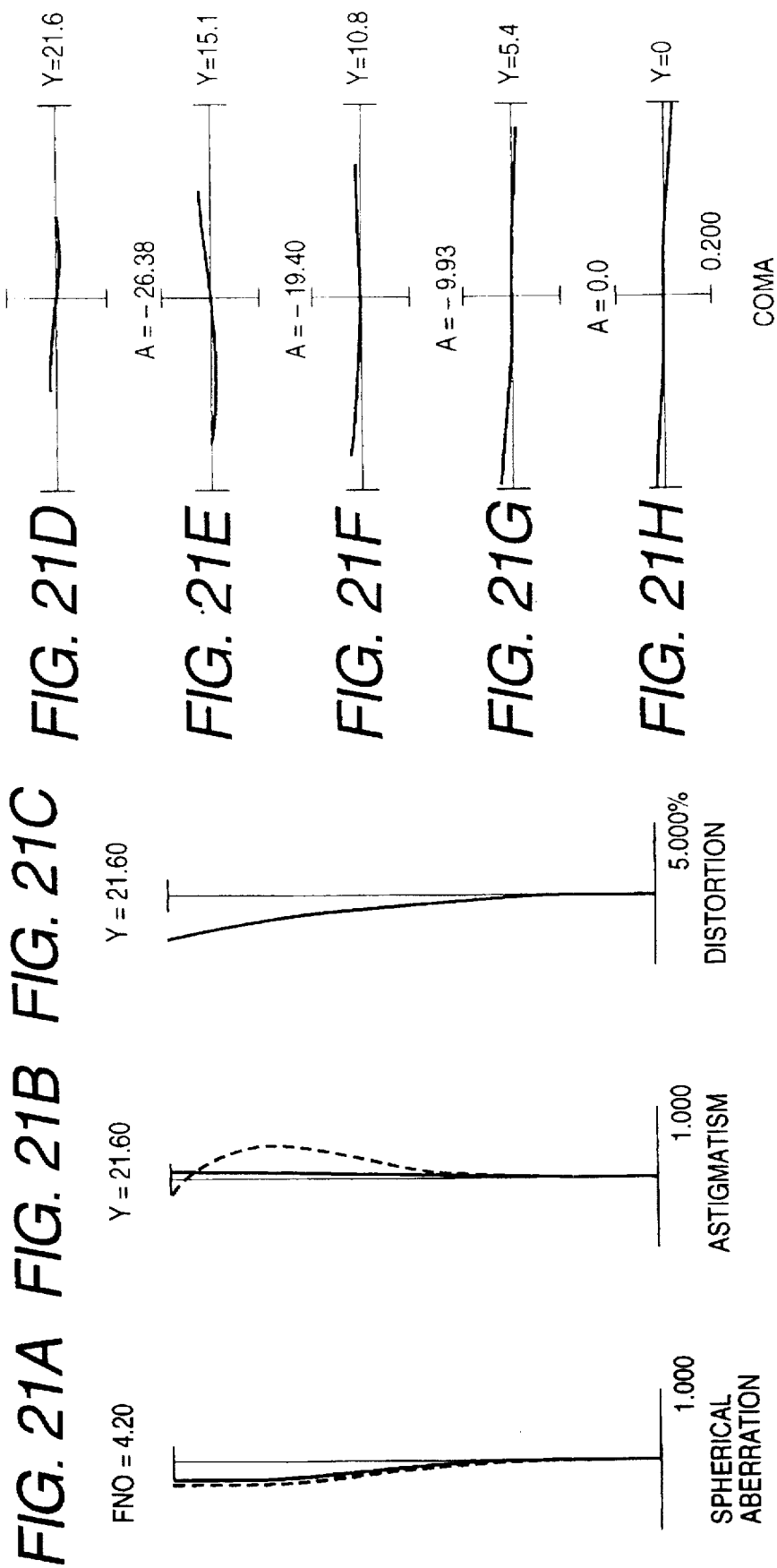
FIGS. 21A to 21H are graphs showing various aberrations in the maximum wide-angle state in the infinity focusing state in the third embodiment.
Figure 22:
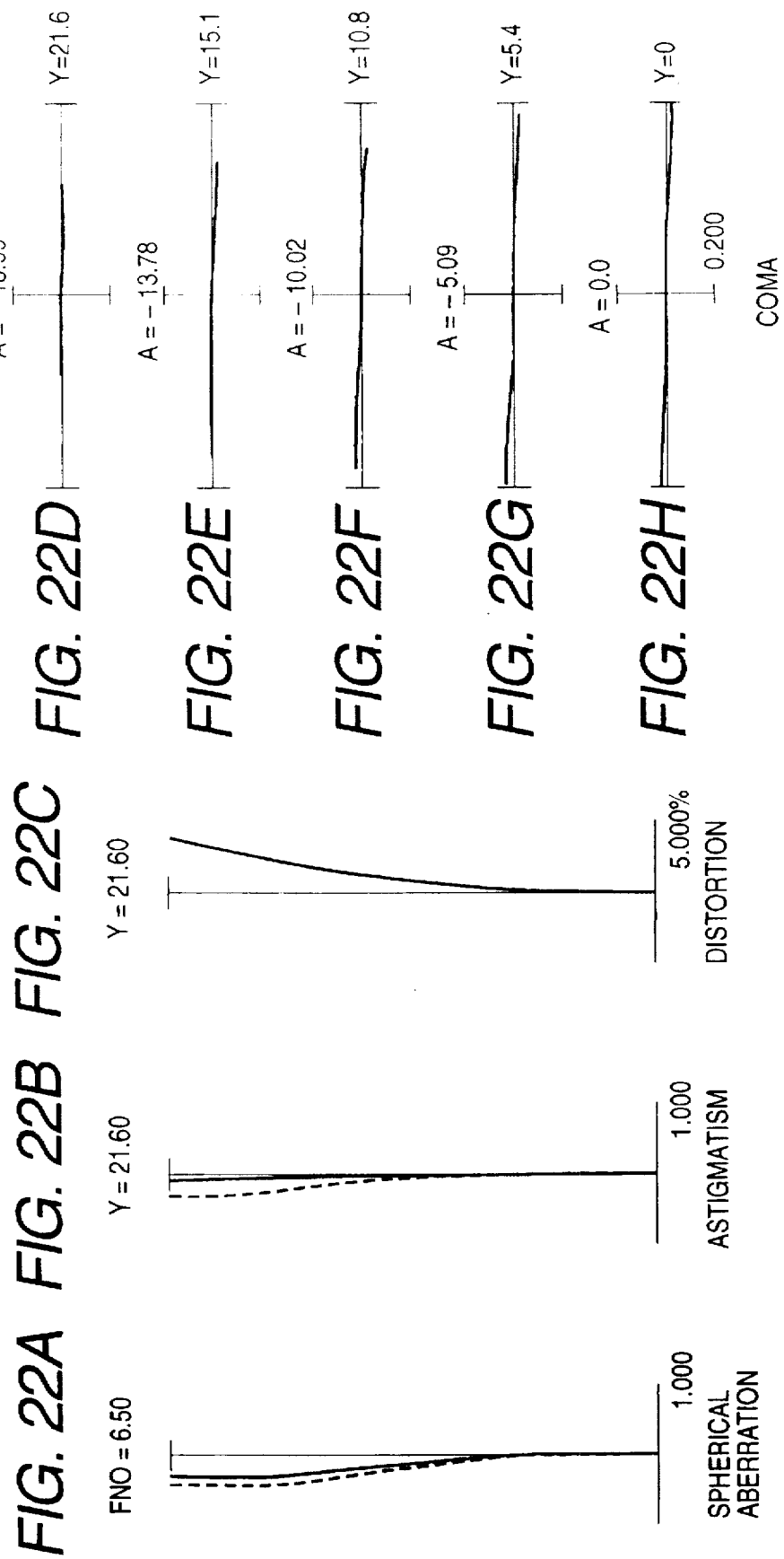
FIGS. 22A to 22H are graphs showing various aberrations in the middle focal length state in the infinity focusing state in the third embodiment.
Figure 23:
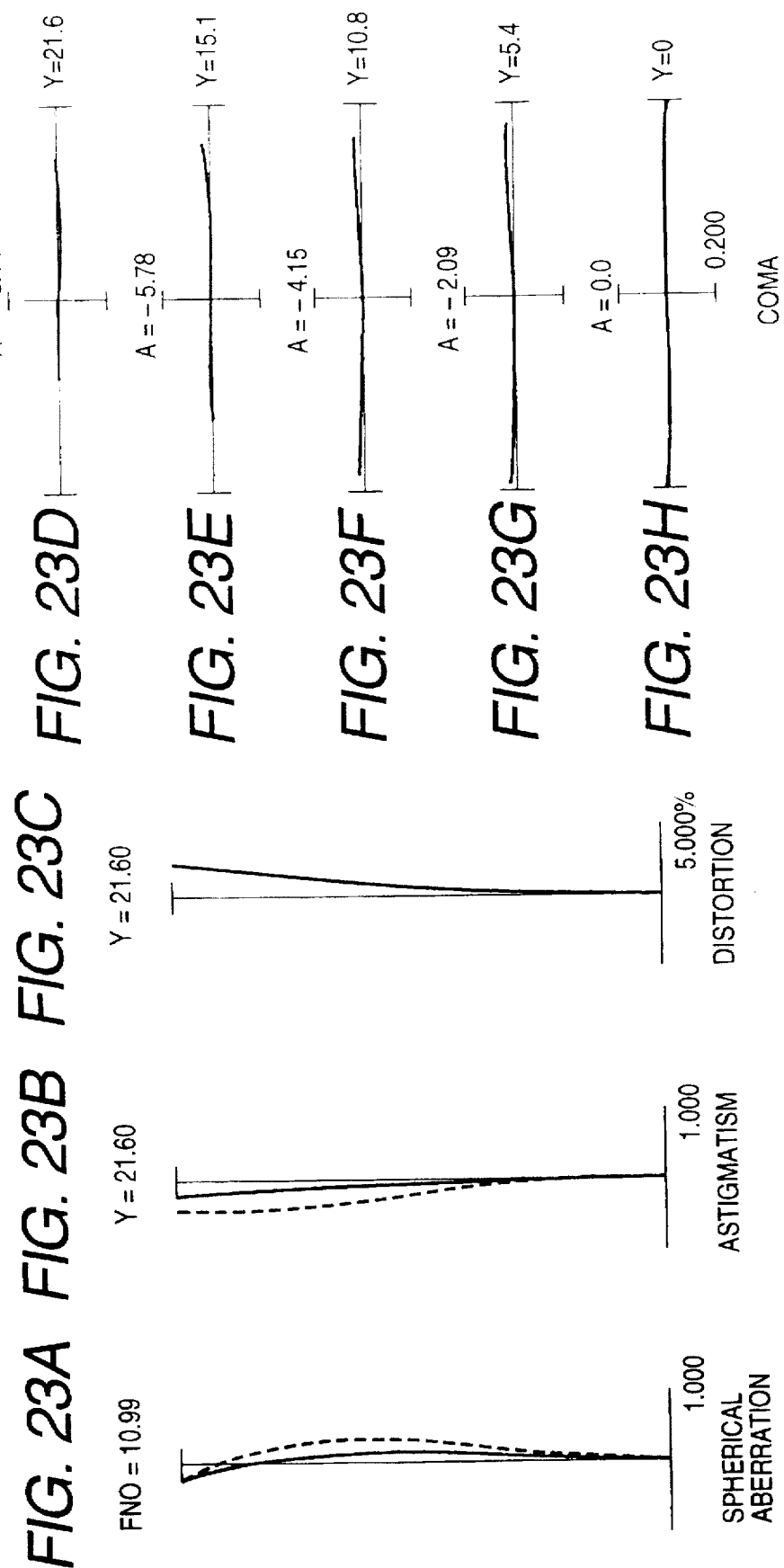
FIGS. 23A to 23H are graphs showing various aberrations in the maximum telephoto state in the infinity focusing state in the third embodiment.
Figure 24:
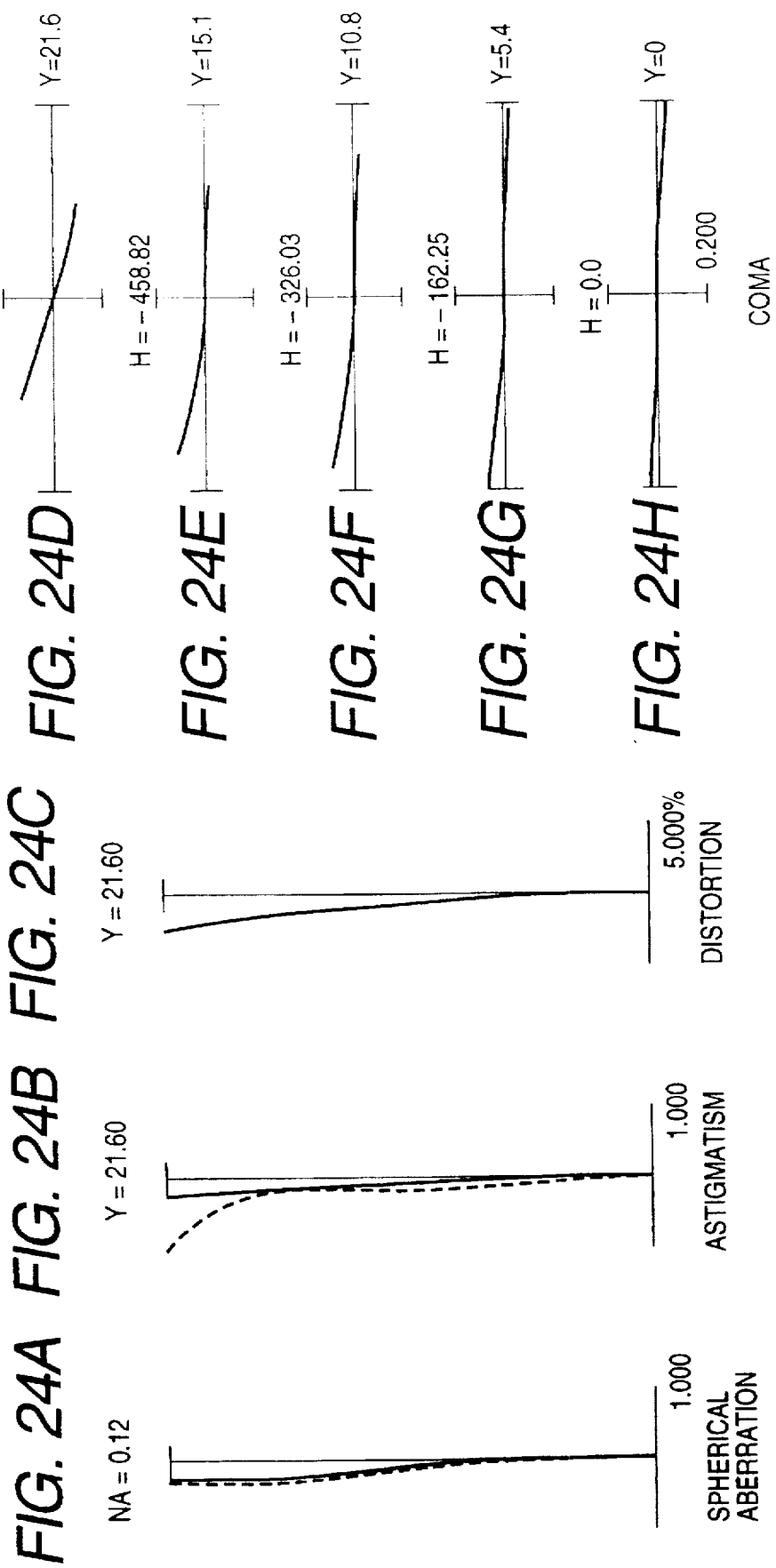
FIGS. 24A to 24H are graphs showing various aberrations in the maximum wide-angle state when the phototaking magnification=−1/30× in the third embodiment.
Figure 25:
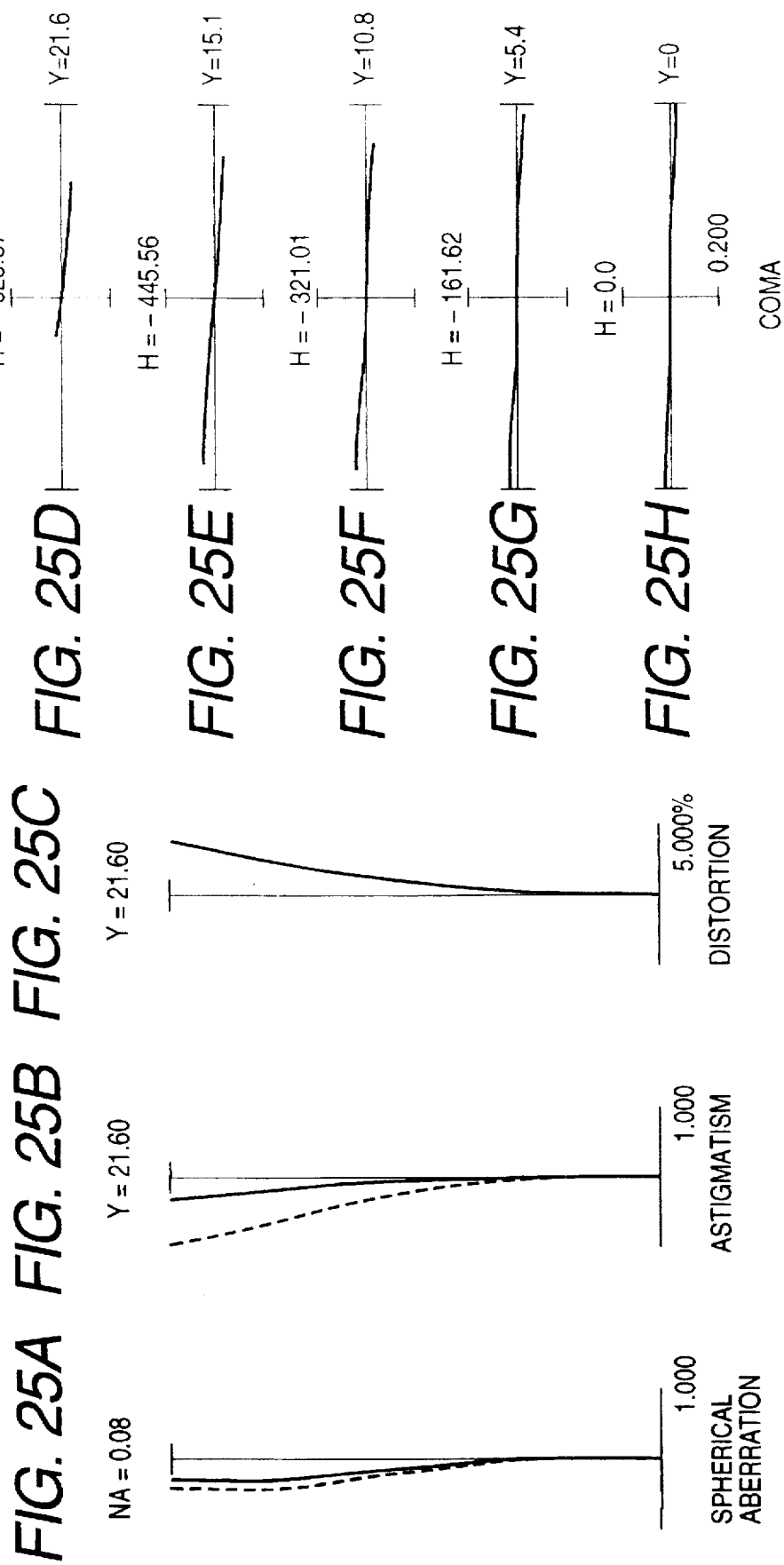
FIGS. 25A to 25H are graphs showing various aberrations in the middle focal length state when the phototaking magnification=−1/30× in the third embodiment.
Figure 26:
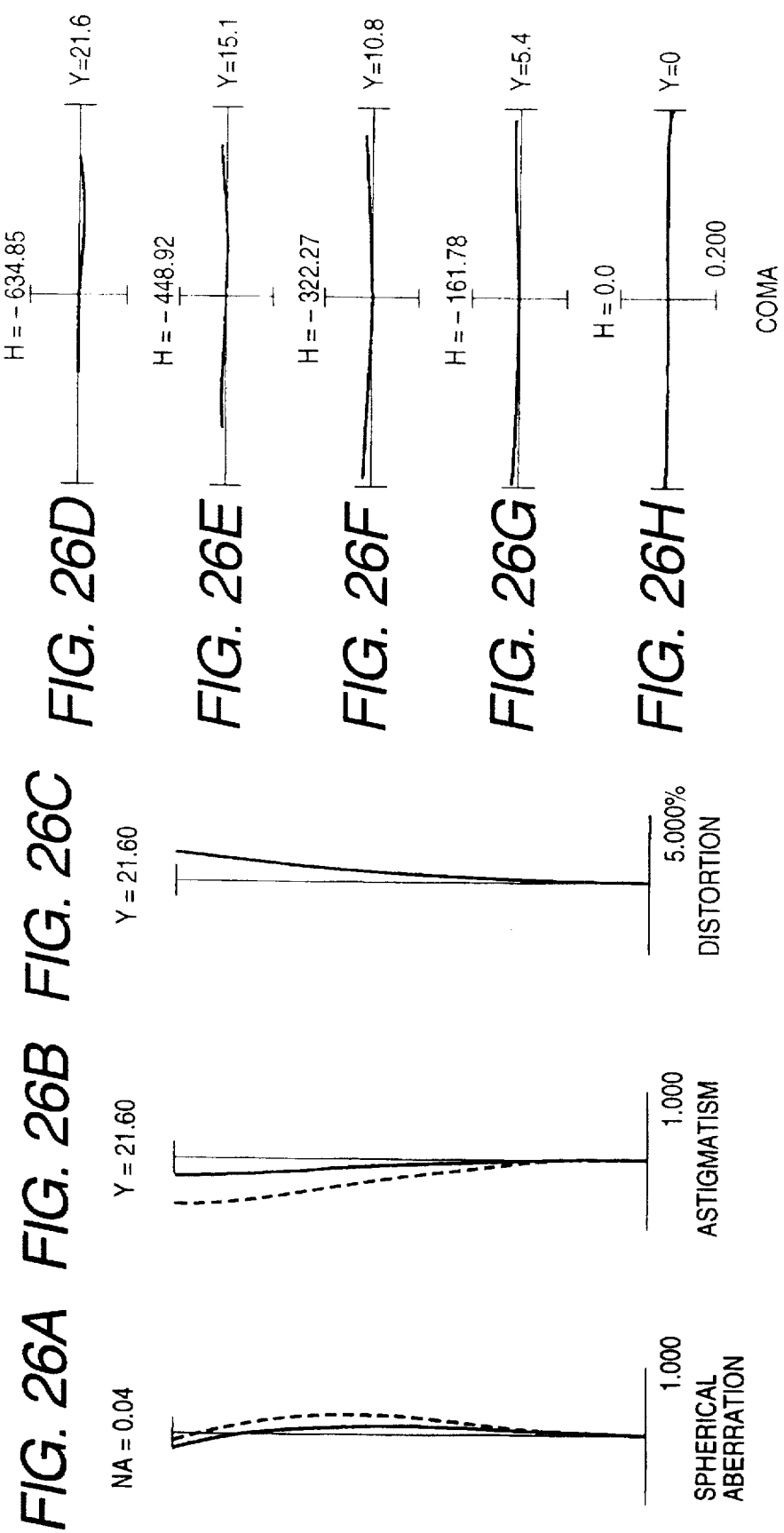
FIGS. 26A to 26H are graphs showing various aberrations in the maximum telephoto state when the phototaking magnification=−1/30× in the third embodiment.

FIG. 20 shows the lens arrangement of a variable focal length optical system according to the third embodiment of the present invention.

The variable focal length optical system shown in FIG. 20 comprises, in succession from an object side, a first lens unit G1 consisting of a cemented positive lens L1 of a biconvex lens and a negative meniscus lens with a concave surface facing the object side, a second lens unit G2 consisting of a biconcave lens L21, and a cemented positive lens L22 of a biconvex lens and a biconcave lens, a third lens unit G3 consisting of a biconvex lens L3, a fourth lens unit G4 consisting of a cemented negative lens L41 of a positive meniscus lens with a concave surface facing the object side and a negative meniscus lens with a concave surface facing the object side, and a biconvex lens L42, and a fifth lens unit G5 consisting of a positive meniscus lens L51 with a concave surface facing the object side, and a negative meniscus lens L52 with a concave surface facing the object side.

As described above, the second lens unit G2 has the biconcave lens L21 serving as a negative sub lens unit G21 having a negative refractive power, and the cemented positive lens L22 serving as a positive sub lens unit G22 having a positive refractive power.

An aperture stop S is inserted between the third lens unit G3 and the fourth lens unit G4, and moves together with the third lens unit G3 upon varying the focal length from the maximum wide-angle state to the maximum telephoto state.

FIG. 20 shows the positional relationship among the respective lens units in the maximum wide-angle state, and these lens units move on the optical axis along the zoom trajectories indicated by arrows in FIG. 1 when the focal length is varied to the maximum telephoto state.

Furthermore, by moving the fourth lens unit G4 as a focusing lens unit along the optical axis toward the object side, focusing from an infinity object to a close-distance object is attained.

Table 3 below summarizes the data values of the third embodiment of the present invention. In Table 3, f is the focal length, FNO is the F-number, ω is the half field angle, Bf is the back focus, and DO is the object point distance (the distance along the optical axis between the object and the lens surface at a position closest to the object side). Furthermore, the surface numbers indicate the order of lens surfaces from the object side along the traveling direction of light rays, and the refractive index and Abbe's number correspond to values for the d-line ($\lambda$=587.6 nm).

TABLE 3 f = 30.90–60.52–109.06–147.86
FNO = 4.24–6.54–9.27–11.00
ω = 35.75–18.99–8.14°

| Surface Number | Radius of Curvature | Surface Interval | Refractive Index | Abbe's Number |
|---|---|---|---|---|
| 1 | 39.8404 | 4.8483 | 1.48749 | 70.45 |
| 2 | −63.1155 | 1.3333 | 1.84666 | 23.83 |
| 3 | −137.3831 | (d3 = variable) | | |
| 4 | −103.5869 | 0.9697 | 1.83500 | 42.97 |
| 5 | 14.5802 | 3.3938 | | |
| 6 | 18.4802 | 3.9999 | 1.71736 | 29.50 |
| 7 | −24.6667 | 0.9697 | 1.83500 | 42.97 |
| 8 | 83.2334 | (d8 = variable) | | |
| 9 | 64.9550 | 1.8181 | 1.62280 | 56.93 |
| 10 | −34.6927 | 1.2121 | | |
| 11 | ∞ | (d11 = variable) | (aperture stop S) | |
| 12 | −13.4676 | 2.1817 | 1.54814 | 45.83 |
| 13 | −11.9707 | 0.9697 | 1.84666 | 23.83 |
| 14 | −24.7756 | 0.1212 | | |
| 15 | 76.3364 | 3.0302 | 1.56384 | 60.82 |
| 16* | −15.5260 | (d16 = variable) | | |
| 17* | −55.5207 | 2.9090 | 1.58518 | 30.24 |
| 18 | −24.1618 | 4.4847 | | |
| 19 | −13.7967 | 1.4545 | 1.77250 | 49.61 |
| 20 | −304.4820 | (Bf) | | |

(Aspherical Surface Data)
(16th Surface)
$\kappa$=0.7210
$C_4$=+4.21055×10$^{-5}$
$C_6$=+8.40460×10$^{-8}$
$C_8$=+1.49447×10$^{-9}$
$C_{10}$=−1.65128×10$^{-11}$
(17th Surface)
$\kappa$=1.0000
$C_4$=+2.34570×10$^{-5}$
$C_6$=+1.00537×10$^{-7}$
$C_8$=−9.75877×10$^{-10}$
$C_{10}$=+7.45322×10$^{-12}$ (Variable Intervals Upon Varying Focal Length)

| f | 30.9000 | 60.5245 | 147.8616 |
|---|---|---|---|
| d3 | 1.3333 | 11.8161 | 27.0135 |
| d8 | 7.0880 | 3.7091 | 1.8181 |
| d11 | 3.4753 | 4.1343 | 5.2120 |
| d16 | 18.2872 | 10.5172 | 1.8181 |
| Bf | 8.3893 | 27.8860 | 72.2504 |

(Focusing Moving Amount Δ of Fourth Lens Unit G4 When Phototaking Magnification=−1/30×)

| Focal Length f | 30.9000 | 60.5245 | 147.8616 |
|---|---|---|---|
| Object Point Distance D0 | 917.1222 | 1794.0283 | 4380.8803 |
| Moving Amount Δ | 0.6727 | 0.5493 | 0.4324 |

(Note that the positive sign of the focusing moving amount Δ indicates movement from the image side to the object side)
(Condition Corresponding Values)
β2t=−1.2170
β2w=−0.5647
f21=−15.2500
f22=+39.2894
f12=−44.6073
f2=−27.0552
(1) β2t·β2w=0.687
(2) D2/fw=0.110
(3) (|f21|+f22)/|f2|=2.016
(4) |f12|/fw=1.444

FIGS. 21A to 26H are graphs showing various aberrations for the d-line ($\lambda$=587.6 nm) in the third embodiment. FIGS. 21A to 21H are graphs showing various aberrations in the maximum wide-angle state in an infinity focusing state, FIGS. 22A to 22H are graphs showing various aberrations in the middle focal length state in an infinity focusing state, and FIGS. 23A to 23H are graphs showing various aberrations in the maximum telephoto state in an infinity focusing state.

FIGS. 24A to 24H are graphs showing various aberrations in the maximum wide-angle state when the phototaking magnification=−1/30×, FIGS. 25A to 25H are graphs showing various aberrations in the middle focal length state when the phototaking magnification=−1/30×, and FIGS. 26A to 26H are graphs showing various aberrations in the maximum telephoto state when the phototaking magnification=−1/30×.

In these graphs, FNO is the F-number, NA is the numerical aperture, Y is the image height, A is the half field angle with respect to each image height, and H is the object height with respect to each image height.

In each graph showing astigmatism, the solid curve represents the sagittal image plane, and the broken curve represents the meridional image plane. Furthermore, in each graph showing spherical aberration, the broken curve represents the sine condition.

As can be seen from these graphs, in this embodiment, various aberrations are satisfactorily corrected in the respective photographing distance states and the respective focal length states.

[Fourth Embodiment]

Figure 27:
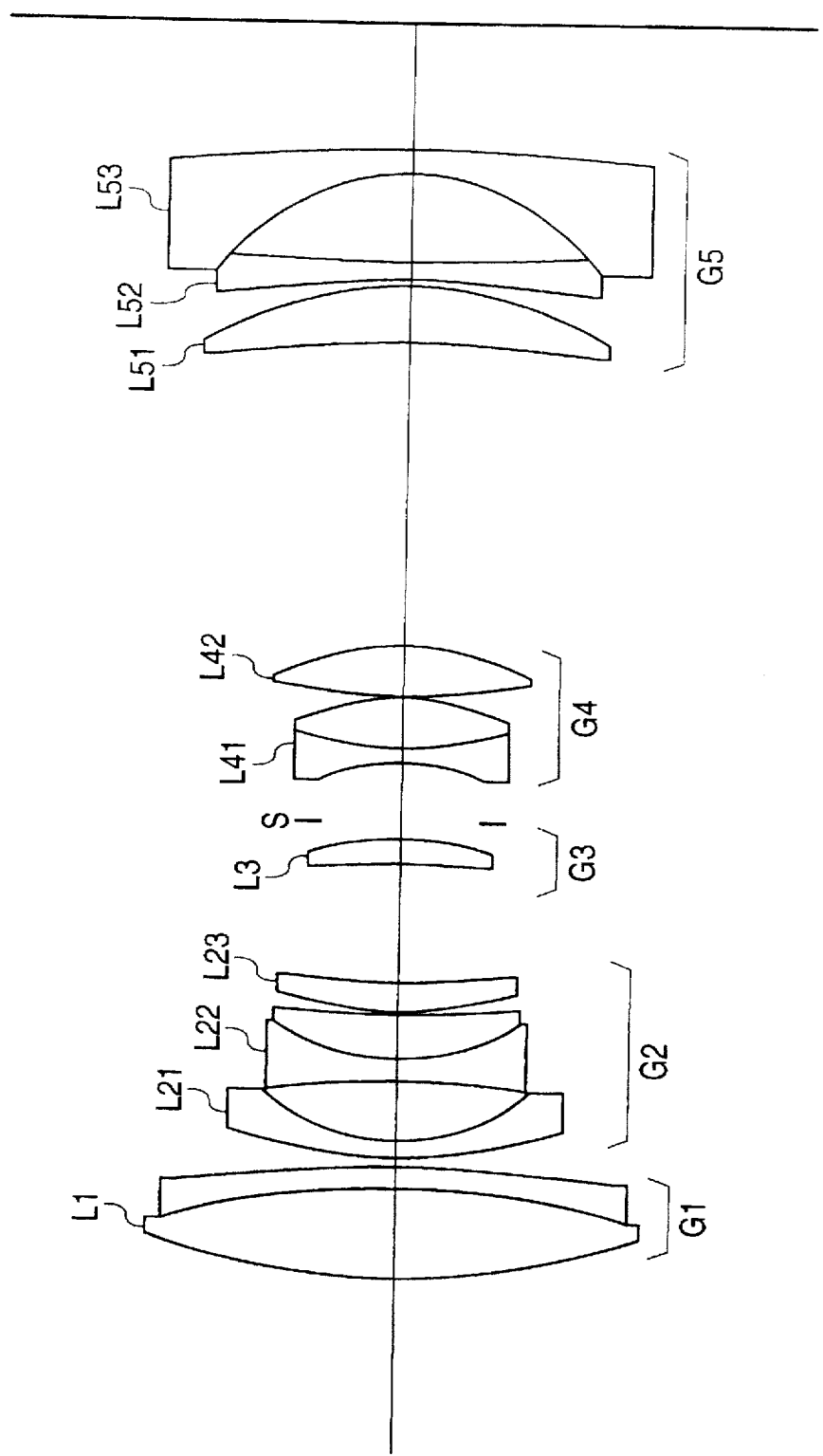
FIG. 27 is a schematic view showing the arrangement of a variable focal length optical system according to the fourth embodiment of the present invention.
Figure 28:
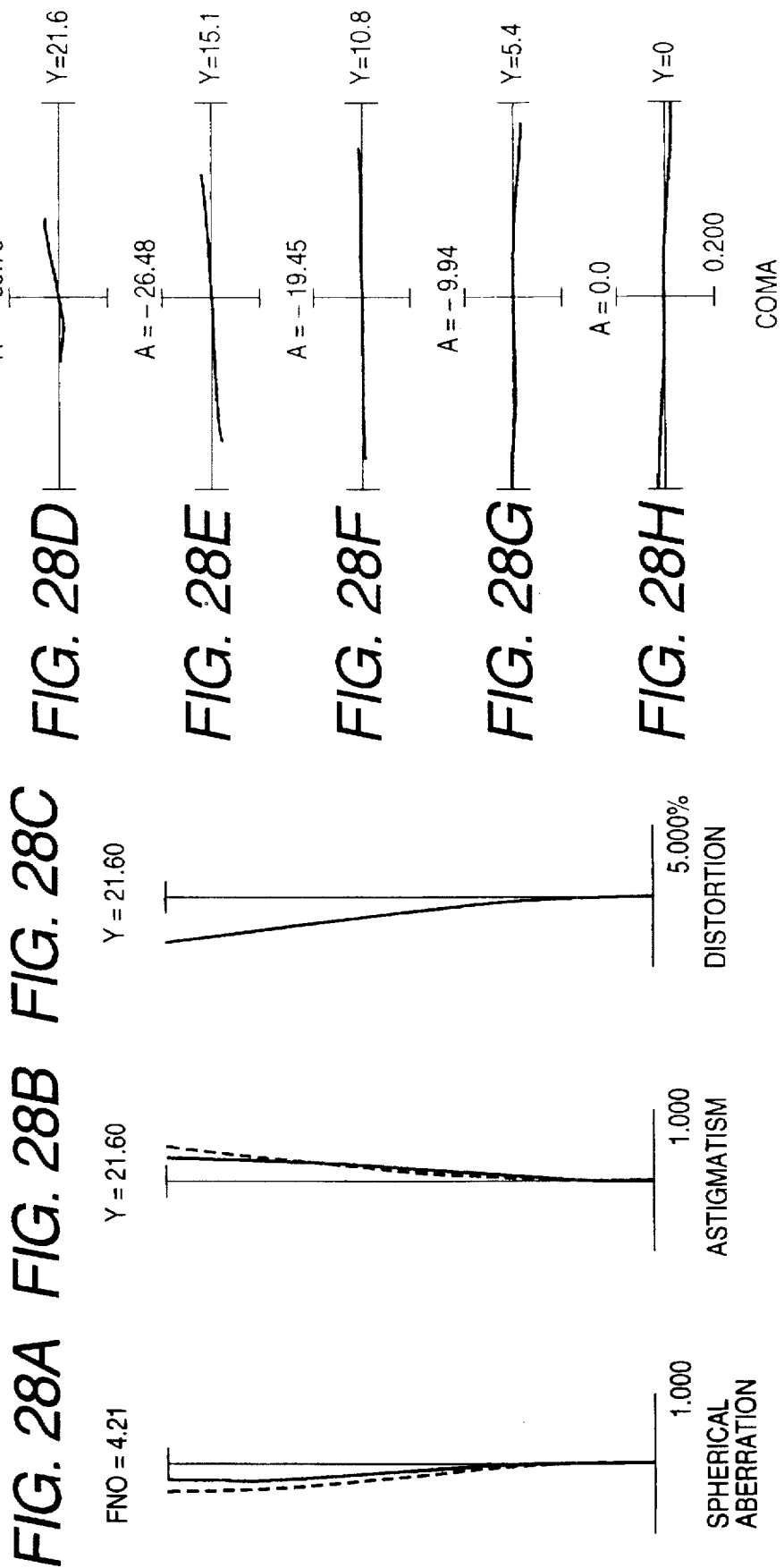
FIGS. 28A to 28H are graphs showing various aberrations in the maximum wide-angle state in the infinity focusing state in the fourth embodiment.
Figure 29:
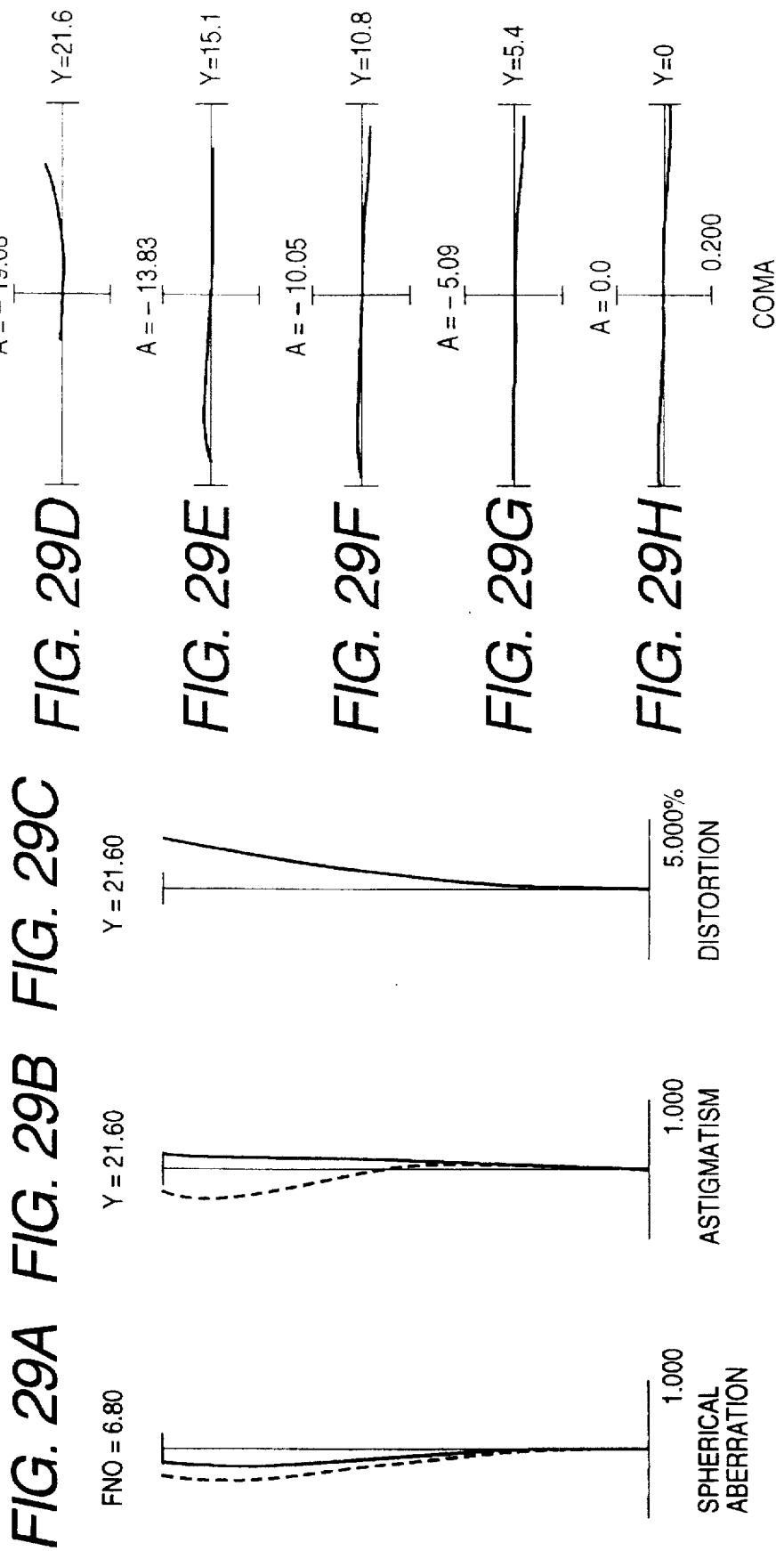
FIGS. 29A to 29H are graphs showing various aberrations in the middle focal length state in the infinity focusing state in the fourth embodiment.
Figure 30:
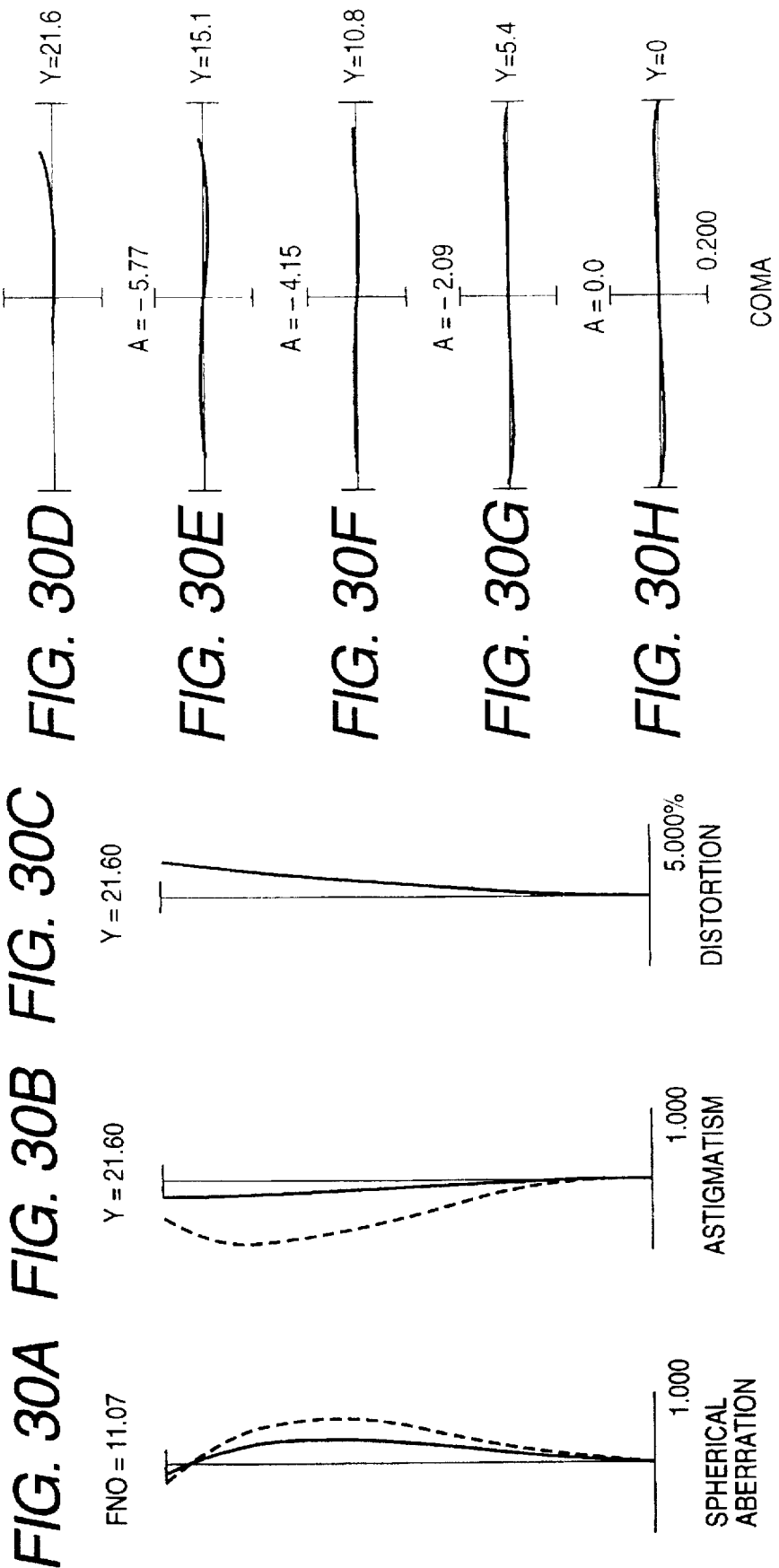
FIGS. 30A to 30H are graphs showing various aberrations in the maximum telephoto state in the infinity focusing state in the fourth embodiment.
Figure 31:
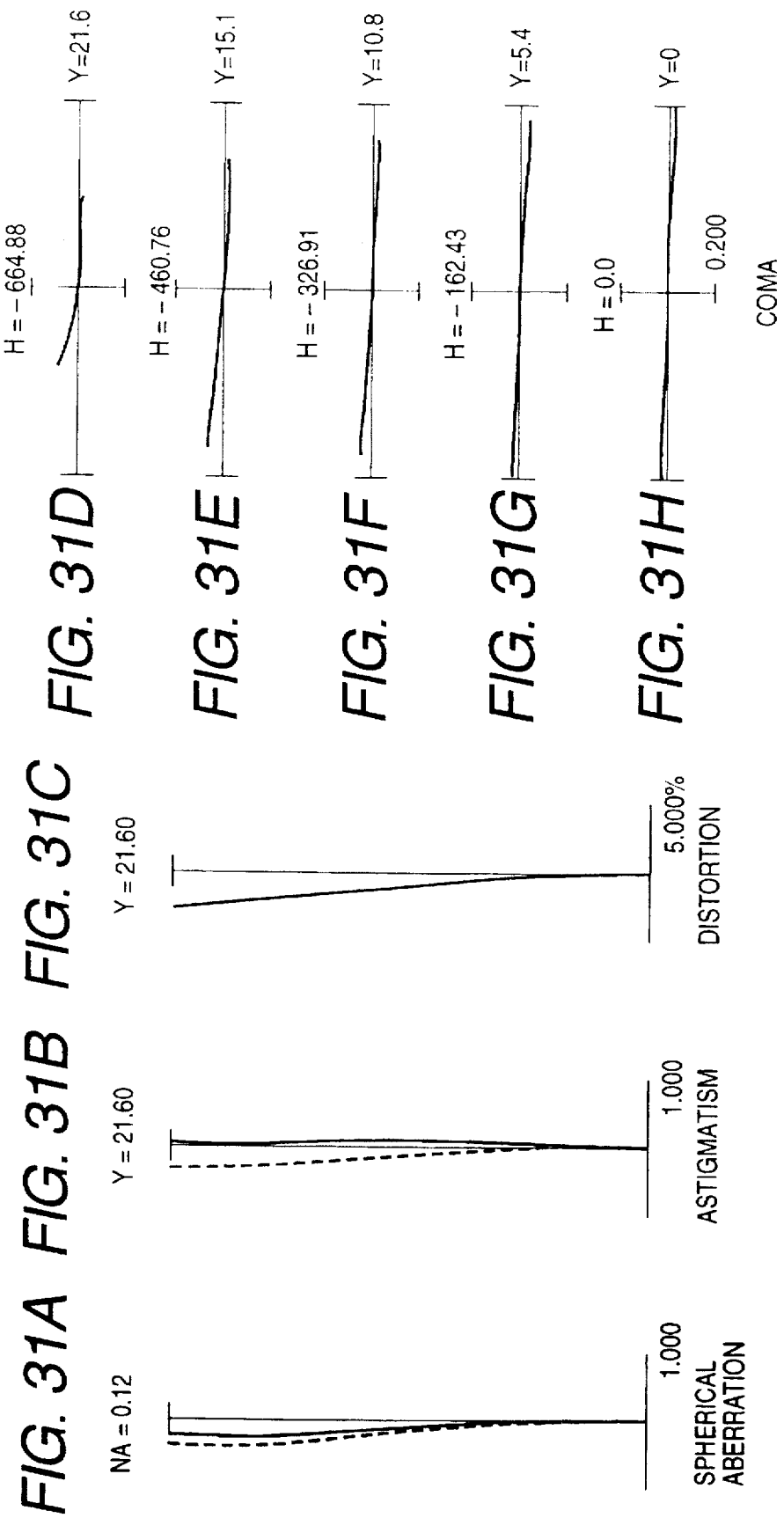
FIGS. 31A to 31H are graphs showing various aberrations in the maximum wide-angle state when the phototaking magnification=−1/30× in the fourth embodiment.
Figure 32:
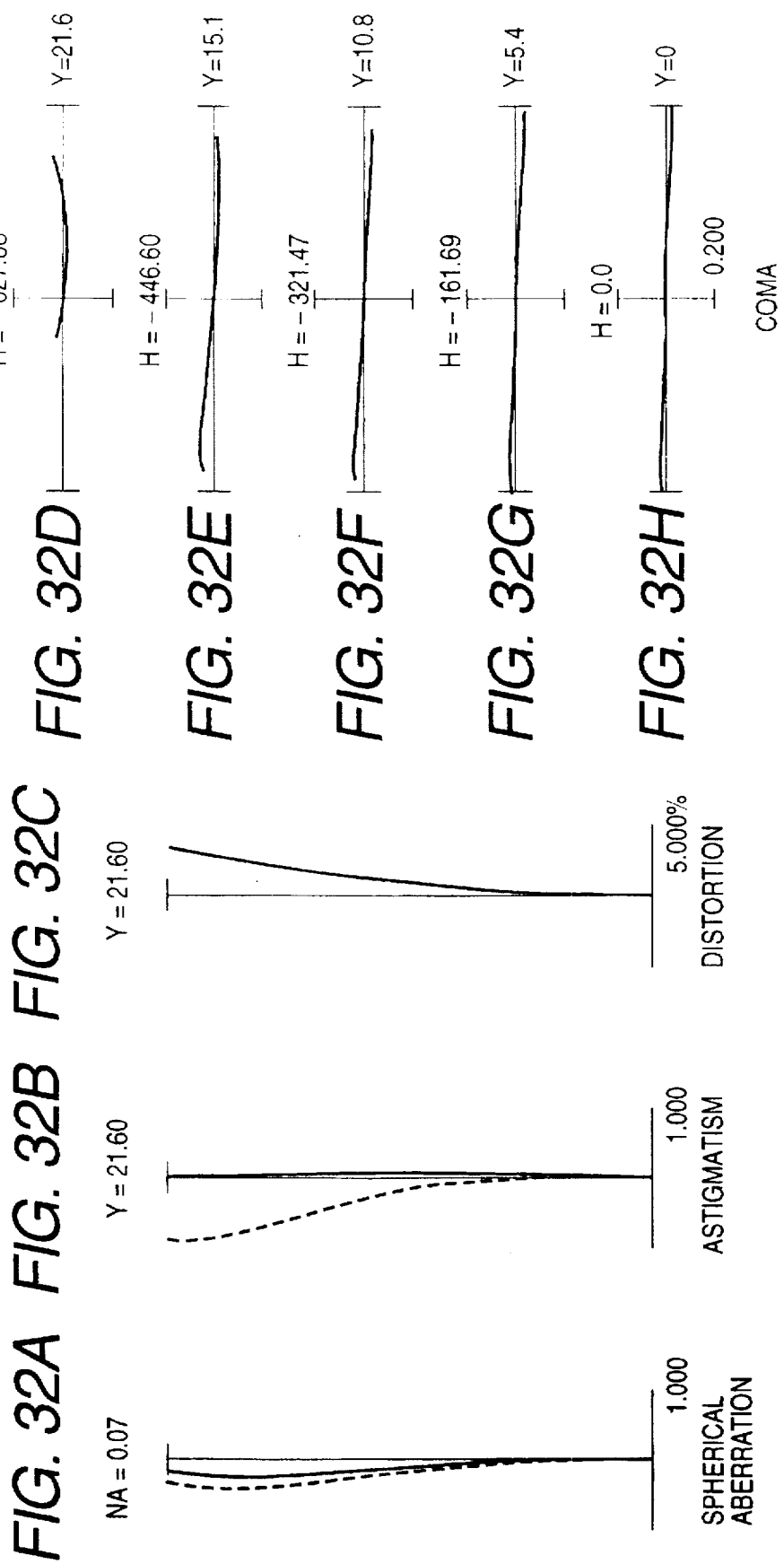
FIGS. 32A to 32H are graphs showing various aberrations in the middle focal length state when the phototaking magnification=−1/30× in the fourth embodiment.
Figure 33:
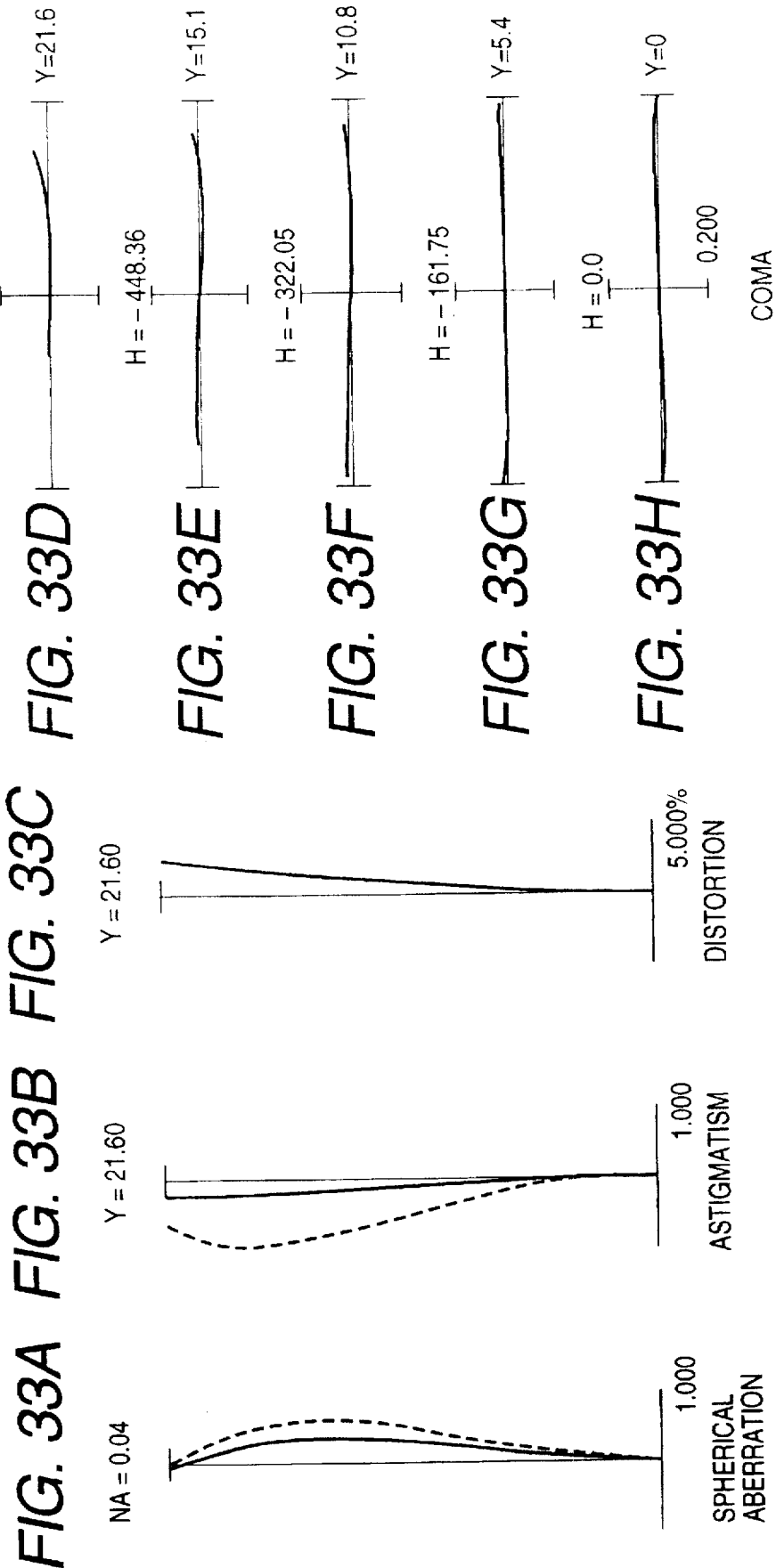
FIGS. 33A to 33H are graphs showing various aberrations in the maximum telephoto state when the phototaking magnification=−1/30× in the fourth embodiment.

FIG. 27 shows the lens arrangement of a variable focal length optical system according to the fourth embodiment of the present invention.

The variable focal length optical system shown in FIG. 27 comprises, in succession from an object side, a first lens unit G1 consisting of a cemented positive lens L1 of a biconvex lens and a negative meniscus lens with a concave surface facing the object side, a second lens unit G2 consisting of a negative meniscus lens L21 with a convex surface facing the object side, a cemented negative lens L22 of a biconcave lens and a positive meniscus lens with a convex surface facing the object side, and a positive meniscus lens L23 with a convex surface facing the object side, a third lens unit G3 consisting of a positive meniscus lens L3 with a concave surface facing the object side, a fourth lens unit G4 consisting of a cemented negative lens L41 of a biconcave lens and a biconvex lens, and a biconvex lens L42, and a fifth lens unit G5 consisting of a positive meniscus lens L51 with a concave surface facing the object side, a biconcave lens L52, and a negative meniscus lens L53 with a concave surface facing the object side.

An aperture stop S is inserted between the third lens unit G3 and the fourth lens unit G4, and moves together with the third lens unit G3 upon varying the focal length from the maximum wide-angle state to the maximum telephoto state.

FIG. 27 shows the positional relationship among the respective lens units in the maximum wide-angle state, and these lens units move on the optical axis along the zoom trajectories indicated by arrows in FIG. 1 when the focal length is varied to the maximum telephoto state.

Furthermore, by moving the fourth lens unit G4 as a focusing lens unit along the optical axis toward the object side, focusing from an infinity object to a close-distance object is attained.

Table 4 below summarizes the data values of the fourth embodiment of the present invention. In Table 4, f is the focal length, FNO is the F-number, ω is the half field angle, Bf is the back focus, and DO is the object point distance (the distance along the optical axis between the object and the lens surface at a position closest to the object side). Furthermore, the surface numbers indicate the order of lens surfaces from the object side along the traveling direction of light rays, and the refractive index and Abbe's number correspond to values for the d-line (λ=587.6 nm).

TABLE 4 f = 30.89–60.47–147.83
FNO = 4.25–6.84–11.08
ω = 35.78–19.08–8.12°

| Surface Number | Radius of Curvature | Surface Interval | Refractive Index | Abbe's Number |
|---|---|---|---|---|
| 1 | 44.5313 | 5.4529 | 1.48749 | 70.45 |
| 2 | −48.9895 | 1.3329 | 1.84666 | 23.83 |
| 3 | −94.5796 | (d3 = variable) | | |
| 4* | 25.0213 | 0.9694 | 1.69680 | 55.48 |
| 5 | 11.8160 | 3.7959 | | |
| 6 | −50.3337 | 1.3329 | 1.83500 | 42.97 |
| 7 | 13.3518 | 2.7871 | 1.80518 | 25.46 |
| 8 | 82.1339 | 0.1212 | | |
| 9 | 22.7845 | 1.9388 | 1.60342 | 38.02 |
| 10 | 109.4243 | (d10 = variable) | | |
| 11 | −114.0073 | 1.6965 | 1.83500 | 42.97 |
| 12 | −21.7264 | 0.9694 | | |
| 13 | ∞ | (d13 = variable) | (aperture stop S) | |
| 14 | −13.5390 | 0.9694 | 1.80610 | 33.27 |
| 15 | 19.3508 | 3.0294 | 1.51680 | 64.20 |
| 16 | −15.8192 | 0.1212 | | |
| 17 | 44.1555 | 2.9082 | 1.60738 | 56.71 |
| 18 | −16.9571 | (d18 = variable) | | |

TABLE 4-continued f = 30.89–60.47–147.83
FNO = 4.25–6.84–11.08
ω = 35.78–19.08–8.12°

| Surface Number | Radius of Curvature | Surface Interval | Refractive Index | Abbe's Number |
|---|---|---|---|---|
| 19 | −68.1265 | 3.2718 | 1.76182 | 26.55 |
| 20 | −21.9370 | 0.4028 | | |
| 21 | −77.4049 | 1.2118 | 1.83500 | 42.97 |
| 22 | 302.9330 | 5.1560 | | |
| 23 | −14.5830 | 1.4541 | 1.83500 | 42.97 |
| 24 | −134.7630 | (Bf) | | |

(Aspherical Surface Data)
(4th Surface)
κ=0.2448
$C_4 = -3.58895 \times 10^{-5}$
$C_6 = -1.58119 \times 10^{-8}$
$C_8 = -2.36594 \times 10^{-9}$
$C_{10} = +9.68023 \times 10^{-12}$ (Variable Intervals Upon Varying Focal Length)

| f | 30.8947 | 60.4706 | 147.8277 |
|---|---|---|---|
| d3 | 0.6059 | 10.4855 | 26.1501 |
| d10 | 6.9291 | 4.5354 | 1.8177 |
| d13 | 3.5723 | 2.8976 | 5.2106 |
| d18 | 18.4427 | 10.1370 | 1.8177 |
| Bf | 7.6737 | 28.6368 | 69.0640 |

(Focusing Moving Amount Δ of Fourth Lens Unit G4 When Phototaking Magnification=−1/30×)

| Focal Length f | 30.8947 | 60.4706 | 147.8277 |
|---|---|---|---|
| Object Point Distance DO | 912.9192 | 1787.5989 | 4369.9624 |
| Moving Amount Δ | 0.7688 | 0.5787 | 0.5065 |

(Note that the positive sign of the focusing moving amount Δ indicates movement from the image side to the object side)
(Condition Corresponding Values)
$\beta_{2t} = -1.1794$
$\beta_{2w} = -0.5542$
$f_2 = -26.7037$
(1) $\beta_{2t} \cdot \beta_{2w} = 0.654$
(5) $|f_2|/f_w = 0.864$ FIGS. 28A to 33H are graphs showing various aberrations for the d-line (λ=587.6 nm) in the fourth embodiment. FIGS. 28A to 28H are graphs showing various aberrations in the maximum wide-angle state in an infinity focusing state, FIGS. 29A to 29H are graphs showing various aberrations in the middle focal length state in an infinity focusing state, and FIGS. 30A to 30H are graphs showing various aberrations in the maximum telephoto state in an infinity focusing state.

FIGS. 31A to 31H are graphs showing various aberrations in the maximum wide-angle state when the phototaking magnification=−1/30×, FIGS. 32A to 32H are graphs showing various aberrations in the middle focal length state when the phototaking magnification=−1/30×, and FIGS. 33A to 33H are graphs showing various aberrations in the maximum telephoto state when the phototaking magnification= −1/30×.

In these graphs, FNO is the F-number, NA is the numerical aperture, Y is the image height, A is the half field angle with respect to each image height, and H is the object height with respect to each image height.

In each graph showing astigmatism, the solid curve represents the sagittal image plane, and the broken curve represents the meridional image plane. Furthermore, in each graph showing spherical aberration, the broken curve represents the sine condition.

As can be seen from these graphs, in this embodiment, various aberrations are satisfactorily corrected in the respective photographing distance states and the respective focal length states.

[Fifth Embodiment]

Figure 34:
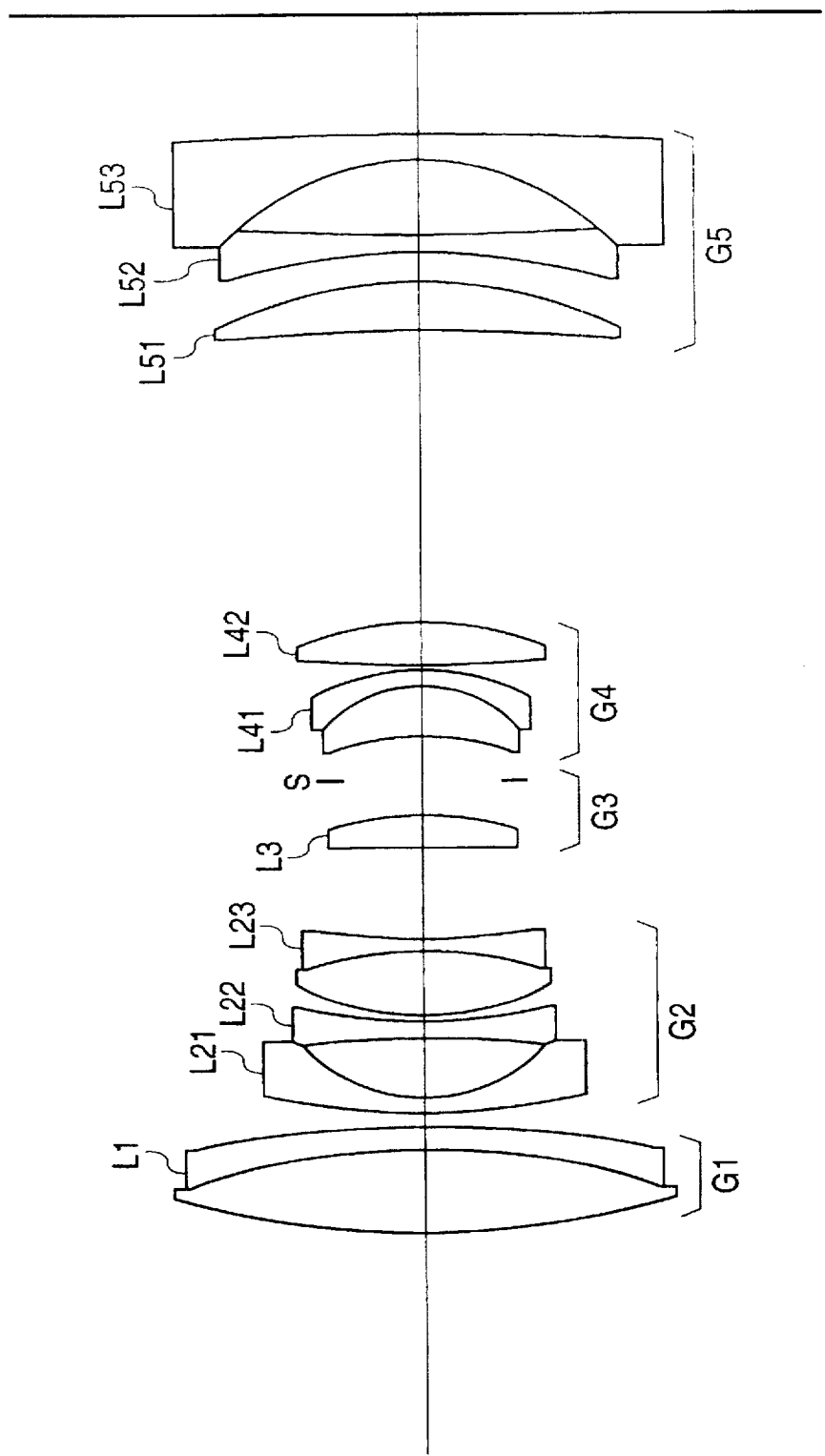
FIG. 34 is a schematic view showing the arrangement of a variable focal length optical system according to the fifth embodiment of the present invention.
Figure 35:
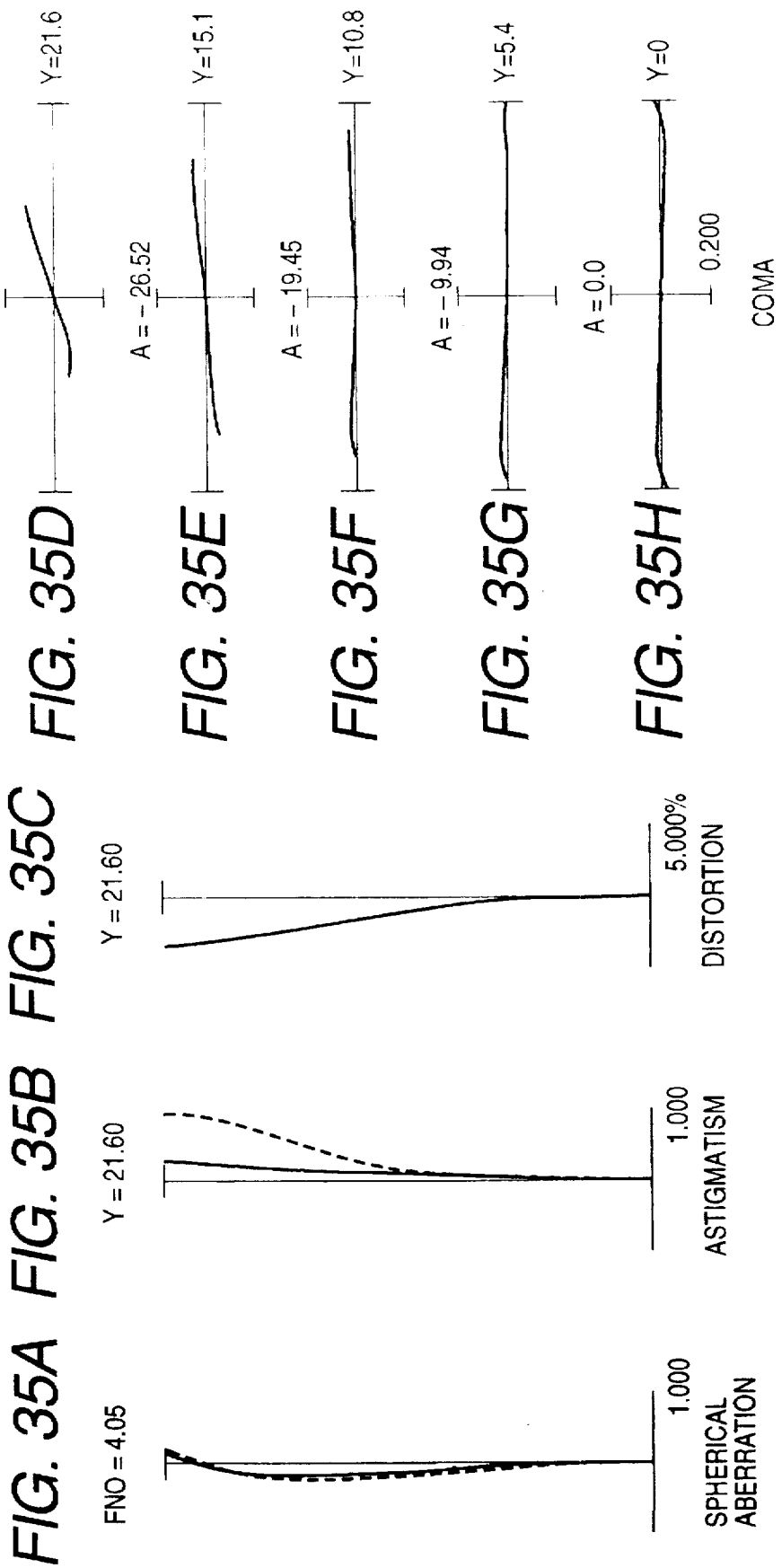
FIGS. 35A to 35H are graphs showing various aberrations in the maximum wide-angle state in the infinity focusing state in the fifth embodiment.
Figure 36:
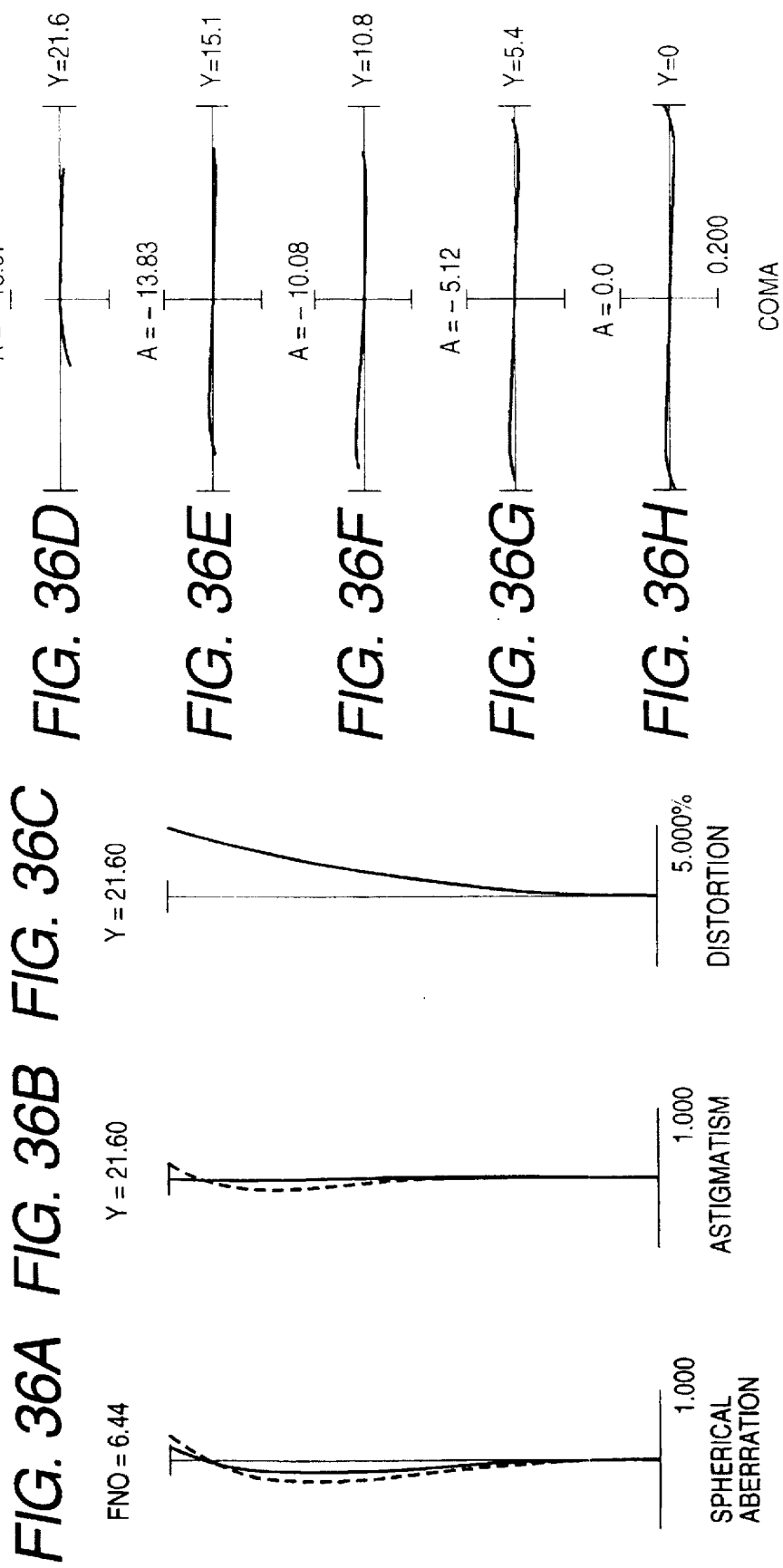
FIGS. 36A to 36H are graphs showing various aberrations in the middle focal length state in the infinity focusing state in the fifth embodiment.
Figure 37:
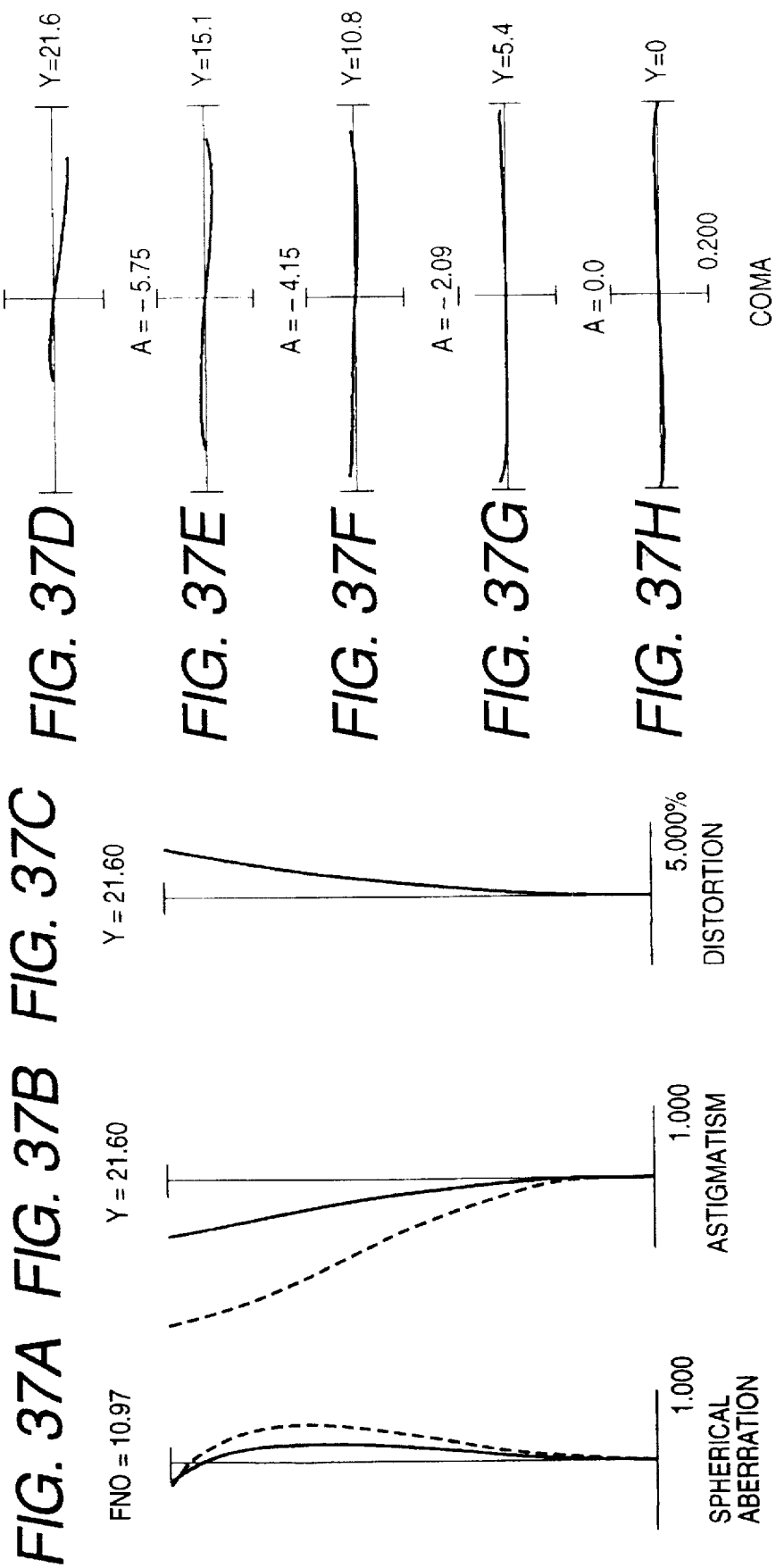
FIGS. 37A to 37H are graphs showing various aberrations in the maximum telephoto state in the infinity focusing state in the fifth embodiment.
Figure 38:
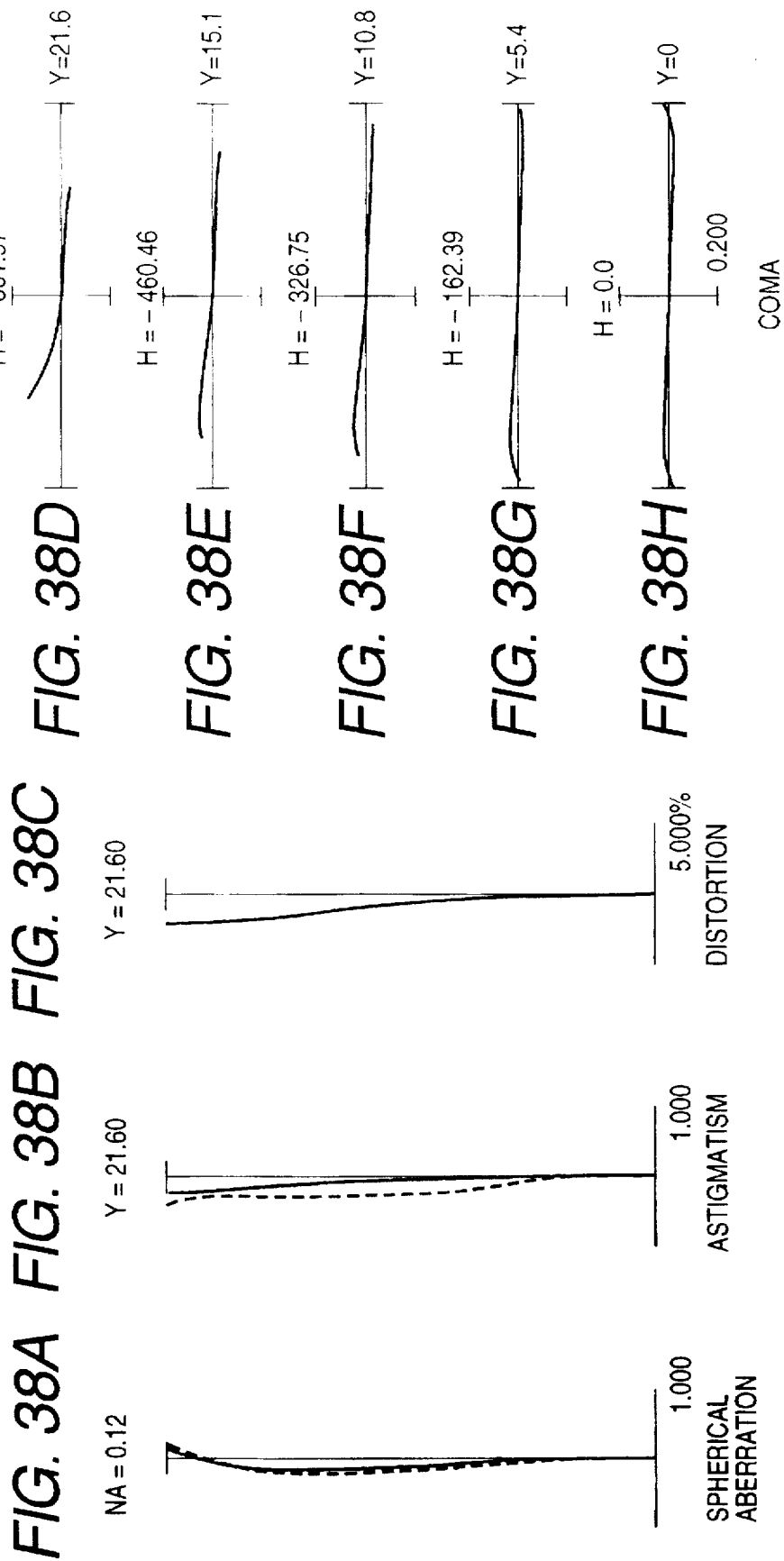
FIGS. 38A to 38H are graphs showing various aberrations in the maximum wide-angle state when the phototaking magnification=−1/30× in the fifth embodiment.
Figure 39:
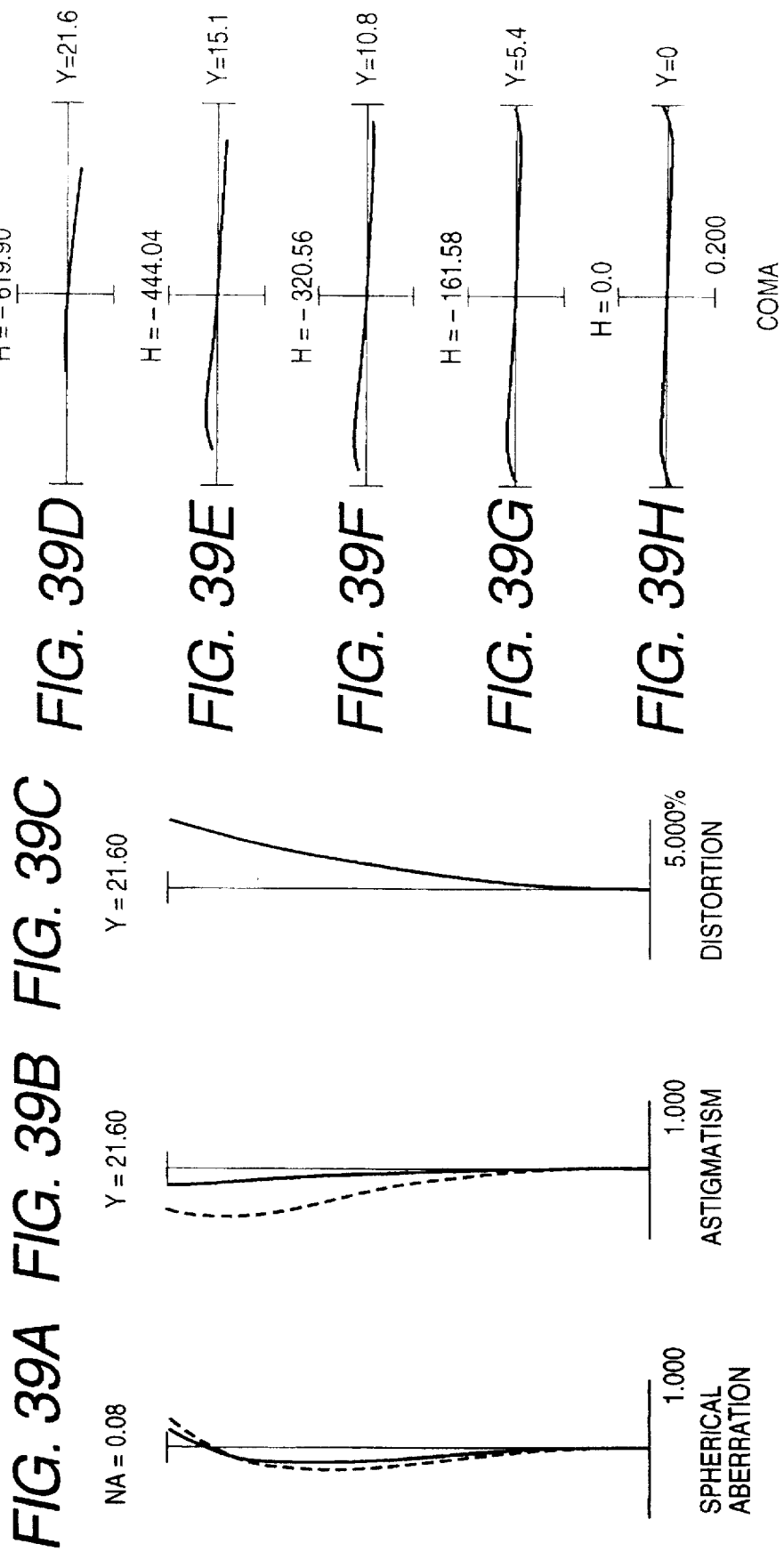
FIGS. 39A to 39H are graphs showing various aberrations in the middle focal length state when the phototaking magnification=−1/30× in the fifth embodiment.
Figure 40:
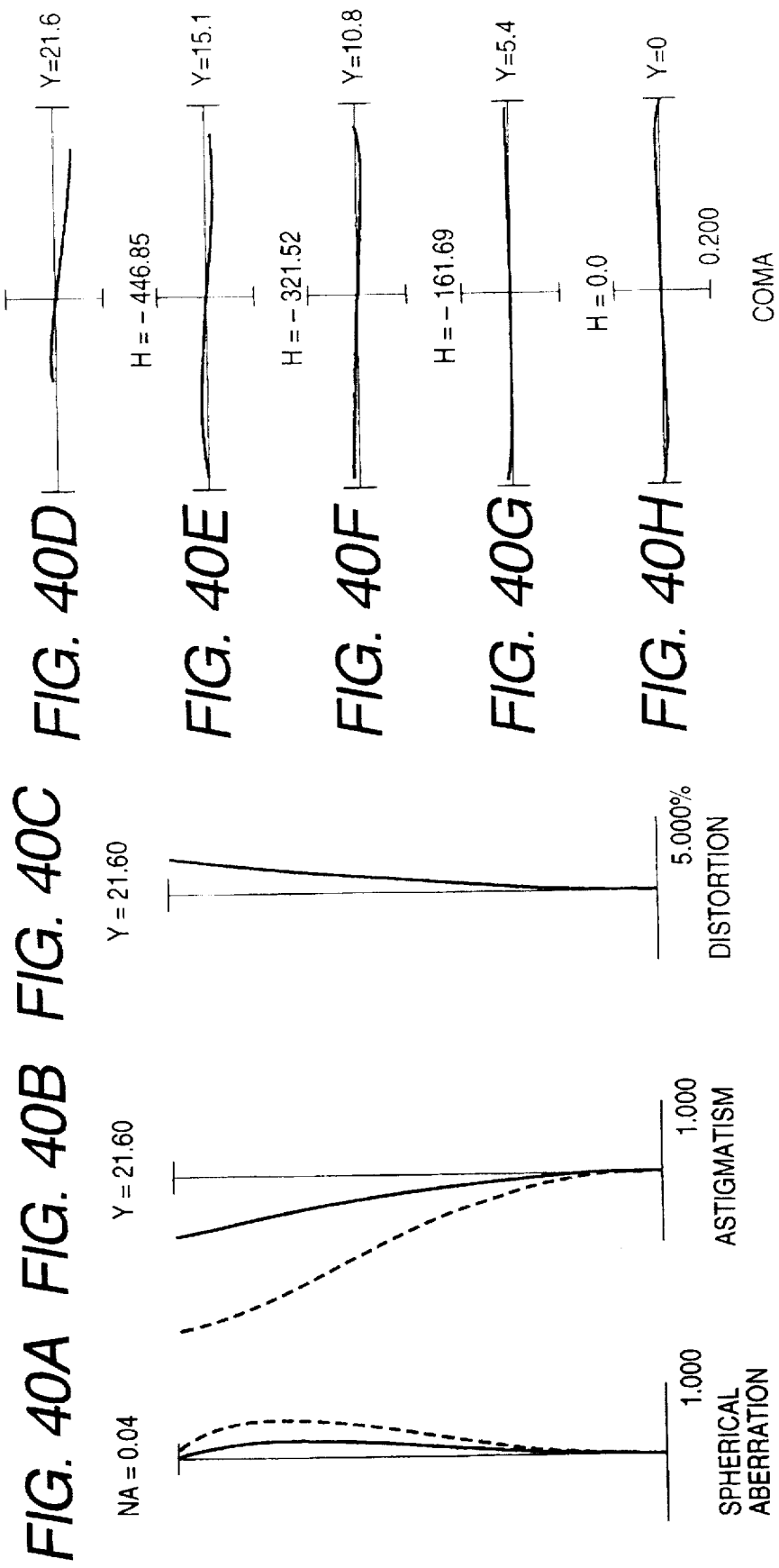
FIGS. 40A to 40H are graphs showing various aberrations in the maximum telephoto state when the phototaking magnification=−1/30× in the fifth embodiment.

FIG. 34 shows the lens arrangement of a variable focal length optical system according to the fifth embodiment of the present invention.

The variable focal length optical system shown in FIG. 34 comprises, in succession from an object side, a first lens unit G1 consisting of a cemented positive lens L1 of a biconvex lens and a negative meniscus lens with a concave surface facing the object side, a second lens unit G2 consisting of a negative meniscus lens L21 with a convex surface facing the object side, a biconcave lens L22, and a cemented positive lens L23 of a biconvex lens and a biconcave lens, a third lens unit G3 consisting of a positive meniscus lens L3 with a concave surface facing the object side, a fourth lens unit G4 consisting of a cemented positive lens L41 of a positive meniscus lens with a concave surface facing the object side and a negative meniscus lens with a concave surface facing the object side, and a biconvex lens L42, and a fifth lens unit G5 consisting of a positive meniscus lens L51 with a concave surface facing the object side, a biconcave lens L52, and a negative meniscus lens L53 with a concave surface facing the object side.

An aperture stop S is inserted between the third lens unit G3 and the fourth lens unit G4, and moves together with the third lens unit G3 upon varying the focal length from the maximum wide-angle state to the maximum telephoto state.

FIG. 34 shows the positional relationship among the respective lens units in the maximum wide-angle state, and these lens units move on the optical axis along the zoom trajectories indicated by arrows in FIG. 1 when the focal length is varied to the maximum telephoto state.

Furthermore, by moving the fourth lens unit G4 as a focusing lens unit along the optical axis toward the object side, focusing from an infinity object to a close-distance object is attained.

Table 5 below summarizes the data values of the fifth embodiment of the present invention. In Table 5, f is the focal length, FNO is the F-number, ω is the half field angle, Bf is the back focus, and DO is the object point distance (the distance along the optical axis between the object and the lens surface at a position closest to the object side). Furthermore, the surface numbers indicate the order of lens surfaces from the object side along the traveling direction of light rays, and the refractive index and Abbe's number correspond to values for the d-line (λ=587.6 nm).

TABLE 5 f = 30.92–60.12–147.79
FNO = 4.02–6.40–11.00
ω = 35.80–18.97–8.07°

| Surface Number | Radius of Curvature | Surface Interval | Refractive Index | Abbe's Number |
|---|---|---|---|---|
| 1 | 51.0994 | 5.0894 | 1.48749 | 70.45 |
| 2 | −44.1190 | 1.3329 | 1.84666 | 23.83 |
| 3 | −76.0097 | (d3 = variable) | | |
| 4* | 27.3639 | 0.9694 | 1.69680 | 55.48 |
| 5 | 10.4370 | 3.6353 | | |
| 6 | −68.4246 | 0.9694 | 1.83500 | 42.97 |
| 7 | 38.4023 | 0.3635 | | |
| 8 | 14.8954 | 3.8776 | 1.71736 | 29.50 |
| 9 | −26.0186 | 0.9694 | 1.83500 | 42.97 |
| 10 | 65.3204 | (d10 = variable) | | |

TABLE 5-continued f = 30.92–60.12–147.79
FNO = 4.02–6.40–11.00
ω = 35.80–18.97–8.07°

| Surface Number | Radius of Curvature | Surface Interval | Refractive Index | Abbe's Number |
|---|---|---|---|---|
| 11 | −9337.4469 | 2.0600 | 1.51680 | 64.20 |
| 12 | −19.2331 | 2.1812 | | |
| 13 | ∞ | (d13 = variable) | (aperture stop S) | |
| 14 | −17.1666 | 3.0294 | 1.48749 | 70.45 |
| 15 | −8.0010 | 0.9694 | 1.84666 | 23.83 |
| 16 | −12.7488 | 0.1212 | | |
| 17 | 80.0472 | 2.4235 | 1.48749 | 70.45 |
| 18 | −21.8595 | (d18 = variable) | | |
| 19 | −197.0321 | 2.9803 | 1.84666 | 23.83 |
| 20 | −28.2805 | 1.7494 | | |
| 21 | −42.5548 | 1.2118 | 1.83500 | 42.97 |
| 22 | 340.6548 | 4.3603 | | |
| 23 | −16.2846 | 1.4541 | 1.80420 | 46.51 |
| 24 | −297.6284 | (Bf) | | |

(Aspherical Surface Data)
(4th Surface)
κ=1.9548
$C_4$=−6.18887×10$^{-5}$
$C_6$=−1.54322×10$^{-7}$
$C_8$=−2.57961×10$^{-9}$
$C_{10}$=+1.43098×10$^{-11}$ (Variable Intervals Upon Varying Focal Length)

| f | 30.9169 | 60.1178 | 147.7946 |
|---|---|---|---|
| d3 | 0.8482 | 10.3647 | 25.4903 |
| d10 | 5.4134 | 3.6051 | 1.8177 |
| d13 | 2.4631 | 4.2714 | 6.0588 |
| d18 | 17.6574 | 9.7281 | 1.8177 |
| Bf | 7.1756 | 26.3770 | 68.0529 |

(Focusing Moving Amount Δ of Fourth Lens Unit G4 When Phototaking Magnification=−1/30×)

| Focal Length f | 30.9169 | 61.1178 | 147.7946 |
|---|---|---|---|
| Object Point Distance D0 | 920.5109 | 1785.3567 | 4386.4065 |
| Moving Amount Δ | 0.6731 | 0.5133 | 0.3931 |

(Note that the positive sign of the focusing moving amount Δ indicates movement from the image side to the object side)

(Condition Corresponding Values)
β2t=−0.8272
β2w=−0.4374
f2=−22.8696
(1) β2t·β2w=0.362
(5) |f2|/fw=0.740

FIGS. 35A to 40H are graphs showing various aberrations for the d-line (λ=587.6 nm) in the fifth embodiment. FIGS. 35A to 35H are graphs showing various aberrations in the maximum wide-angle state in an infinity focusing state. FIGS. 36A to 36H are graphs showing various aberrations in the middle focal length state in an infinity focusing state, and FIGS. 37A to 37H are graphs showing various aberrations in the maximum telephoto state in an infinity focusing state.

FIGS. 38A to 38H are graphs showing various aberrations in the maximum wide-angle state when the phototaking magnification=−1/30×, FIGS. 39A to 39H are graphs showing various aberrations in the middle focal length state when the phototaking magnification=−1/30×, and FIGS. 40A to 40H are graphs showing various aberrations in the maximum telephoto state when the phototaking magnification=−1/30×.

In these graphs, FNO is the F-number, NA is the numerical aperture, Y is the image height, A is the half field angle with respect to each image height, and H is the object height with respect to each image height.

In each graph showing astigmatism, the solid curve represents the sagittal image plane, and the broken curve represents the meridional image plane. Furthermore, in each graph showing spherical aberration, the broken curve represents the sine condition.

As can be seen from these graphs, in this embodiment, various aberrations are satisfactorily corrected in the respective photographing distance states and the respective focal length states.

[Sixth Embodiment]

Figure 41:
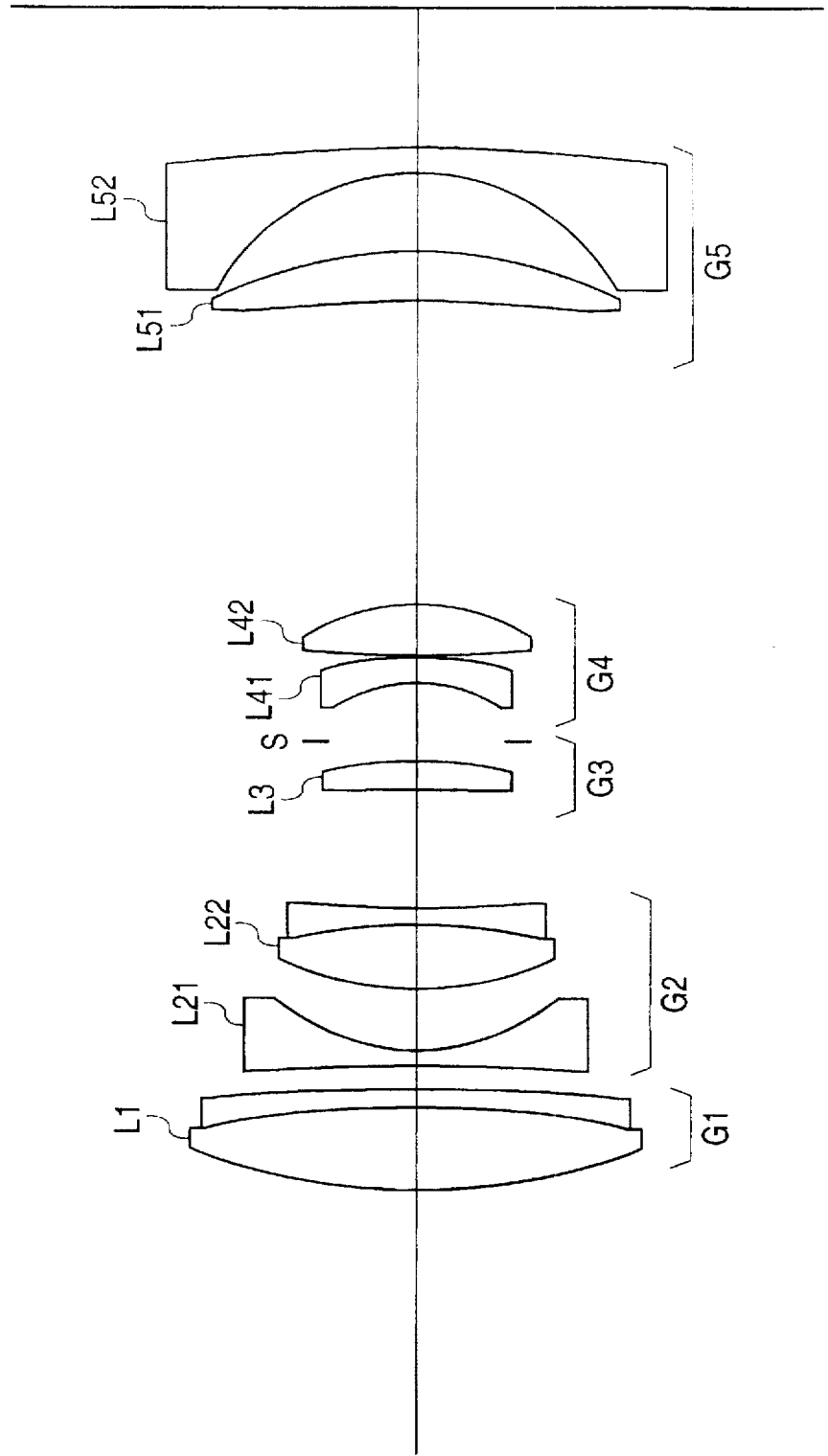
FIG. 41 is a schematic view showing the arrangement of a variable focal length optical system according to the sixth embodiment of the present invention.

FIG. 41 shows the arrangement of a variable focal length optical system according to the sixth embodiment of the present invention.

The variable focal length optical system shown in FIG. 41 comprises, in succession from an object side, a first lens unit G1 consisting of a cemented positive lens L1 of a biconvex lens and a negative meniscus lens with a concave surface facing the object side, a second lens unit G2 consisting of a biconcave lens L21, and a cemented positive lens L22 of a biconvex lens and a biconcave lens, a third lens unit G3 consisting of a biconvex lens L3, a fourth lens unit G4 consisting of a negative meniscus lens L41 with a concave surface facing the object side, and a biconvex lens L42, and a fifth lens unit G5 consisting of a positive meniscus lens L51 with a concave surface facing the object side, and a negative meniscus lens L52 with a concave surface facing the object side.

Note that an aperture stop S is inserted between the third lens unit G3 and the fourth lens unit G4, and moves together with the third lens unit G3 upon varying the focal length from the maximum wide-angle state to the maximum telephoto state.

FIG. 41 shows the positional relationship among the respective lens units in the maximum wide-angle state, and these lens units move on the optical axis along the zoom trajectories indicated by arrows in FIG. 1 when the focal length is varied to the maximum telephoto state. Upon focusing from an infinity object to a close-distance object, the fourth lens unit G4 as a focusing lens unit moves toward the object side.

Table 6 below summarizes the data values of the sixth embodiment of the present invention. In Table 6, f is the focal length, FNO is the F-number, ω is the half field angle, Bf is the back focus, and DO is the object point distance (the distance along the optical axis from an object to the lens surface at a position closest to the object side). Furthermore, the surface numbers indicate the order of lens surfaces from the object side along the traveling direction of light rays, and the refractive index and Abbe's number correspond to values for the d-line (λ=587.6 nm).

TABLE 6 f = 30.90–60.19–147.85
FNO = 4.19–6.45–11.01
ω = 35.79–19.26–8.20°

| Surface Number | Radius of Curvature | Surface Interval | Refractive Index | Abbe's Number |
|---|---|---|---|---|
| 1 | 36.2429 | 4.8479 | 1.48749 | 70.45 |
| 2 | −79.1332 | 1.3332 | 1.84666 | 23.83 |
| 3 | −243.6949 | (d3 = variable) | | |
| 4 | −132.2711 | 0.9696 | 1.83500 | 42.97 |
| 5 | 13.4559 | 3.3935 | | |
| 6 | 17.5087 | 3.3995 | 1.72825 | 28.31 |
| 7 | −34.5361 | 0.9696 | 1.83500 | 42.97 |

TABLE 6-continued f = 30.90–60.19–147.85
FNO = 4.19–6.45–11.01
ω = 35.79–19.26–8.20°

| Surface Number | Radius of Curvature | Surface Interval | Refractive Index | Abbe's Number |
|---|---|---|---|---|
| 8 | 69.4881 | (d8 = variable) | | |
| 9 | 56.3355 | 1.8180 | 1.51680 | 64.20 |
| 10 | −28.1202 | 1.2120 | | |
| 11 | ∞ | (d11 = variable) | (aperture stop S) | |
| 12 | −10.9870 | 3.0294 | 1.84666 | 23.83 |
| 13 | −22.1579 | 0.1212 | | |
| 14* | 94.8478 | 2.4235 | 1.56384 | 60.82 |
| 15* | −11.4089 | (d15 = variable) | | |
| 16* | −50.9443 | 2.9087 | 1.58518 | 30.24 |
| 17 | −24.1224 | 4.4843 | | |
| 18 | −13.4409 | 1.4544 | 1.77250 | 49.61 |
| 19 | −140.6555 | (Bf) | | |

(Aspherical Surface Data)
(14th Surface)
$\kappa = 1.0000$
$C_4 = +2.69882 \times 10^{-5}$
$C_6 = +1.27874 \times 10^{-7}$
$C_8 = -1.26432 \times 10^{-9}$
$C_{10} = +9.49046 \times 10^{-12}$
(15th Surface)
$\kappa = 0.7210$
$C_4 = +5.68412 \times 10^{-5}$
$C_6 = +1.75906 \times 10^{-7}$
$C_8 = -1.37054 \times 10^{-8}$
$C_{10} = +4.23423 \times 10^{-10}$
(16th Surface)
$\kappa = 0.2719$
$C_4 = +3.98989 \times 10^{-6}$
$C_6 = -3.53545 \times 10^{-8}$
$C_8 = -1.85839 \times 10^{-8}$
$C_{10} = +5.72505 \times 10^{-10}$ (Variable Intervals Upon Varying Focal Length)

| f | 30.9000 | 60.1919 | 147.8463 |
|---|---|---|---|
| d3 | 1.3332 | 11.8150 | 27.0110 |
| d8 | 7.0874 | 3.7088 | 1.8180 |
| d11 | 3.4750 | 4.1339 | 4.1339 |
| d15 | 18.2855 | 10.5162 | 1.8180 |
| Bf | 8.3145 | 27.9098 | 73.9420 |

(Focusing Moving Amount Δ of Fourth Lens Unit G4 When Phototaking Magnification=−1/30×)

| Focal Length f | 30.9000 | 60.1919 | 147.8463 |
|---|---|---|---|
| Object Point Distance DO | 917.7488 | 1784.9810 | 4382.6958 |
| Moving Amount Δ | 0.6730 | 0.5486 | 0.4219 |

(Note that the positive sign of the focusing moving amount Δ indicates movement from the image side to the object side)
(Condition Corresponding Values)
f3=36.5634
f4=39.4759
f2=27.3447
fw=30.9000
ft=147.8463
β4w=0.3148
β4t=0.3857
Z=4.7847
(6) f3/f4=0.926

(7) |f2|/(fw·ft)^{1/2}=0.405

(8) (β4t/β4w)/Z=0.256

FIGS. 42A to 47H are graphs showing various aberrations for the d-line (λ=587.6 nm) in the sixth embodiment.

FIGS. 42A to 42H are graphs showing various aberrations in the maximum wide-angle state in an infinity focusing state, FIGS. 43A to 43H are graphs showing various aberrations in the middle focal length state in an infinity focusing state, and FIGS. 44A to 44H are graphs showing various aberrations in the maximum telephoto state in an infinity focusing state.

FIGS. 45A to 45H are graphs showing various aberrations in the maximum wide-angle state in a close-distance focusing state (the phototaking magnification=−1/30×), FIGS. 46A to 46H are graphs showing various aberrations in the middle focal length state in a close-distance focusing state (the phototaking magnification=−1/30×), and FIGS. 47A to 47H are graphs showing various aberrations in the maximum telephoto state in a close-distance focusing state (the phototaking magnification=−1/30×).

In these graphs, FNO is the F-number, NA is the numerical aperture, Y is the image height, A is the half field angle with respect to each image height, and H is the object height with respect to each image height.

In each graph showing astigmatism, the solid curve represents the sagittal image plane, and the broken curve represents the meridional image plane. Furthermore, in each graph showing spherical aberration, the broken curve represents the sine condition.

As can be seen from these graphs, in this embodiment, various aberrations are satisfactorily corrected in the respective focal length states from the infinity focusing state to the close-distance focusing state.

Having described preferred embodiments of the present invention, it is to be understood that any variations will occur to those skilled in the art within the scope of the appended claims.

What is claimed is:

1. A variable focal length optical system comprising, in succession from an object side, a first lens unit G1 having a positive refractive power, a second lens unit G2 having a negative refractive power, a third lens unit G3 having a positive refractive power, a fourth lens unit G4 having a positive refractive power, and a fifth lens unit G5 having a negative refractive power, wherein when a focal length is varied from a maximum wide-angle state to a maximum telephoto state, at least said fifth lens unit G5 moves toward the object side, a first variable air gap between said first lens unit G1 and said second lens unit G2 increases, a second variable air gap between said second lens unit G2 and said third lens unit G3 decreases, a third variable air gap between said third lens unit G3 and said fourth lens unit G4 increases, and a fourth variable air gap between said fourth lens unit G4 and said fifth lens unit G5 decreases, said second lens unit G2 at least has a negative sub lens unit G21 which is disposed at a position closest to the object side and has a negative refractive power, and a sub lens unit G22 which is disposed on the image side of said negative sub lens unit G21, and said optical system satisfies the following conditions:

$$0.3<\beta2r\cdot\beta2w<1.0$$

$$0.08<D2/fw<0.16$$

where β2w is the lateral magnification of said second lens unit G2 in the maximum wide-angle state, β2t is the lateral magnification of said second lens unit G2 in the maximum telephoto state, D2 is the air gap along the optical axis between said negative sub lens unit G21 and said sub lens unit G22 in said second lens unit G2, and fw is the focal length of the entire optical system in the maximum wide-angle state.

2. An optical system according to claim 1, wherein said sub lens unit G22 in said second lens unit G2 has a positive refractive power, and said optical system satisfies the following condition:

$$1.5<(|f21|+f22)/|f2|<2.5$$

where f21 is the focal length of said negative sub lens unit G21, f22 is the focal length of said positive sub lens unit G22, and f2 is the focal length of said second lens unit G2.

3. An optical system according to claim 2, wherein said optical system satisfies the following condition:

$$1<|f12|/fw<2$$

where f12 is the synthetic focal length of said first lens unit G1 and said second lens unit G2 in the maximum wide-angle state, and fw is the focal length of the entire optical system in the maximum wide-angle state.

4. An optical system according to claim 1, wherein said optical system satisfies the following condition:

$$1<|f12|/fw<2$$

where f12 is the synthetic focal length of said first lens unit G1 and said second lens unit G2 in the maximum wide-angle state, and fw is the focal length of the entire optical system in the maximum wide-angle state.

5. A variable focal length optical system comprising, in succession from an object side, a first lens unit G1 having a positive refractive power, a second lens unit G2 having a negative refractive power, an aperture stop, a middle lens unit GM having a positive refractive power, and a final lens unit GR which is disposed at a position closest to the image side and has a negative refractive power, wherein when a focal length is varied from a maximum wide-angle state to a maximum telephoto state, at least said first lens unit G1 and said final lens unit GR move toward the object side, a first variable air gap between said first lens unit G1 and said second lens unit G2 increases and a second variable air gap between said middle lens unit GM and said final lens unit GR decreases, and there is no lens element arranged between said aperture stop and said middle lens unit GM, and said middle lens unit GM has a negative meniscus shaped lens element with a concave surface facing the object side and a positive lens element arranged on the image side of said negative meniscus shaped lens element.

6. An optical system according to claim 5, wherein said second lens unit G2 has a negative meniscus lens element with a convex surface facing the object side, a negative lens element with a concave surface facing the object side, and a positive sub lens unit having a positive refractive power.

7. An optical system according to claim 6, wherein said optical system has, between said second lens unit G2 and said middle lens unit GM, a third lens unit G3 having a positive refractive power, when the focal length is varied from the maximum wide-angle state to the maximum telephoto state, a third variable air gap between said second lens unit G2 and said third lens unit G3 decreases, and a fourth variable air gap between said third lens unit G3 and said middle lens unit GM increases, and said optical system satisfies the following condition:

$$0.5 < |f2|/fw < 0.9$$

where f2 is the focal length of said second lens unit G2, and fw is the focal length of the entire optical system in the maximum wide-angle state.

8. An optical system according to claim 5, wherein said optical system has, between said second lens unit G2 and said middle lens unit GM, a third lens unit G3 having a positive refractive power, when the focal length is varied from the maximum wide-angle state to the maximum telephoto state, a third variable air gap between said second lens unit G2 and said third lens unit G3 decreases, and a fourth variable air gap between said third lens unit G3 and said middle lens unit GM increases, and said optical system satisfies the following condition:

$$0.5 < |f2|/fw < 0.9$$

where f2 is the focal length of said second lens unit G2, and fw is the focal length of the entire optical system in the maximum wide-angle state.

9. An optical system according to claim 7, wherein said optical system satisfies the following condition:

$$0.3 < \beta 2t \cdot \beta 2w < 1.0$$

where β2w is the lateral magnification of said second lens unit G2 in the maximum wide-angle state, and β2t is the lateral magnification of said second lens unit G2 in the maximum telephoto state.

10. An optical system according to claim 8, wherein said optical system satisfies the following condition:

$$0.3 < \beta 2t \cdot \beta 2w < 1.0$$

where β2w is the lateral magnification of said second lens unit G2 in the maximum wide-angle state, and β2t is the lateral magnification of said second lens unit G2 in the maximum telephoto state.

11. A variable focal length optical system comprising, in succession from an object side, a first lens unit G1 having a positive refractive power, a second lens unit G2 having a negative refractive power, a third lens unit G3 having a positive refractive power, a fourth lens unit G4 having a positive refractive power, and a fifth lens unit G5 having a negative refractive power, wherein said optical system further comprises an aperture stop arranged between said third lens unit G3 and said fourth lens unit G4, and wherein when a focal length is varied from a maximum wide-angle state to a maximum telephoto sate, at least said first lens unit G1 and said fifth lens unit G5 move toward the object side, an air gap between said first lens unit G1 and said second lens unit G2 increases, an air gap between said second lens unit G2 and said third lens unit G3 decreases, and an air gap between said fourth lens unit G4 and said fifth lens unit G5 decreases, and at least said fourth lens unit G4 moves, so that an air gap along an optical axis between said second lens unit G2 and said fourth lens unit G4 decreases, a focusing operation on a close-distance object is performed by moving said fourth lens unit G4 along the optical axis, and said optical system satisfies the following conditions:

$$0.7 < f3/f4 < 1.1$$

$$0.3 < |f2|/(fw \cdot ft)^{1/2} < 0.5$$

where f2 is the focal length of said second lens unit G2, f3 is the focal length of said third lens unit G3, f4 is the focal length of said fourth lens unit G4, fw is the focal length of the entire optical system in the maximum wide-angle state, and ft is the focal length of the entire optical system in the maximum telephoto state.

12. An optical system according to claim 11, wherein said optical system satisfies the following conditions:

$$0.18 < (\beta 4t/\beta 4w)/Z < 0.38$$

where β4t is the lateral magnification of said fourth lens unit G4 in the maximum telephoto state, β4w is the lateral magnification of said fourth lens unit G4 in the maximum wide-angle state, and Z is the zoom ratio.

13. An optical system according to claim 12, wherein at least one of a plurality of lens surfaces that constitute said fourth lens unit G4 is formed to have an aspherical surface shape.

14. An optical system according to claim 11, wherein at least one of a plurality of lens surfaces that constitute said fourth lens unit G4 is formed to have an aspherical surface shape.

15. An optical system according to claim 1, wherein said second lens unit G2 is constituted by only said sub lens unit G21 and said sub lens unit G22.

* * * * *